US012406215B2

(12) United States Patent
Jenson

(10) Patent No.: US 12,406,215 B2
(45) Date of Patent: Sep. 2, 2025

(54) SCALABLE EVALUATION OF THE EXISTENCE OF ONE OR MORE CONDITIONS BASED ON APPLICATION OF ONE OR MORE EVALUATION TIERS

(71) Applicant: Neon Wind Ventures, LLC, Sheridan, WY (US)

(72) Inventor: Peter Jenson, Wintergarden, FL (US)

(73) Assignee: Neon Wind Ventures, LLC

( * ) Notice: Subject to any disclaimer, the term of this patent is extended or adjusted under 35 U.S.C. 154(b) by 677 days.

(21) Appl. No.: 17/480,151

(22) Filed: Sep. 21, 2021

(65) Prior Publication Data
US 2023/0092488 A1 Mar. 23, 2023

(51) Int. Cl.
G06Q 10/0631 (2023.01)
G06N 3/02 (2006.01)
G06Q 10/0639 (2023.01)

(52) U.S. Cl.
CPC ....... *G06Q 10/063114* (2013.01); *G06N 3/02* (2013.01); *G06Q 10/063112* (2013.01);
(Continued)

(58) Field of Classification Search
CPC ... G06Q 10/063114; G06Q 10/063112; G06Q 10/06393; G06Q 10/06398;
(Continued)

(56) References Cited

U.S. PATENT DOCUMENTS 10,223,646 B1 * 3/2019 Vontobel ........... G06F 16/90335
11,816,167 B1 * 11/2023 Doyle ................... G06N 5/022
(Continued)

FOREIGN PATENT DOCUMENTS

CN 112712120 A * 4/2021
WO WO-2019214756 A2 * 11/2019 ......... G06F 16/2365

OTHER PUBLICATIONS

Zou, Jinming, Yi Han, and Sung-Sau So. "Overview of artificial neural networks." Artificial neural networks: methods and applications (2009): 14-22. (Year: 2009).*
(Continued)

*Primary Examiner* — Thomas Yih Ho
(74) *Attorney, Agent, or Firm* — Peter Jensen-Haxel

(57) ABSTRACT

Disclosed is a method, a device, a system and/or a manufacture of scalable evaluation of existence of one or more conditions based on application of one or more evaluation tiers. In one embodiment, a system includes a network, a coordination server, and a condition profile server storing an evaluation criteria data for determining existence of one or more conditions. An evaluation request agent receives a condition data indicating the existence of the conditions. A condition evaluation engine for coordinating evaluation of the conditions may include a tier allocation routine that selects a first evaluation tier, generates an evaluation query, and upon receipt of a determination value, selects a second evaluation tier for re-evaluation and/or performs one or more response actions. The evaluation tiers may include, for example, an automated evaluation, an artificial neural network evaluation, a peer evaluation, a panel evaluation, and/or a non-peer (e.g., expert) evaluation.

20 Claims, 20 Drawing Sheets

(52) U.S. Cl.
CPC . G06Q 10/06393 (2013.01); G06Q 10/06398 (2013.01); *G06Q 2220/00* (2013.01)

(58) Field of Classification Search
CPC ............... G06Q 2220/00; G06Q 50/01; G06Q 30/0282; G06Q 50/182; G06Q 20/02; G06N 3/02
See application file for complete search history.

(56) References Cited

U.S. PATENT DOCUMENTS

| | | | | |
|---|---|---|---|---|
| 2019/0378227 | A1* | 12/2019 | Vanzetta | G06Q 20/02 |
| 2020/0051041 | A1* | 2/2020 | Ko | H04L 9/3239 |
| 2020/0257943 | A1* | 8/2020 | Huber | G06F 40/40 |
| 2020/0334772 | A1* | 10/2020 | Gorodeisky | G06Q 50/182 |
| 2020/0372505 | A1* | 11/2020 | Turgman | G06Q 20/0658 |
| 2021/0035287 | A1* | 2/2021 | Kim | G06N 3/08 |
| 2021/0049717 | A1* | 2/2021 | Li | H04L 9/50 |
| 2021/0279644 | A1* | 9/2021 | Givental | G06F 18/2321 |

OTHER PUBLICATIONS

Michael Buchwald, Smart Contract Dispute Resolution: The Inescapable Flaws of Blockchain-Based Arbitration, 168 U. PA. L. REV. 1369 (2020). (Year: 2020).*

Marrow, Paul Bennett, et al. "Artificial Intelligence and Arbitration: The Computer as an Arbitrator—Are We There Yet?" Dispute Resolution Journal, vol. 74, No. 4 (Oct. 2020): 35-76. (Year: 2020).*

Michaelson, Peter. "Arbitrating disputes involving blockchains, smart contracts, and smart legal contracts." Dispute Resolution Journal 74.4 (2020): 89-133. (Year: 2020).*

Appen. "What is Human-in-the-Loop Machine Learning?" Appen online, Jan. 15, 2019 (last accessed on Aug. 28, 2024 at https://www.appen.com/blog/human-in-the-loop). (Year: 2019).*

Culotta, Aron, et al. "Corrective feedback and persistent learning for information extraction." Artificial Intelligence 170.14-15 (2006): 1101-1122. (Year: 2006).*

English-language translation of CN-112712120-A to Jiang. (Year: 2006).*

* cited by examiner

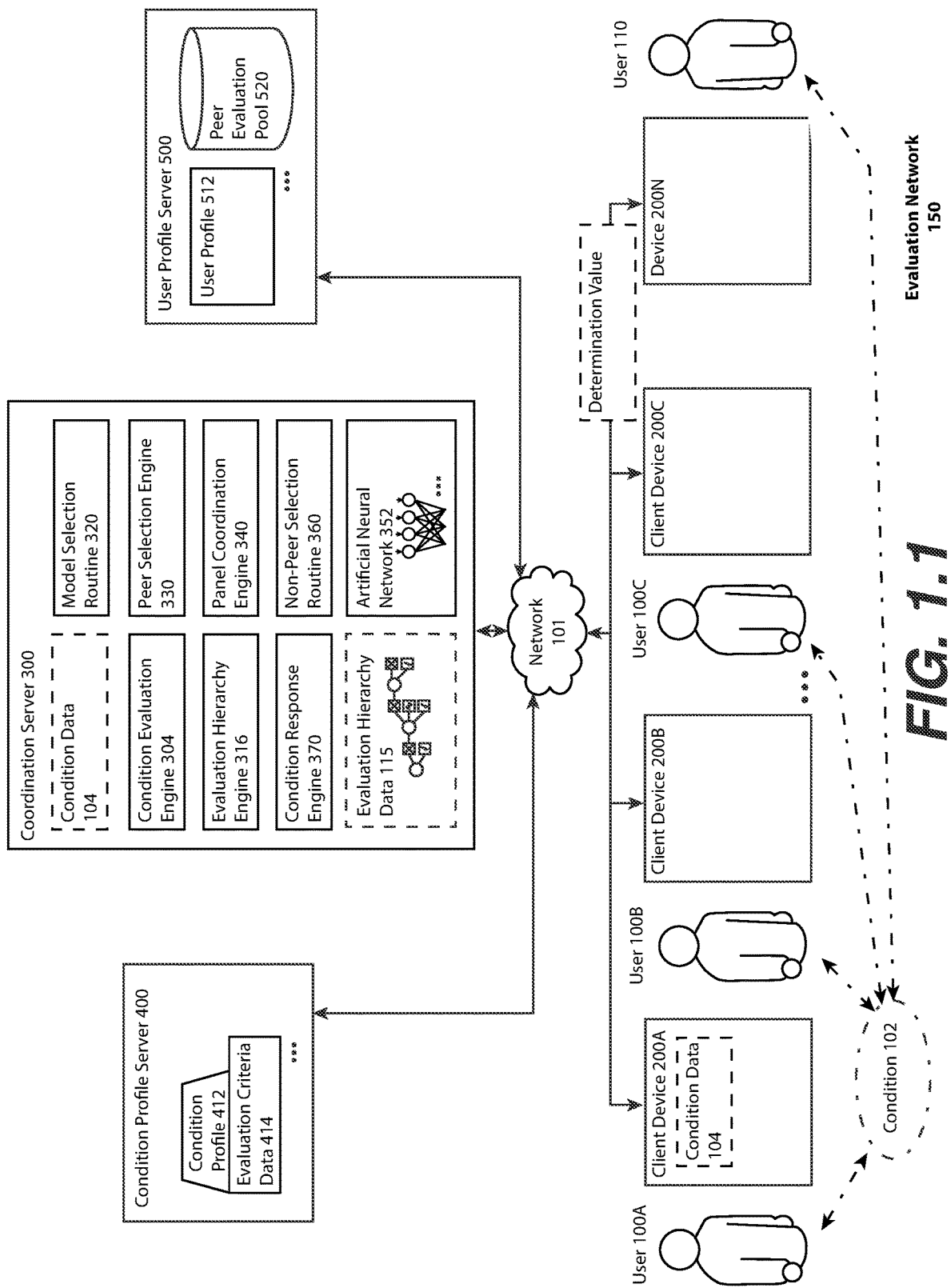
FIG. 1.1

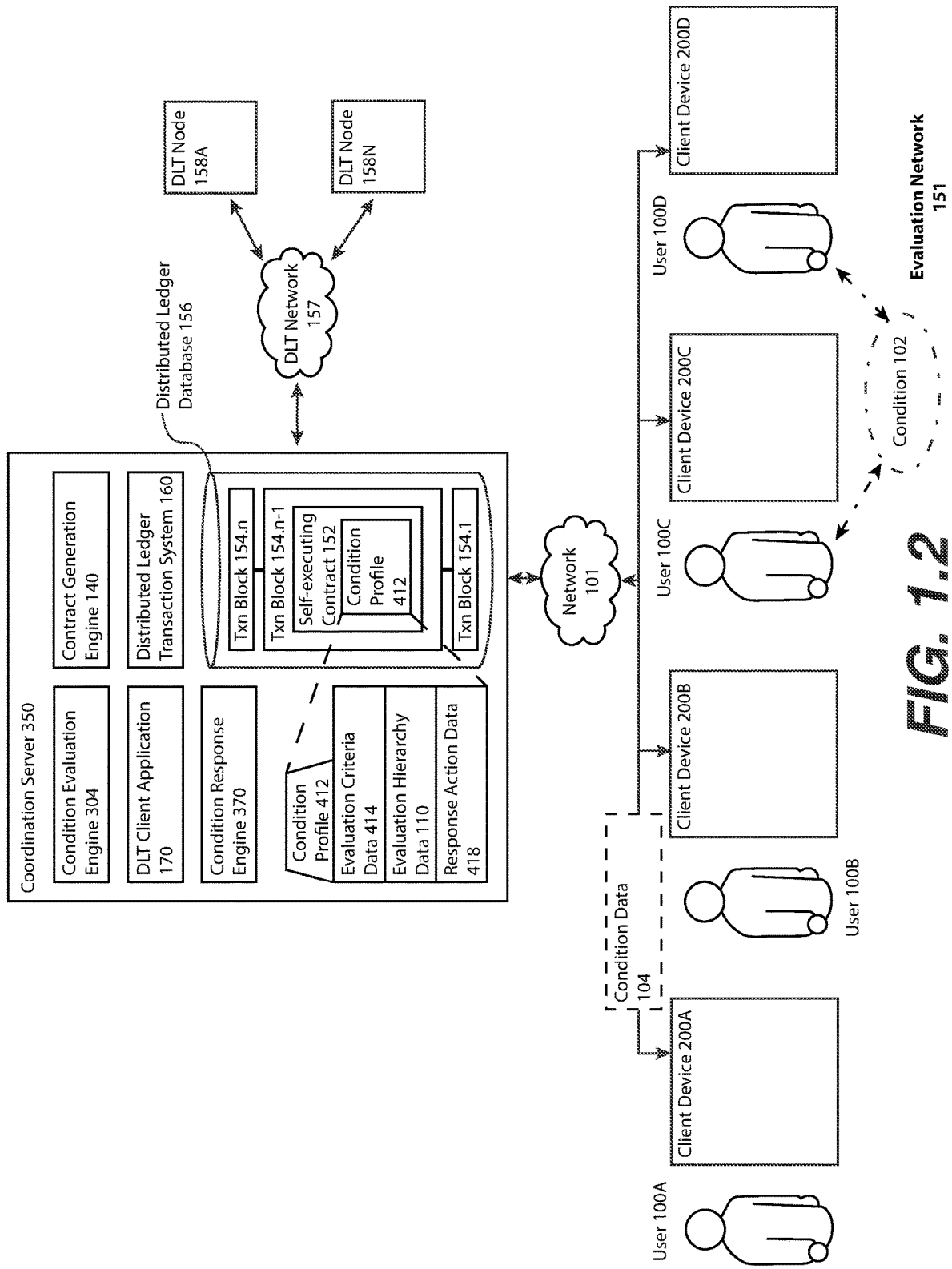
FIG. 1.2

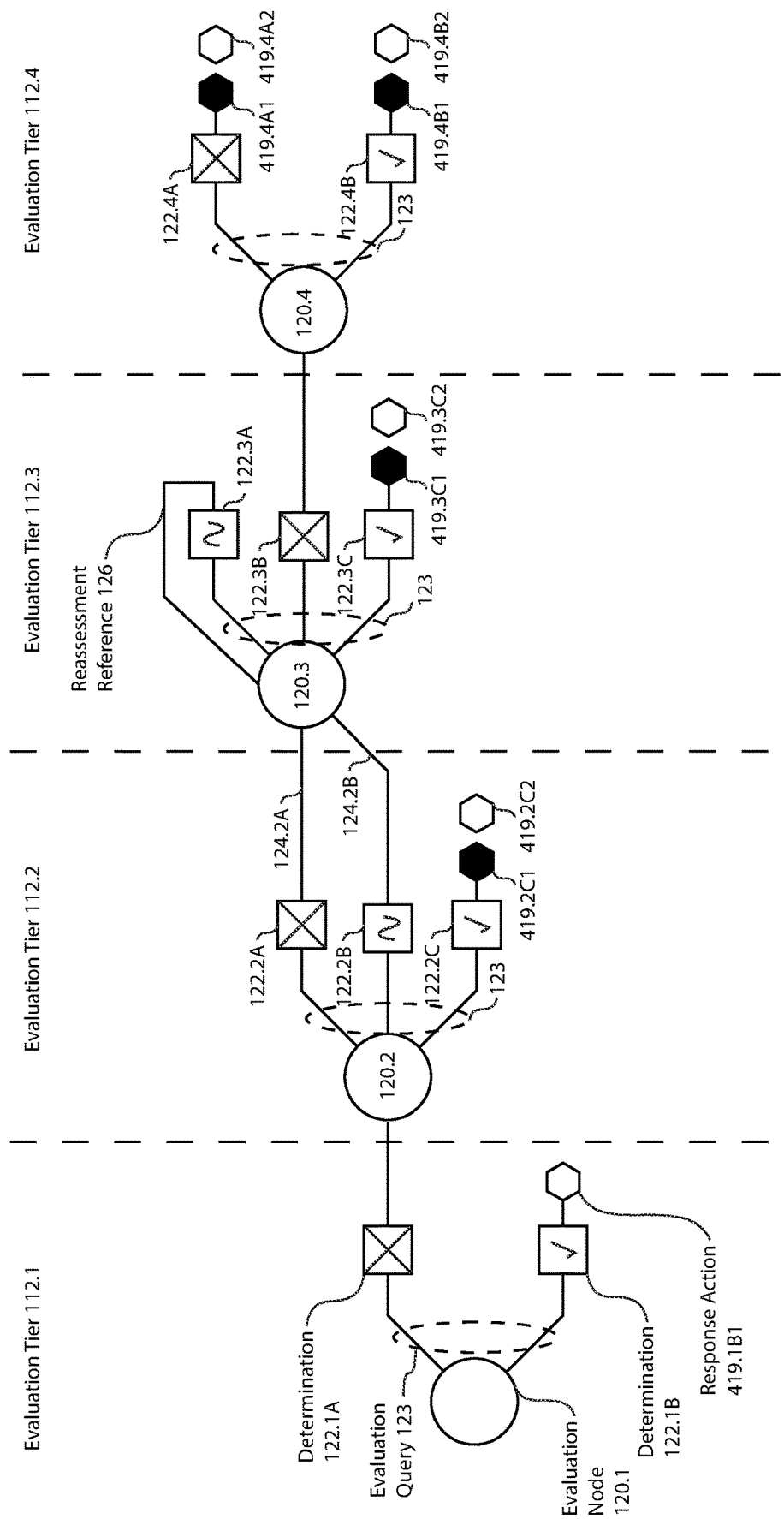
FIG. 1.3

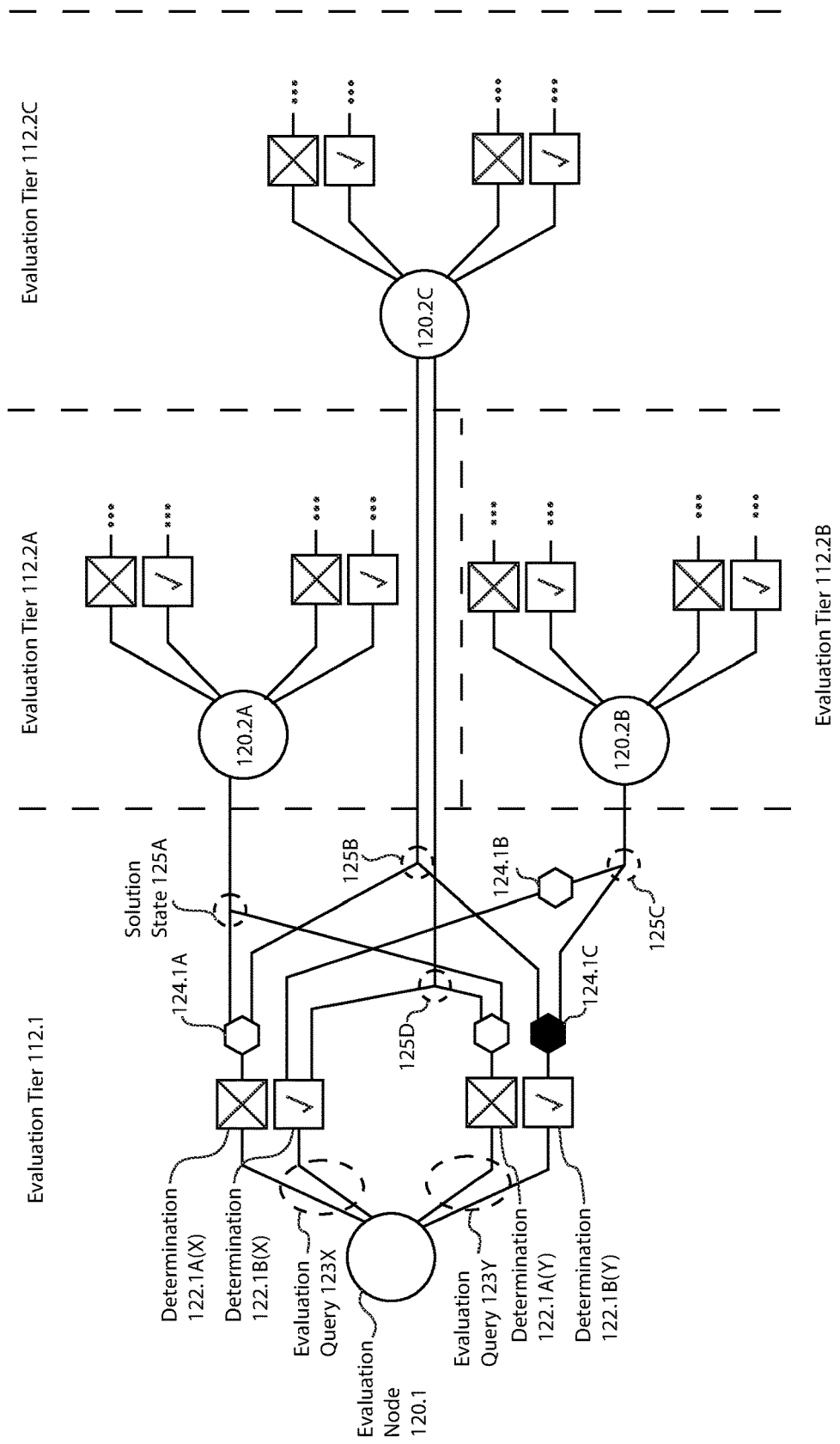
FIG. 1.4

*FIG. 7*  Condition Evaluation Process Flow 750

Peer Evaluation
Process Flow 850

FIG. 9  Panel Evaluation Process Flow 950

FIG. 10  Automated Evaluation Process Flow 1050

FIG. 11  Non-Peer Evaluation Process Flow 1150

FIG. 12  Artificial Neural Network Process Flow 1250

Account Action Process Flow 1350

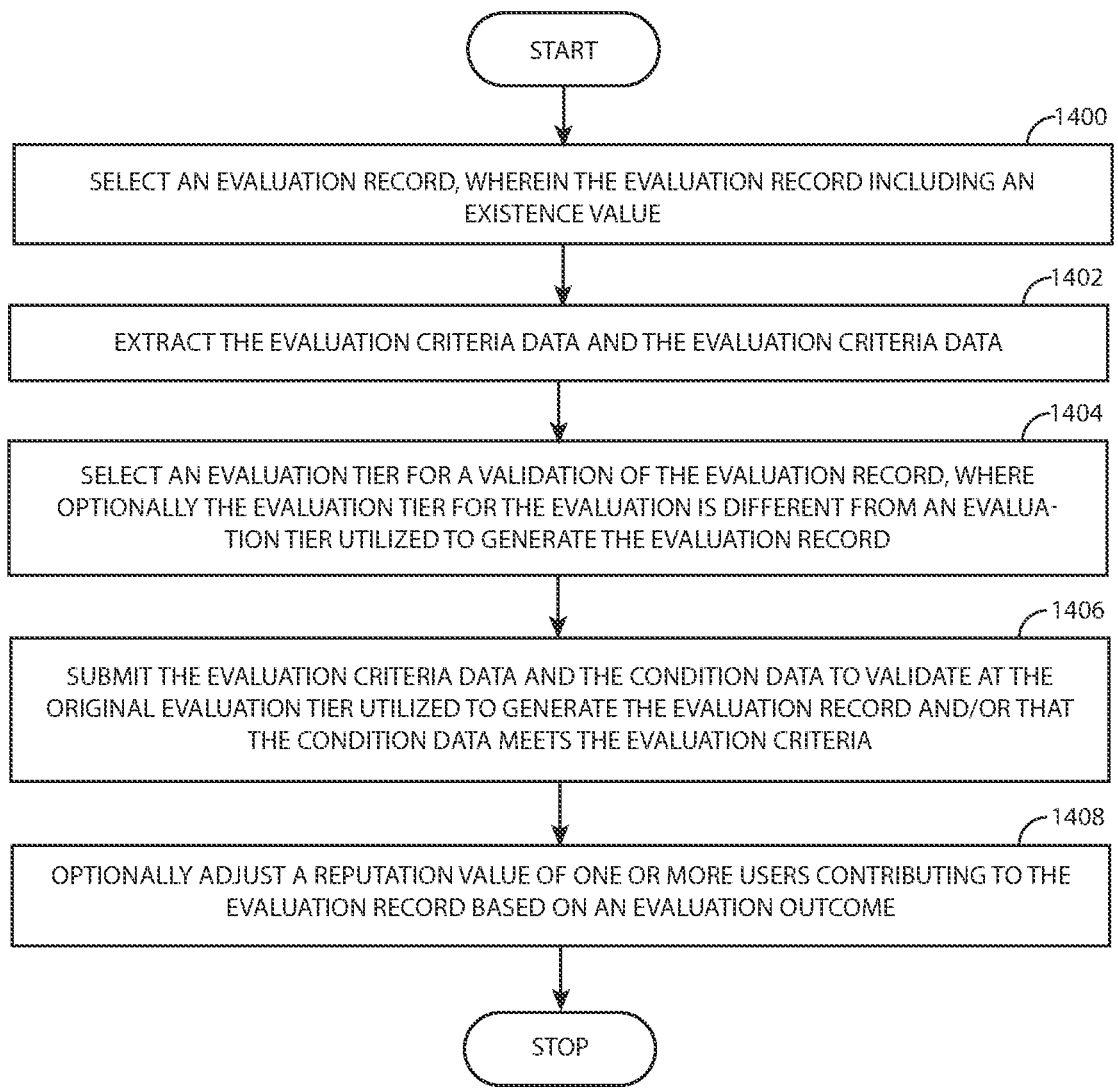
FIG. 14 — Evaluation Verification Process Flow 1450

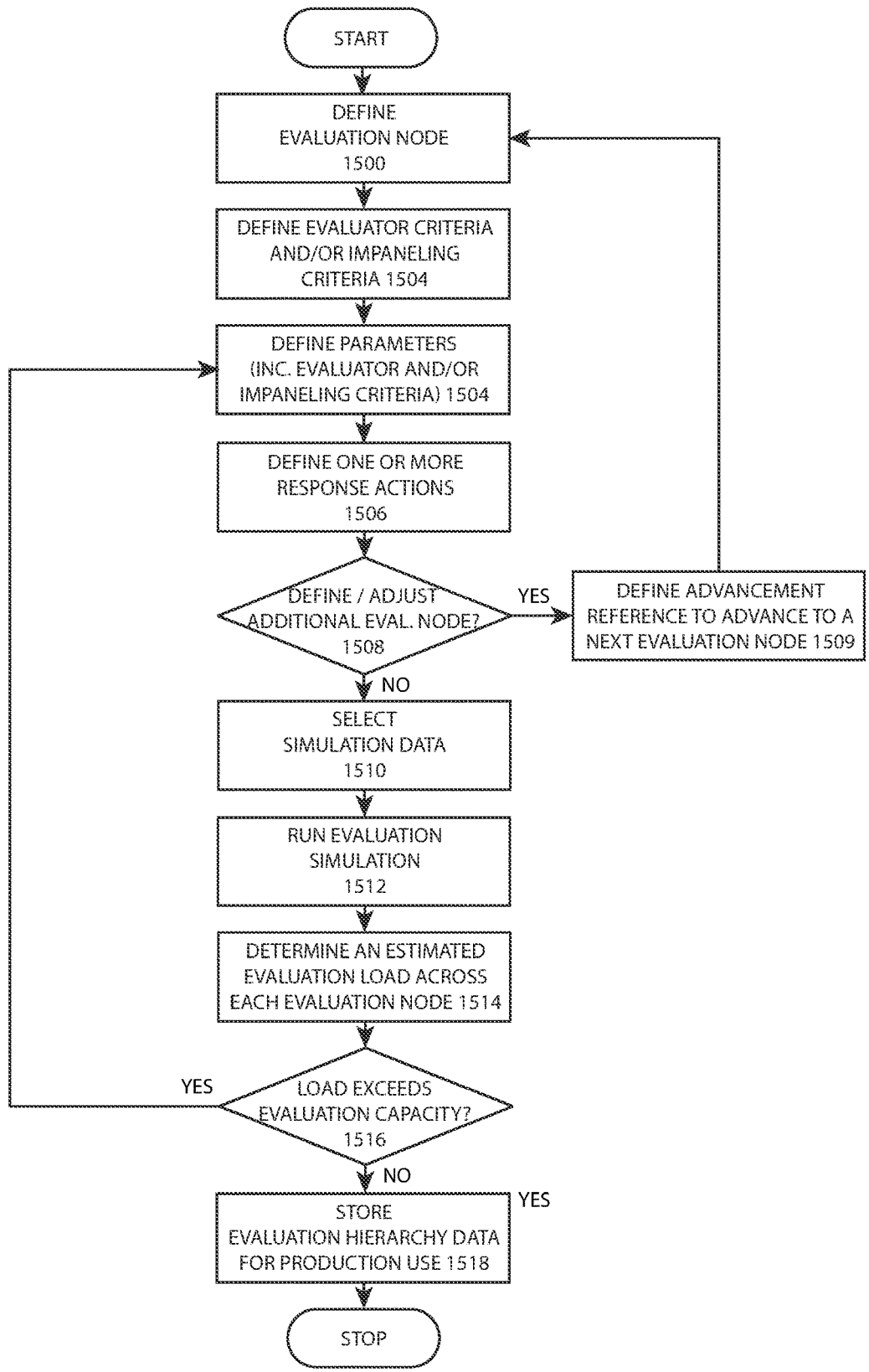
*FIG. 15* Evaluation Hierarchy Data Structure Assembly Process Flow 1550

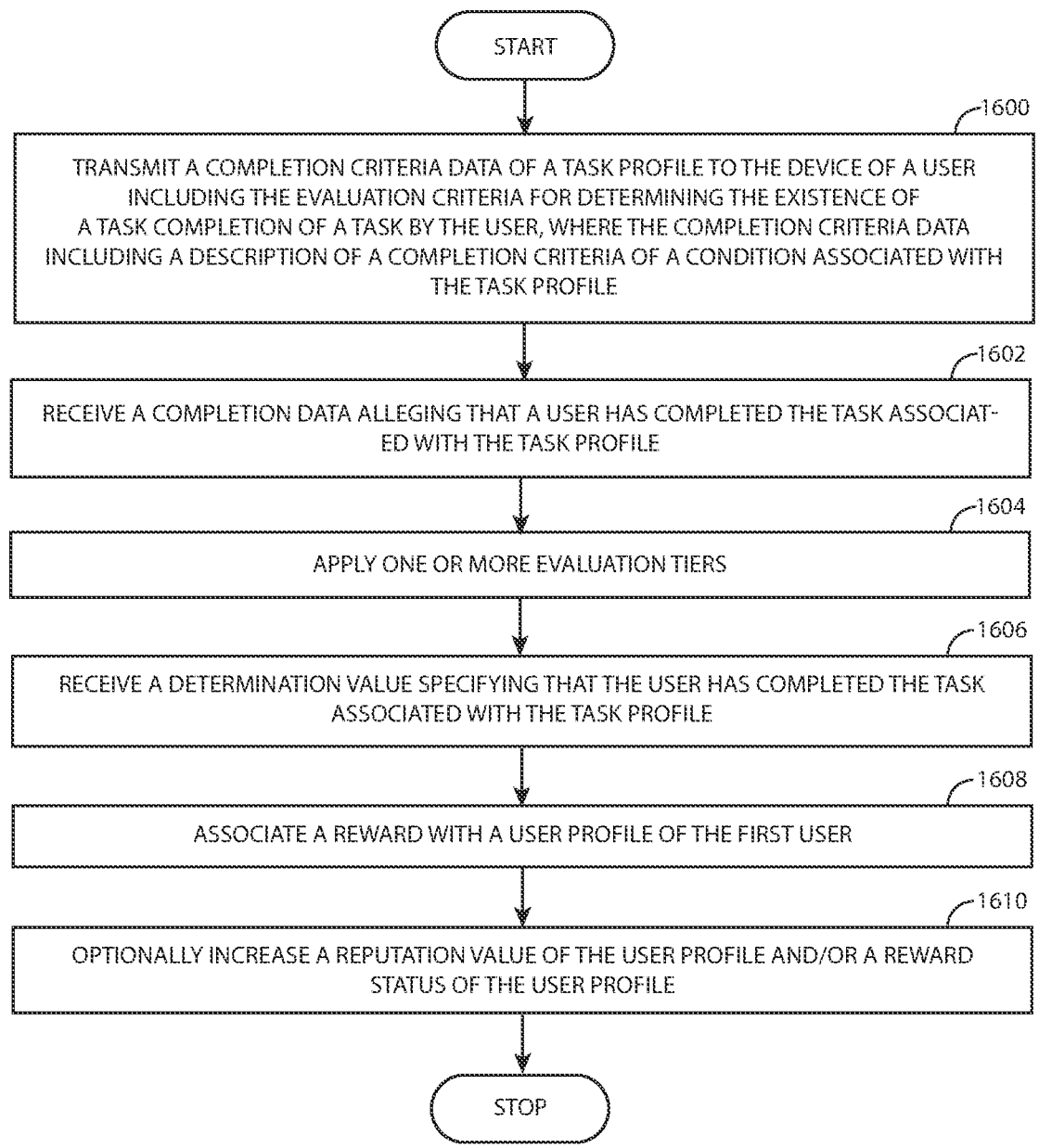
FIG. 16  Task Completion Evaluation Process Flow 1650

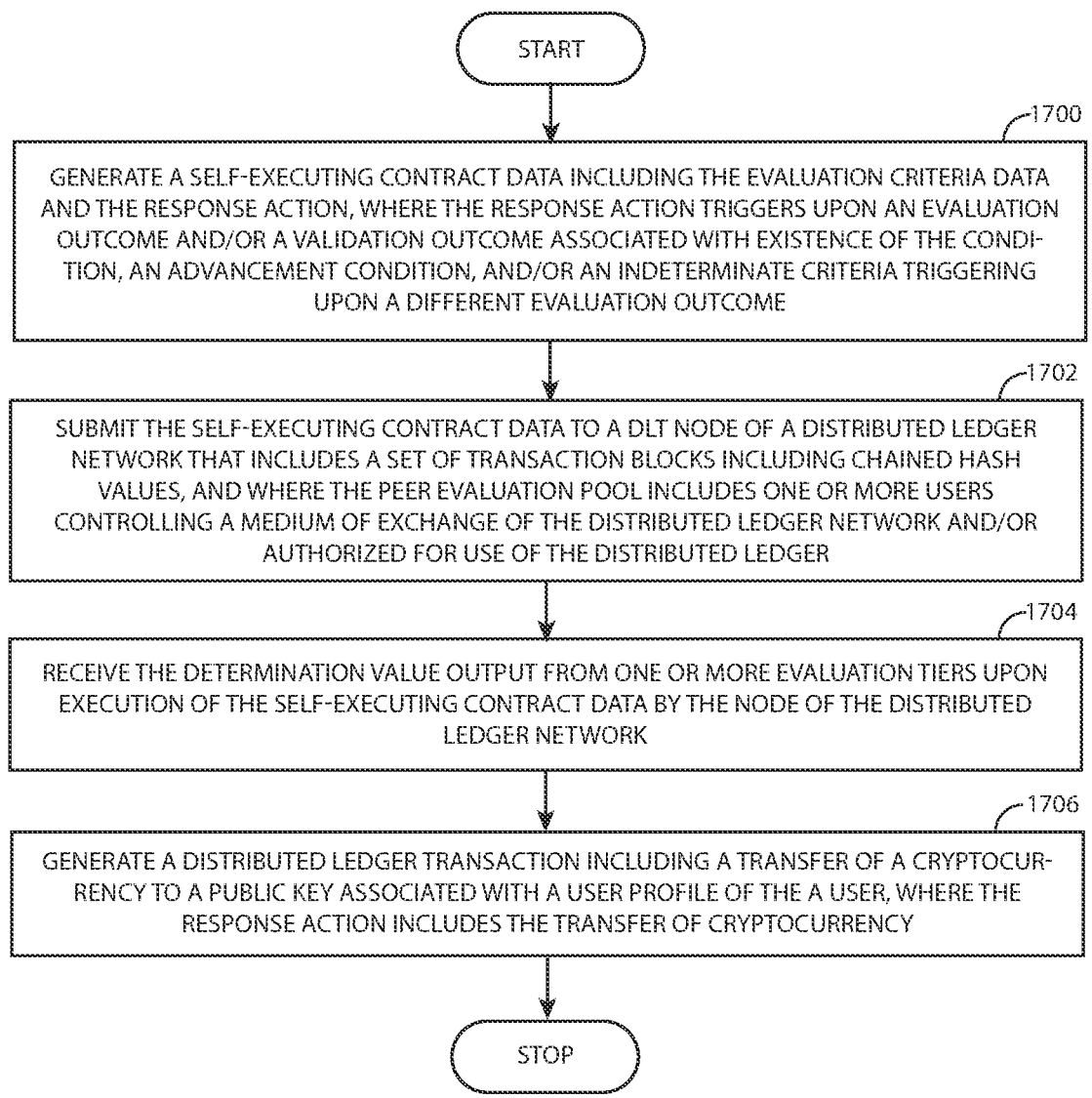
FIG. 17  Evaluation Contract Generation Process Flow 1750

SCALABLE EVALUATION OF THE EXISTENCE OF ONE OR MORE CONDITIONS BASED ON APPLICATION OF ONE OR MORE EVALUATION TIERS

FIELD OF TECHNOLOGY

This disclosure relates generally to data processing devices and, more particularly, to a method, a device, and/or a system of scalable evaluation of the existence of one or more conditions based on application of one or more evaluation tiers.

BACKGROUND

It can be difficult to determine whether a condition exists and/or which condition exists. For example, the condition may be whether a person has performed a specific act, whether a work product conforms to the standards of a contract, when an event occurred, whether a fact exists, or the nature, extent, quality, and/or quantity of a real-world object or digital object (such as dataset or computer application). The existence of the condition and its evaluation may have economic value or other importance to an individual or organization (e.g., an enterprise, a non-profit organization, a government). For example, the evaluation may be important in determining compliance with contracts or agreements between two or more parties, administering and participating in contests, providing games and entertainment, resolving legal disputes, creating auditable records of significant events, and other important fact-finding and digital documentation functions.

One or more challenges may arise in utilizing technology for evaluating the existence of a condition. It may be difficult for the technology to adapt to changing circumstances, for example where the nature of the condition is different in each case, or changes over time. For example, it may be difficult to design and/or implement a technology that can assist in evaluating a variety of conditions and/or conditions across several contexts. For some evaluations, there also may be an inverse relationship between (i) accuracy, and (ii) the time and/or overhead in computing resources and human resources utilized in rendering the evaluation. Similarly, it may be difficult to match the correct level technological verification and desirable accuracy to the economic value or other importance of the determination. Where input from persons may be involved in the evaluation, subjective input may be vulnerable to abuse and/or arbitrary inputs. It may also be difficult to scale and/or increase the capacity for evaluations as the number of evaluations rises, including in cases where evaluations with human input are balanced with automated evaluations. Failure of an evaluation process to scale can cause a lack of consistency and/or loss of quality control.

Each of these challenges may be of concern to an organization with a financial and/or reputational interest in providing an efficient and accurate evaluation process. There is a continuing need for technologies that efficiently assist in evaluating whether a condition exists and/or what condition exists, including the fair and/or accurate nature of the evaluation.

SUMMARY

Disclosed are a method, a device, and/or a system of scalable evaluation the of the existence of one or more conditions based on application of one or more evaluation tiers.

In one embodiment, a system for evaluating existence of a condition includes a condition profile server, a coordination server, and a network communicatively coupling the condition profile server and the coordination server. The condition profile server may include a memory storing a condition profile. The condition profile includes an evaluation criteria data describing an evaluation criteria for determining existence of one or more conditions.

A coordination server includes an evaluation request agent comprising computer readable instructions that when executed receive a condition ID associated with the condition profile, receive a condition data indicating the existence of one or more conditions, and extract the evaluation criteria data from the condition profile. A condition evaluation engine coordinating evaluation of the existence of the one or more conditions may include a tier allocation routine comprising computer readable instructions that when executed select a first evaluation tier to evaluate the condition data, and, upon receipt of a determination value, select a second evaluation tier for further evaluation of the condition data and for validation of the first evaluation tier.

A peer selection routine included as part of the coordination server includes computer readable instructions that when executed select a user ID of a second user associated with a peer evaluation pool, generate an evaluation query comprising the evaluation criteria data and the condition data, and transmit the evaluation query to a device of the second user. The coordination server may further include an evaluation receipt agent including computer readable instructions that when executed receive a determination value of the second user in response to the evaluation query, and call the condition evaluation engine for determination of selection of a second evaluation tier.

The coordination server may include an evaluation recordation subroutine comprising computer readable instructions that when executed generate an evaluation record comprising a user ID of the first user, the user ID of the second user, the determination value of the second user, the one or more condition IDs, and/or the evaluation criteria.

The condition evaluation engine may further include computer readable instructions that when executed receive an existence value generated by a selection of the second user that the condition data meets the evaluation criteria for determining the existence of at least one of the one or more conditions. The coordination server may further include a condition response engine that includes computer readable instructions that when executed initiate a response action associated with the condition profile. The coordination server further may further include a condition completion subroutine comprising a condition response engine comprising computer readable instructions that when executed associate the one or more existence values, the user ID of the first user, and/or the one or more condition IDs of the one or more conditions in a database.

The one or more determination values may include one or more first non-existence values. The coordination server may further include a panel qualification subroutine comprising computer readable instructions that when executed: (i) reference an impaneling criteria data specifying a criteria for a group of users to collectively act as an evaluator of the condition data and/or a validator of the first evaluation tier, and (ii) determine a set of two or more user IDs of a set of two or more users associated with the peer evaluation pool each meet an evaluator criteria and collectively meet the panel criteria. The evaluator criteria may include a reputation value of a user profile of a user, a first number of validation events, a second number of validation events with matching outcomes from the different evaluation tier, and/or an account type of a user profile of the user. The impaneling criteria data may include a number of users, and/or a combined reputation score. The coordination server may include a panel coordination engine comprising computer readable instructions that when executed (i) assemble a panel session comprising the set of two or more user IDs; (ii) transmit the evaluation criteria data and the condition data to a device associated with each of the two or more users of the panel session; (iii) receive one or more determination value of each of the two or more users of the panel session; (iv) determine a quorum meeting the criteria for the group; and/or (v) generate one or more second non-existence value based on one or more second determination value received from the two or more users of the panel session.

The coordination server may further include (i) computer readable instructions that when executed select a fourth evaluation tier and/or (ii) a non-peer selection routine comprising computer readable instructions that when executed: determine a user ID of a fourth user associated with a non-peer evaluation pool, transmit the evaluation criteria data and the condition data to a device associated with the user ID of the fourth user, and receive one or more third non-existence values generated by a selection of the fourth user that the condition data fails to meet the evaluation criteria for determining the existence of at least one of the one or more conditions.

The coordination server may further include an artificial neural network that includes a plurality of input nodes of the artificial neural network, and a machine learning engine comprising computer readable instructions that when executed train an artificial neural network with a training data comprising a set of evaluation records, a set of one or more evaluation criteria data, and a set of one or more determination values. The condition evaluation engine may further include (i) computer readable instructions that when executed select a fifth evaluation tier and (ii) a model selection routine comprising computer readable instructions that when executed select the artificial neural network. An ANN execution routine of the coordination server may include computer readable instructions that when executed input the condition data into the artificial neural network and generate one or more determination values of the artificial neural network. The machine learning engine may further include computer readable instructions that when executed: feed back one or more determination values from a different evaluation tier as an additional instance of the training data, and adjust one or more weight values associated with one or more nodes of the artificial neural network.

The coordination server may include a record verification engine that includes computer readable instructions that when executed select the evaluation record from a database of evaluation records (the evaluation record may include one or more existence values), extract the evaluation criteria data and the condition data, and select a new evaluation tier for validation of the evaluation record. The new evaluation tier for the evaluation may be different from an original evaluation tier utilized to generate the evaluation record. The record verification engine may also include computer readable instructions that when executed submit the evaluation criteria data and the condition data to validate (i) the original evaluation tier utilized to generate the evaluation record, and/or (ii) that the condition data meets the evaluation criteria for one or more conditions.

An outcome notification subroutine of the coordination server may include computer readable instructions that when executed generate a notification for the first user that the condition data has been assigned the one or more first non-existence values. The coordination server may also include an account action routine that includes computer readable instructions that when executed initiate one or more account actions. A first account action may be, for each determination value generated by an evaluator in reference to the condition profile, to decrease a reputation value of a user profile of the first user based on a ratio of a set of non-existence values and a set of existence values generated by the panel session. A second account action may be to increase a reputation value of a user profile of the second user.

The coordination server may include a hierarchy assembler comprising computer readable instructions that when executed generate an evaluation hierarchy that includes two or more evaluation nodes each associated with an evaluation tier. A first evaluation node of the two or more evaluation tiers may store an advancement reference for advancement of the evaluation to a second evaluation node of the two or more evaluation nodes. The coordination server may also include a load simulation routine comprising computer readable instructions that when executed: (i) determine an estimated evaluation load on each of the two or more evaluation nodes; (ii) determine the estimated evaluation load on the fourth evaluation tier associated with the non-peer evaluation pool exceeds an evaluation capacity of the non-peer evaluation pool; and (iii) adjust the evaluator criteria data, the impaneling criteria data, and/or the evaluation hierarchy by adding one or more additional evaluation nodes.

A contract generation engine of the coordination server may include computer readable instructions that when executed generate a self-executing contract comprising the evaluation criteria data, a response action data triggering one or more response actions upon an evaluation outcome and/or a validation outcome associated with the existence of one or more conditions, and the advancement reference. A distributed ledger transaction system includes computer readable instructions that when executed submit the self-executing contract to a node of a distributed ledger networks comprising a set of transaction blocks comprising chained hash values and then generate, in response to a call from the reward routine, a distributed ledger transaction comprising a transfer of a cryptocurrency to a public key associated with a user profile of the fifth user.

The coordination server may still further include a task evaluation engine comprising computer readable instructions that when executed transmit the evaluation criteria data to the computing device of the first user comprising the evaluation criteria for determining the existence of one or more conditions. The condition profile may be a task profile, the conditions may involve a task completion of a task, degrees of completion of the task, and/or qualities of completion of the task by the first user. The task evaluation engine may include computer readable instructions that when executed: (i) receive one or more condition IDs associated with the condition profile from the computing device of a first user (where the evaluation criteria data may include a completion criteria data), (ii) transmit the completion criteria data to the computing device of the first user comprising a description of a completion criteria of each of the conditions associated with one or more condition IDs, and (iii) receive a completion data alleging that the first user has completed the one or more tasks associated with the condition IDs, or alleging that, for each of one more tasks associated with a condition ID, the first user has completed said task to a certain degree or with a certain degree of quality. The response action may be associating one or more rewards with the user profile of the first user.

In another embodiment, a method for evaluating existence of one or more conditions includes receiving one or more condition IDs associated with a condition profile comprising an evaluation criteria data describing an evaluation criteria for determining existence of the one or more conditions and receiving a condition data indicating the existence of at least one of the one or more conditions. The condition data is received from a device of a first user alleging existence of the one or more conditions. The method extracts the evaluation criteria data from the condition profile and selects a first evaluation tier to evaluate the condition data, along with selecting a user ID of a second user associated with a peer evaluation pool. An evaluation query includes the evaluation criteria data and the condition data. The method transmits the evaluation query to a device of the second user, and receives one or more determination values of the second user in response to the evaluation query. An evaluation record includes a user ID of the first user, the user ID of the second user, the one or more determination values of the second user, the one or more condition IDs, and/or the evaluation criteria. The method then selects a second evaluation tier for further evaluation of the condition data and for validation of the first evaluation tier.

In yet another embodiment, a device includes an evaluation request agent including computer readable instructions that when executed receive one or more condition IDs associated with a condition profile comprising an evaluation criteria data describing an evaluation criteria for determining existence of a set of one or more conditions and extract the evaluation criteria data from the condition profile. A condition evaluation engine of the computing device includes coordinating evaluation of the existence of the one or more conditions comprising a tier allocation routine comprising computer readable instructions that when executed select a first evaluation tier to evaluate the condition data.

The computing device may include a peer selection routine comprising computer readable instructions that when executed select a user ID of a first user associated with a peer evaluation pool, generate an evaluation query for each of the one or more conditions comprising the evaluation criteria, and transmit the evaluation query to a device of the first user. An evaluation receipt agent of the computing device may include computer readable instructions that when executed: i) receive from the first user a first solution state comprising a set of determination values for each of the one or more conditions in response to the evaluation query, and (ii) call the condition evaluation engine for determination of selection of a second evaluation tier. An evaluation recordation subroutine includes computer readable instructions that when executed generate an evaluation record that includes a user ID of the first user, the user ID of the first user, the one or more determination values of the first user, the solution state, and/or the one or more condition IDs. The computing device is communicatively coupled to a network.

In some embodiments wherein a condition profile or a condition ID involves two or more conditions, there may be a determination value uniquely associated with each condition (e.g. one determination value indicating existence or non-existence for each condition). Each determination value may lead to one or more different response actions. For example, a determination value indicating existence of a condition that is "cold weather" may be associated with a response action that provides a user with a voucher for hot apple cider, another determination value indicating existence of a condition that is "moderate weather" may be associated with a response action that provides a user with a voucher for a glass of wine, another determination value indicating existence of a condition that is "hot weather" may be associated with a response action that provides a user with a voucher for a cold soda, another determination value indicating existence of a condition that is "sunny skies" provides a user with a voucher for sunscreen, and yet another determination value indicating existence of a condition that is "rain" provides a user with a voucher for an umbrella. Note that some of these example conditions are intentionally mutually exclusive, while others are intentionally not (e.g. the conditions "moderate weather" and "sunny skies" can both be simultaneously true and therefore the one or more response actions associated with each can occur as a result of the evaluation).

Alternatively, each possible set of possible determination values may lead to a different, singular determination and therefore one or more different response actions. For example, one set of determination values may indicate existence of a condition that is a photograph containing a picture of an animal, existence of a condition that is said photograph was taken in the town of Phoenix, AZ, and existence of a condition that is the animal in said photograph is a rattlesnake. This set of determination values may lead to a singular determination with an associated response action that provides the user who took said photograph with a voucher for a free lunch. Another set of determination values may indicate existence of a condition that is a photograph containing a picture of an animal, existence of a condition that is said photograph was taken in the town of Phoenix, AZ, and non-existence of a condition that is the animal in said photograph is a rattlesnake. This alternative set of determination values may lead to another singular determination with an alternative associated response action that provides the user who took said photograph with a voucher for a free drink.

BRIEF DESCRIPTION OF THE DRAWINGS

The embodiments of this disclosure are illustrated by way of example and not limitation in the figures of the accompanying drawings, in which like references indicate similar elements and in which:

FIG. 1.1 illustrates an evaluation network in which one or more conditions may be evaluated by one or more tiers of an evaluation hierarchy to provide an efficient and/or accurate evaluation of the existence of the one or more conditions and which may be used to document the one or more conditions and/or carry out one or more response actions, according to one or more embodiments.

FIG. 1.2 illustrates another instance of the evaluation network in which a condition profile for specifying data usable for evaluating the one or more conditions may be stored in a self-executing contract (e.g., a "smart contract") in a distributed ledger database and evaluated by a DLT node, according to one or more embodiments.

FIG. 1.3 illustrates an evaluation hierarchy data comprised of a set of tiers for defining a tiered evaluation process in which a node defining the evaluation process at each evaluation tier may have defined one or more determination values leading to one or more response actions, and optionally one or more advancement references leading to a next evaluation tier, according to one or more embodiments.

FIG. 1.4 illustrates another evaluation hierarchy data illustrating multiple queries, each comprising one or more determinations, and a combination of determinations comprising a solution state, with different solution states each leading to one or more alternative evaluation tiers, according to one or more embodiments.

FIG. 14 illustrates an evaluation verification process flow, according to one or more embodiments.

FIG. 15 illustrates an evaluation hierarchy data structure assembly process flow, according to one or more embodiments.

FIG. 16 illustrates a task completion evaluation process flow, according to one or more embodiments.

FIG. 17 illustrates an evaluation contract generation process flow, according to one or more embodiments.

Figure 2:
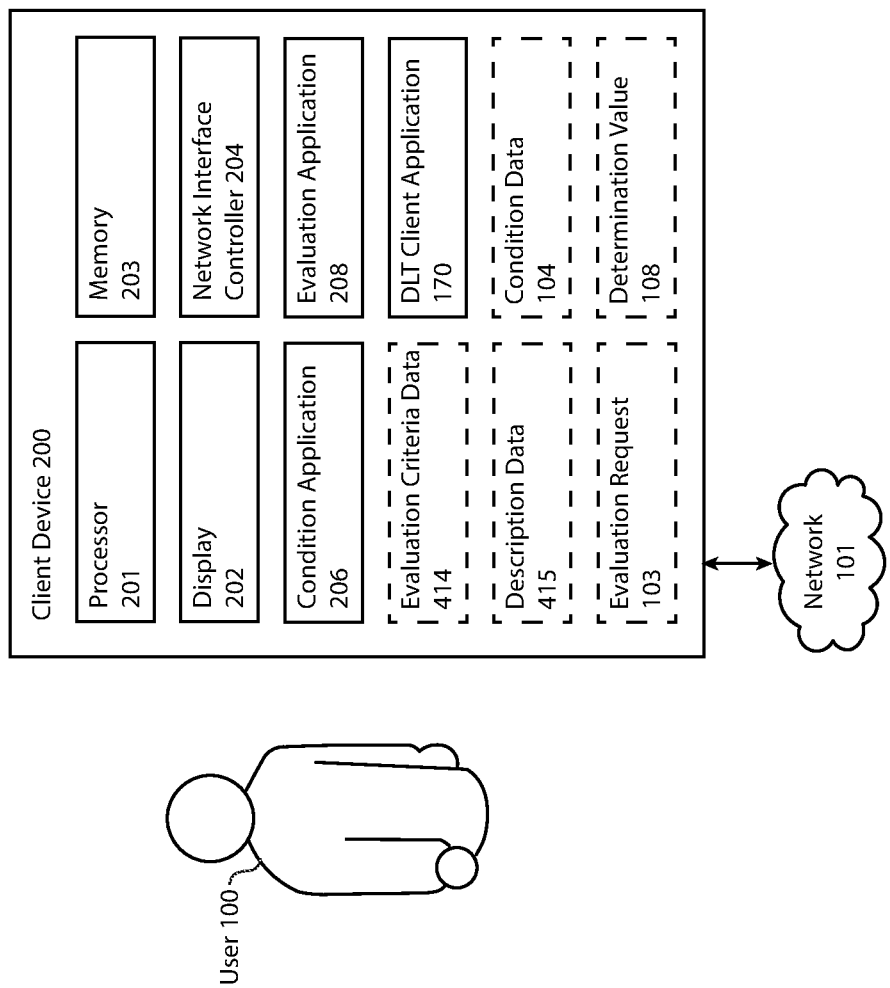
FIG. 2 illustrates a client device usable in generating an evaluation request and/or providing a determination value to assist in a peer evaluation with respect to an evaluation request generated by a different user, according to one or more embodiments.

Other features of the present embodiments will be apparent from the accompanying drawings and from the detailed description that follows.

DETAILED DESCRIPTION

Disclosed are a method, a device, and/or system of scalable evaluation of the existence of one or more conditions based on application of one or more evaluation tiers. Although the present embodiments have been described with reference to specific example embodiments, it will be evident that various modifications and changes may be made to these embodiments without departing from the broader spirit and scope of the various embodiments.

FIG. 1.1 illustrates an evaluation network 150, according to one or more embodiments. The evaluation network 150 may include one or more client devices 200, a coordination server 300, a condition profile server 400, a user profile server 500, and/or a device 200, according to one or more embodiments. The evaluation network 150 and/or each of its components are a technology for assisting in evaluation of one or more conditions 102, including real-world conditions, according to one or more embodiments. As just a few of many possible examples, the one or more conditions 102 may be whether a product or service has met a quality standard, which weather condition is or has occurred at a locality, and/or whether a person performed a specific action as may be required by the terms of a contract to which they are bound or contest in which they are participating.

In one or more embodiments, and the embodiment of FIG. 1, one or more evaluation tiers 112 may be applied to evaluate the existence of the one or more conditions 102. Each of the evaluation tiers 112 may be applied alone or in combination, including structured combinations. Structured combinations may be defined in an evaluation hierarchy data 115, for example as further shown and described in the embodiment FIG. 1.3. Depending on certain determinations and/or evaluation outcomes, different and/or more rigorous evaluations may be affected, including validations of previous evaluations. For a given evaluation tier $112.n$, an evaluation tier $112.n-1$ occurring before may be referred to as an "upstream" evaluation, and an evaluation tier $112.n+1$ may be referred to as a "downstream" evaluation. For example, in the embodiment of FIG. 1.3, the evaluation tier 121.2 may be downstream from the evaluation tier 112.1 and upstream from the evaluation tier 112.3. In one or more embodiments, the evaluation tiers 112 may be configured to be of increasing accuracy as they advance downstream, although sometimes at a higher utilizing of resources and/or time. Throughout the present embodiments, a "re-evaluation" may refer to re-running the same evaluation tier 112.1 that provided an original evaluation, or a different evaluation tier 112.2 re-assessing the result of the original evaluation. Throughout the present embodiments, a "validation" may refer to checking a previous evaluation, for example to ensure its accuracy. In many cases, a re-evaluation may also be utilized to validate. It will be apparent that some re-evaluations are also validations, and some validations may also be re-evaluations.

The evaluation network 150 may include one or more users 100 (shown in FIG. 1 as the user 100A through the user 100C), each of which may interact and/or communicate with one or more components of the evaluation network 150 through the network 101. The network 101 is a communication network, for example a local area network (LAN), a wide area network (WAN), and/or the Internet. A user 100, may for example, may participate in evaluating the one or more conditions 102. The user 100 may be related to or have some control over whether the one or more conditions 102 exists. For example, the user 100 may have been responsible for creating, removing, maintaining, or changing one or more of the one or more conditions 102. Evidence of the one or more conditions 102 may be stored as the condition data 104. For example, the condition data 104 may include a signed document, a photograph, a video, a report, sensor data (e.g., a particulate measurement, an absorption spectrum, etc.), and/or other evidentiary data. However, in one or more embodiments, the one or more conditions 102 may need to be sensed, observed, or otherwise utilized as an input to an evaluation tier 112. For example, a user 100 acting as a peer evaluator, as further described throughout the present embodiments, may need to evaluate facts based on information they must determine independently (e.g., a historical fact, the weather at a particular location, a quality of service as a business, a scientific fact, an engineering opinion or other professional judgement, etc.).

Figure 4:
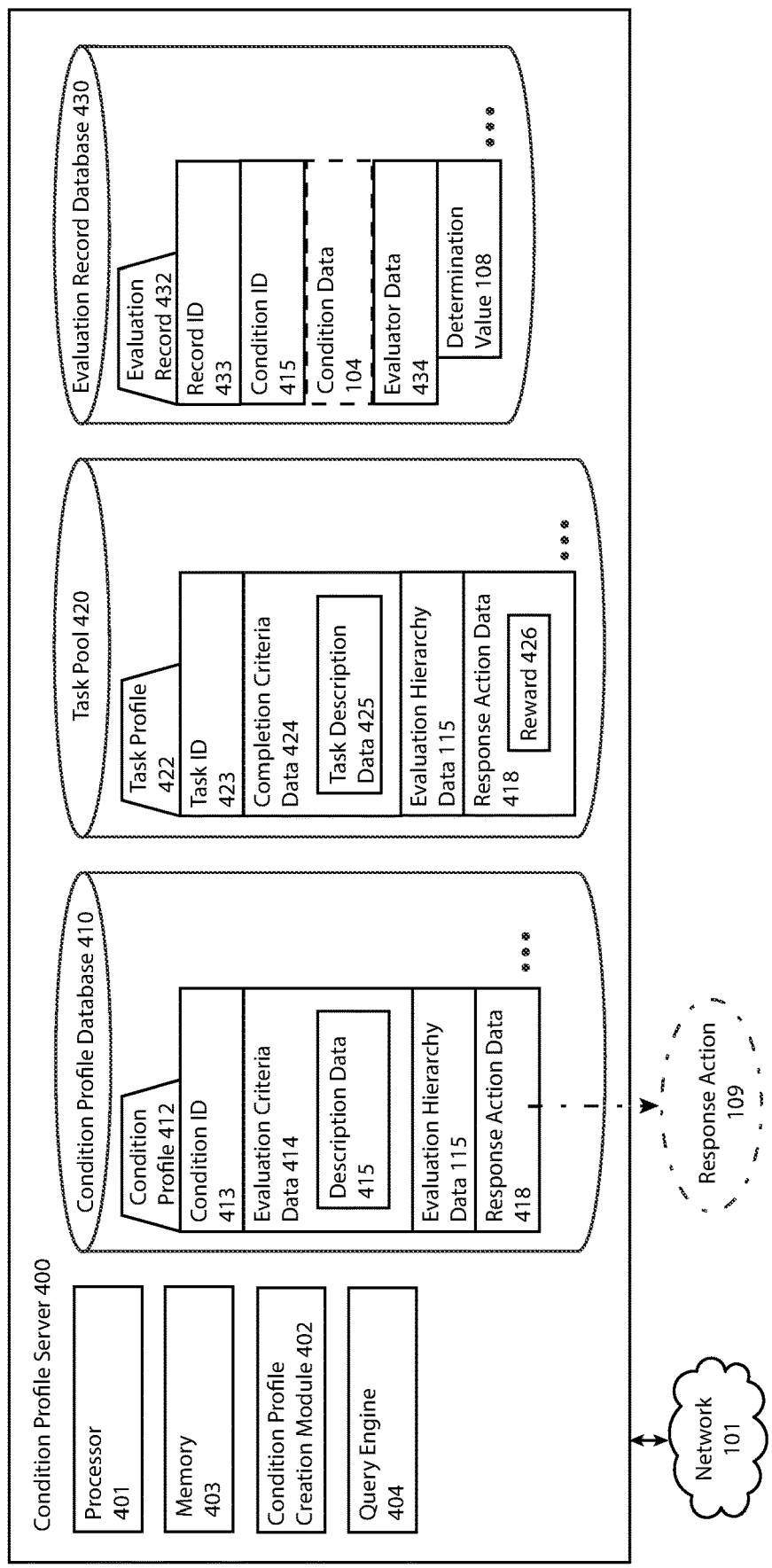
FIG. 4 illustrates a condition profile server comprising a condition profile database storing a condition profile that includes an evaluation criteria data that may comprise a description of each of the one or more conditions to be evaluated, the evaluation hierarchy data, and/or a response action data, the condition profile server optionally including a task pool and an evaluation record database, according to one or more embodiments.

The existence of the one or more conditions 102 (and/or externally derived evidence otherwise utilized by the evaluation tier 112) may be evaluated against an evaluation criteria data 414. The evaluation criteria data 414 may comprise a description data 415 that may be human readable (as shown in FIG. 4), a description of the question and/or query to be evaluated, a photograph and/or video illustrating existence of an analogous condition or set of conditions as a guideline or standard (e.g., the proper assembly of a manufactured part used in inspecting products), a quality scale (e.g., for rating wines), etc.

Figure 3:
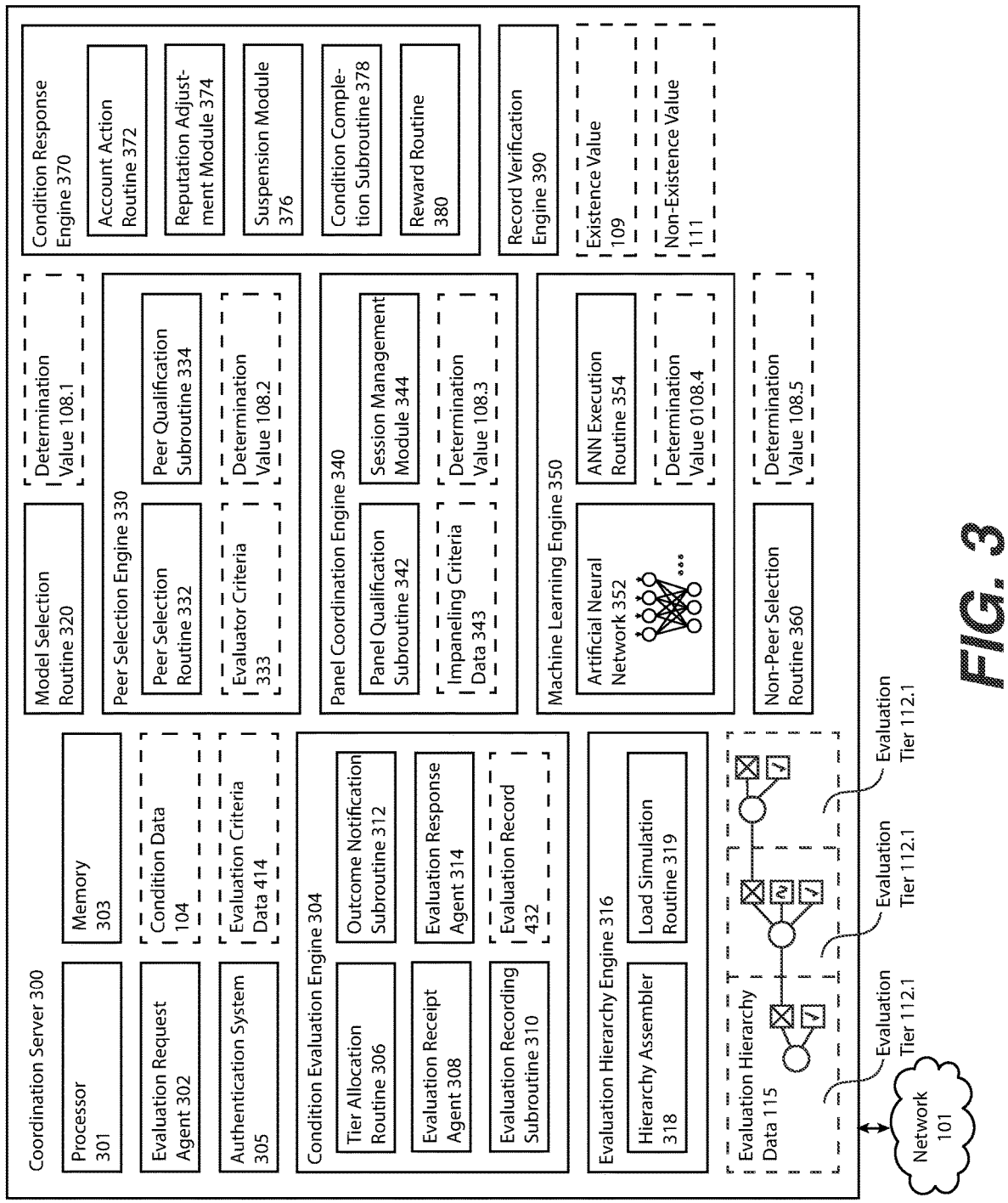
FIG. 3 illustrates a coordination server including a condition evaluation engine for receiving and allocating an evaluation request to one or more evaluation tiers, an evaluation hierarchy engine for defining and simulating evaluation loads across the evaluation hierarchy data illustrated in FIG. 1.3, a condition response engine, and five example evaluation tiers including a model selection routine, a peer selection engine, a panel coordination engine, a machine learning engine, and a non-peer selection routine, according to one or more embodiments.

Each evaluation tier 112 may include an evaluation query (e.g., the evaluation query 123) that is sent out to a computing device for evaluation, the response to which may result in an instance of one or more determination values 108 (e.g., a determination value 108.1, a determination value 108.2, etc., as shown and described in conjunction with the embodiment of FIG. 3). Depending on the structural configuration of the evaluation tiers 112, certain determinations (e.g., a positive determination) may end the evaluation process, while others (e.g., a negative determination) may result in the advancement to additional evaluation tiers 112 to increase certainty as to the result. For example, the one or more determination values 108 may include one or more existence values 109 indicating existence of at least one of the one or more conditions 102, one or more non-existence values 111 indicating non-existence of at least one of the one or more conditions 102, or an indeterminate value indicated an evaluation of at least one of the one or more conditions 102 could not be completed.

In one or more embodiments, the one or more determination values 108 and any metadata related to generation of the one or more determination values 108 may be stored for later use, review, and/or auditing. In one or more embodiments, the one or more determination values 108 and data related to their generation may be stored in an evaluation record 432, as further shown and described in conjunction with the embodiment of FIG. 4.

In one or more other embodiments, the one or more determination values 108 may be utilized to trigger one or more response actions (as may be defined in a response action data 418), including in some cases dispensing resources to a user 100 such as a reward. In some embodiments wherein multiple determinations 122A, 122B, etc. are possible, each of the possible determination values 122A, 122B, etc. may lead to different response actions 109A, 109B, etc. Alternatively, or in addition, both positive and negative actions may be initiated within the evaluation network 150 with respect to an account of the user 100 depending on the outcome of the evaluation. An account action may be initiated related to the proper assertion by a user 100 that one or more conditions 102 exist, and/or a proper evaluation of one or more conditions 102 by the user 100, in order to incentivize efficient and accurate evaluation.

A general example of the operation of the evaluation network 150 will now be described, according to one or more embodiments. A user 100A may wish to have the existence of one or more conditions 102 evaluated. For example, the user 100A may have received an inspection report for a piece of real estate and may need to individually evaluate whether each of the needed repairs listed in the report are "reasonable" under a home purchase agreement, and/or to what degree of reasonableness each requested repair may be. In another example, the user 100 may be participating in a promotional offer of a business that requires taking a photo of the user 100 while dining in a restaurant. In yet another example, the user 100 may be generating scientific data or results for evaluation. The user 100A may generate on the client device 200 the condition data 104 evidencing existence (and/or non-existence) of the one or more conditions 102. The client device 200 is a computing device, such as a smartphone, a tablet device, a laptop computer, and/or a specialized computing device that may include various sensors (e.g., a barcode scanner, a scientific instrument producing data, etc.).

The client device 200 may generate an evaluation request 103 which may include the condition data 104. The evaluation request 103 may also include reference to a condition profile 412, for example one or more condition IDs 413 as shown and described in the embodiment of FIG. 14. The condition profile 412 may preexist generation of the condition data 104. The condition profile 412 further may comprise the evaluation criteria data 414. In one or more embodiments, the condition profile 412 may be set up by a different user 100 and/or by an organization. In one or more alternative embodiments, the user 100A may have set up the condition profile 412.

The condition profile 412 may apply to commonly recurring conditions 102 (e.g., any user 100 visiting a location has "checked in" on a social media platform), rare conditions 102 that might reoccur (e.g., photograph a planet from our solar system occulting a distant nebula with a telescope), or what may be unique conditions 102. The evaluation request 103 may be communicated through the network 101 to the coordination server 300. The coordination server 300 may be a computing device comprising one or more components that coordinate receipt of the evaluation request 103, processing the evaluation request 103, and the assigning of an evaluation process, for example to one or more evaluation tiers 112. The condition evaluation engine 304 may select an evaluation tier 112 and where necessary forward data usable to affect the evaluation to one or more devices communicating over the network 101. The condition evaluation engine 304 is further shown and described in conjunction with FIG. 3 and throughout the present embodiments.

In one or more embodiments, the condition evaluation engine 304 may select from one or more evaluation tiers 112 in order to evaluate the one or more conditions 102. A model selection routine 320 may select one or more automated evaluation processes. For example, where the user 100A submits a set of software code for evaluation as to whether the software code efficiently runs, the model selection routine 320 may determine a software language in which the software code is written and execute the software code and/or testing tools to determine if any errors occur. In another example, the model selection routine 320 may select an artificial neural network 352 proven to recognize the one or more conditions 102 with an acceptable accuracy (e.g., whether a "genuine" photograph has been digitally altered in Adobe® Photoshop®, to what degree a photograph has been digitally altered in Adobe® Photoshop®, or how many genuine, non-digitally added human faces appear in a photograph).

A peer selection engine 330 may be used to select a user 100 as a peer evaluator to evaluate the one or more conditions 102 through a different user 100. For example, the users 100 of the evaluation network 150 may be simultaneously participating in a promotional activity in which they must individually cause the one or more conditions 102 to occur, while also simultaneously evaluating each other's actions. For instance, a user 100A may assert that they have caused the existence of the one or more conditions 102, and a user 100B may evaluate the existence of the one or more conditions 102 and generate one or more determination values 108. "Peers" may be selected, grouped, and/or assembled through analysis of user profiles 512. For example, a peer evaluation pool 520 may be assembled, either prior to the evaluation request 103 and/or dynamically, in order to determine relevant and/or qualified instance of the user 100 to act as a peer for evaluating the one or more conditions 102. As further described in FIG. 3 and FIG. 13, users 100 and/or user 110 may be authenticated and may be subject to a reputation system, according to one or more embodiments, in order to promote integrity and increase accuracy of the evaluation process. Through the present embodiments, a user 100 may also be referred to as a peer evaluator when acting as an evaluator of another user 100, and a panel evaluator (or a peer evaluator of a panel session) when acting as an evaluator of another user 100 as a member of a panel session.

In one or more embodiments, a panel coordination engine 340 may assemble a group of two or more users 100 to act as a panel for evaluating existence of the one or more conditions 102. A number of constraints and/or processes may be additionally defined to increase the accuracy and maintain the integrity of the evaluation process when utilizing the panel coordination engine 340 as further described in conjunction with FIG. 3 and throughout the present embodiments.

A machine learning engine 350 may be selected to apply one or more automated processes to affect the evaluation that include machine learning techniques. For example, an organization may offer a free t-shirt to a user 100 who holds the organization's product in front of the Eifel Tower, as well as a bonus free sweatshirt if the user's 100 photograph also includes at least five friends (an example of the one or more conditions 102). An artificial neural network 352 (which may also be referred to herein as an ANN 352) may be trained through a supervised learning technique in which a dataset of photos for which the one or more condition 102 exists is used to adjust a node-weight of the ANN 352. Following (i) an evaluation using the ANN 352 (and/or other automated process subject to machine learning techniques), and (ii) a re-evaluation by a different evaluation tier 112 confirming the result, the ANN 352 (or other automated process) may be updated to increase the size of the training dataset and therefore likely improve evaluation performance.

The non-peer selection routine 360 may be used to direct the evaluation to a set of what may be referred to as non-peer evaluators (as referred to herein as simply "non-peers"), shown in FIG. 1.1 as the user 110. The non-peer may be selected and/or distinguished as a non-peer through one or more pieces of data stored in the user profile 512, and may be similarly selected from a non-peer evaluation pool 530. For example, the user 100A may be a citizen-scientist evaluating photos taken by an orbital telescope, which may be so numerous that professional scientists have limited ability to review the dataset. Upon determining a certain type of star or natural phenomenon is occurring as an instance of the one or more conditions 102 (e.g., a gravitational lensing), the user 100 may generate the evaluation request 103 comprising the condition data 104. The evaluation request 103 may be processed and forwarded to the user 110, who may be a trained scientist, for evaluation. The condition data 104, for example, may include a screenshot of a relevant portion of the digital photo captured by the orbital telescope. It should be noted that in some evaluation contexts a user 100 may act as a peer evaluator, and in other evaluation contexts the user may act as a non-peer evaluator (e.g., may be the user 110).

In one or more embodiments, an evaluation tier 112 may feed into or "advance" into another evaluation tier 112 (e.g., an evaluation tier 112.1, and evaluation tier 112.2, etc.). A flow of evaluations, and the parameters and resulting response actions of each, may be defined in an evaluation hierarchy data 115, as further shown and described in FIG. 1.3. For example, an evaluation hierarchy may be defined to match the economic value, required certainty, required accuracy, or other important considerations in rendering the evaluation. In one example, a self-regulating industry may be set up such that a safety condition associated with a user 100A from one corporation (e.g., an instance of the one or more conditions 102) is evaluated by a user 100B from another corporation, where all of the one or more determination values 108 having a non-existence value 111, and random instances of the one or more determination values 108 having the existence value 109, are forwarded to the user 110 who may be a representative of a regulatory agency for evaluation (e.g., the Occupational Health and Safety Administration). For example, said OSHA representative may need to evaluate the existence of multiple conditions 102 (e.g. if a fire extinguisher exists near a potential fire hazard, if said fire extinguisher is stored in an area that is easily accessible, if said fire extinguisher was manufactured less than 36 months ago, if the potential fire hazard is separated at least five meters from flammable materials, if a fire alarm lever exists within four meters of the potential fire hazard, etc.) in order to determine if a minimum number of safety precautions (e.g. three) has been met. The evaluation hierarchy engine 316 may be used to define and read the evaluation hierarchy data 115, as further shown and described in the embodiments of FIG. 1.3 and FIG. 3.

The evaluation hierarchy may be designed to accommodate certain evaluation loads (e.g., a quantity, a complexity, and/or data size of the evaluation request 103). In one or more embodiments, evaluation load may be simulated in order to predict performance, as further described in the embodiments of FIG. 3 and FIG. 15.

In one or more other embodiments, the condition data 104 does not need to be initiated by a user 100A and/or asserted by the user 100A. For example the evaluation request 103 may be automatically generated upon a trigger event by the self-executing contract 152 or another automatic process of the coordination server 300. In some cases, none of the users 100 may be responsible for, or have any control over, the occurrence or existence of the one or more conditions 102. In addition, each user 100 may have direct access to the facts or context of the one or more conditions 102 and may not need to receive the condition data 104, as illustrated by the dot-dashed lines of FIG. 1.1.

In some embodiments, a self-executing contract 152 may encompass multiple evaluation requests 103 involving multiple condition profiles 412 (each involving their own response action data 418) that may or may not be independent of one another. For example, a self-executing contract 152 meant to define the terms of a house purchase agreement may involve a condition profile 412 with an associated evaluation request 103 that is only triggered upon the buyer (e.g., a user 100) initiating a contract termination request, wherein the evaluation network may be called upon to determine if certain conditions 102 have been met which will automatically determine whether said buyer receives their earnest money deposit back. Another condition profile 412 may exist within the self-executing contract 152 wherein the evaluation request 103 is only triggered upon a dispute that arises at the close of the inspection period, wherein the response action may affect the purchase price of the house necessary to transfer the title to the buyer (e.g. if the seller cannot prove that they fixed all of the issues found during the housing inspection, the price of the sale necessary to close the purchase is automatically reduced by $20,000.00). Another condition profile 412 may exist within the self-executing contract 152 wherein the evaluation request 103 is only triggered upon a dispute between the buyer and seller that arises on the closing date, wherein the response action 103 may or may not result in termination of the contract and any responsibilities or obligations between the parties (e.g. the seller requests termination of the contract because the buyer has not yet received financing approval, but the buyer does not agree to the termination).

FIG. 1.2 illustrates an evaluation network 151, according to one or more embodiments. The evaluation network 151 may be utilized by one or more users 100 to define and store a self-executing contract 152 (e.g., a smart contract, an electronic contract) comprising the condition profile 412. Depending on the outcome of the evaluation of the one or more conditions 102, the self-executing contract 152 may automatically execute a response action defined in the response action data 418. For example, the user 100A and the user 100B may agree that depending on the existence of a condition 102, either the user 100A may receive an amount of cryptocurrency defined in the self-executing contract 152 or the user 100B may receive the amount of cryptocurrency. In some embodiments, the response action data 418 may include multiple response actions 109A, 109B, etc. wherein the one or more response actions 109A, 109B, etc. that occur are dependent upon the outcome of the evaluation of the one or more conditions 102. Since there may be many possible conditions 102A, 102B, etc. associated with the condition profile 412, there may be many possible outcomes, each potentially associated with one or more different response actions 109A, 109B, etc. The user 100C and the user 100D may be a set of peer evaluators to which the evaluation may be assigned, as further shown and described in conjunction with the embodiment of FIG. 1.1.

The self-executing contract 152 may be stored within a distributed ledger database 156, and specifically within a transaction block 154 of the distributed ledger database 156. The transaction block 154 is shown abbreviated "txn block 154" in FIG. 1.2. As may be known in the art of distributed ledger programming, the transaction block 154 may be a group of data which may be input into a hash function (e.g., SHA256) and assigned a resulting hash value. The hash value may be included in the data of the next instance of the transaction block 154, where the distributed ledger database 156 comprises a collection of stored instances of the transaction block 154 "chained" through the hash values. In the embodiment of FIG. 1.2, the distributed ledger database 156 is shown comprising 'n' transaction blocks 154, beginning with transaction block 154.1 and ending with transaction block 154.n. The self-executing contract 152 is illustrated as stored in the penultimate transaction block 154.n−1. As also may be known in the art, the distributed ledger database 156 may be replicated across several DLT nodes 158 within a distributed ledger technology network 157 (also referred to herein as the DLT network 157). A consensus mechanism (e.g., proof of work, proof of stake, Byzantine fault tolerance, etc., not shown) may mediate which entries, transactions, self-executing contracts 152, and/or transaction blocks 154 are accepted into the distributed ledger database 156.

The coordination server 395 may also function as a DLT node 158, for example by storing the distributed ledger database 156 and/or by storing a set of DLT client software which includes the coded instructions, rules, and/or protocols for communicating with the DLT network 157. The DLT client software may include the contract generation engine 140 which may be used to accept user 100 inputs to define the self-executing contract 152. In one or more embodiments, the self-executing contract 152 may first be defined through a user interface, and may then be formatted in the distributed ledger protocol. The ledger transaction system 160 may generate a distributed ledger transaction 162 (also described herein as the DLT transaction 162), which may include a request to create and store the self-executing contract 152. The formatted self-executing contract 152 may be transmitted and/or broadcast to the DLT network 157 to be included in a transaction block 154 of the distributed ledger database 156 (and/or compete for inclusion in the transaction block 154 through application of a consensus algorithm).

In one or more embodiments, the user 100A and the user 100B may define a self-executing contract 152. For example, the self-executing contract 152 may include self-executing code that upon existence of the one or more conditions 102 results in the one or more response actions defined in the response action data 418, for example transfer in the title of an asset attached to an electronic token and/or distribution of a quantity of cryptocurrency that one or both of the user 100A and the user 100B transferred into the self-executing contract 152. The one or more conditions 102, for example, might include an otherwise difficult-to-determine condition, such as whether "substantial" damage occurred to an asset to trigger an insurance policy attached to the self-executing contract 152. The self-executing contract 152 may be defined by the user 100A and/or the user 100B on the client device 200A and/or the client device 200B, respectively, through use of an application with contract generation workflows and/or through defining arbitrary software code in a language accepted by the DLT network 157. The contract generation engine 140 may then package the self-executing contract 152 and the ledger transaction system 160 may generate a DLT transaction 162 communicating the self-executing contract 152 to the DLT network 157.

Upon a set trigger, for example upon a request of the users 100A and/or periodically (e.g., once per week), the self-executing contract 152 may be evaluated. As part of the code executing on the DLT node 158 and/or the coordination server 395, the condition evaluation engine 304 may assign the condition profile 412 for evaluation, as shown and described in the embodiment of FIG. 1.1. In one or more embodiments, the user 100C and the user 100D may act as peer evaluators to generate the one or more determination values 108. The evaluators may or may not receive the condition data 104 (e.g., photos of the damage to the asset), or may have independent access to the one or more conditions 102. Once the evaluation is complete, including one or more evaluations and/or validations as may be defined in the evaluation hierarchy data 115, the one or more determination values 108 may be incorporated into one or more DLT transactions 162 until entering a transaction block 154 that is accepted into the distributed ledger database 156. The one or more determination values 108 may then trigger the one or more response actions 419, for example the distribution of the cryptocurrency to a public key address of the user 100A upon a determination of substantial damage to the asset (e.g., an existence value 109A), or distribution of a lesser amount of cryptocurrency to a public key address of the user 100A upon a determination of moderate damage to the asset (e.g. an existence value 109B). Although a peer evaluation is illustrated, any evaluation process, including application of any of the evaluation tiers 112 described in the embodiment of FIG. 1.1, may be utilized.

The functions of the coordination server 395 do not need to be intertwined with, integrated with, and/or defined within the DLT client application. For example, in one or more embodiments a machine user of the coordination server 395 may be a party to the self-executing contract 152. The machine user may provide data input resulting in the response action data 418, where the data input is generated through the condition evaluation engine 304.

In one or more embodiments, the contract generation engine 140 may include computer readable instructions that when executed generate the self-executing contract 152 comprising the evaluation criteria (e.g., as may be defined in the evaluation criteria data 414), the response action data 418 triggering one or more response actions upon an evaluation outcome (e.g., one or more existence values 109, one or more non-existence values 111, and/or one or more indeterminate values) and/or a validation outcome associated with existence of at least one of the one or more conditions 102, and may further include the evaluation hierarchy data 115, and/or an escalation condition (e.g., data specifying the application of and/or advancement to an additional evaluation tier 112). In the above example, where a request by the user 100A for an evaluation of the insurance policy is submitted and both non-existence of substantial damage and non-existence of moderate damage is determined, the user 100A may be charged a nominal fee of cryptocurrency; where it is indeterminate whether any damage exists at all, there may be no transfer of cryptocurrency; where it is determined that there is substantial damage to the asset, cryptocurrency may be distributed to the user 100A from the user 100B; where it is determined that there is moderate damage to the asset, a lesser amount of cryptocurrency may be distributed to the user 100A from the user 100B according to the self-executing contract 152.

In one or more embodiments, the ledger transaction system 160 comprises computer readable instructions that when executed submit the self-executing contract 152 to a node of a distributed ledger network 157 (e.g., the DLT node 158) comprising a set of transaction blocks (e.g., the transaction block 154) comprising chained hash values. In one or more embodiments, the peer evaluation pool 520 may comprise one or more users 100 that control a medium of exchange (e.g., a token, a cryptocurrency) of the distributed ledger network 157 and may be authorized for use of the distributed ledger network 157.

In one or more embodiments, the ledger transaction system 160 comprises computer readable instructions that when executed generate a distributed ledger transaction 162 comprising a transfer of a cryptocurrency to a public key associated with a user profile 512 of a user 100. The ledger transaction system 160 may have been prompted by a remote procedure call (RPC) from the condition response engine 370 and/or through executing code defining the response action data 418 in the self-executing contract 152.

FIG. 1.3 illustrates the evaluation hierarchy data 115, according to one or more embodiments. The evaluation hierarchy data 115 is a data structure comprising one or more evaluation nodes 120. The evaluation node 120 may store: (i) data specifying at least one evaluation query 123 defining the one or more conditions 102 to be assessed and the evaluation criteria data 414 to be utilized, (ii) a specified method for evaluation of the one or more conditions 102, for example data specifying an evaluation tier 112 and possibly any configuration or parameters for the application thereof, (iii) defined instances of the response action data 418, for example to be triggered upon certain determinations 122, and/or (iv) optionally at least one of an advancement reference 124 progressing to the next evaluation tier 112. The evaluation query 123 when generated may comprise the evaluation criteria data 414 and the condition data 104. In one or more other embodiments, where the evidence of the one or more conditions 102 may need to be independently determined, observed, or received, the evaluation query 123 may comprise the request for the evaluation along with the condition criteria data 414. The data specifying the evaluation query 123 may be referred to as the query data (not shown or labeled) in the present embodiment. Boolean operators may be utilized to define the one or more determinations 122, the response actions 419, and/or traversal along the advancement reference 124. The evaluation hierarchy data 115 may be implemented in wide variety of logical data models, including a relational mode, a graph model, a columnar model, a key-value model, and/or an entity-attribute-value model. The evaluation hierarchy data 115 may be stored in a variety of commercial database, for example MySQL, Oracle®, MongoDB®, Redis®, Neo4j, etc.

In the example of FIG. 1.3, a first evaluation tier 112.1 may be defined by the evaluation node 120. The evaluation node 120, for example, may specify a call to the model selection routine 320 for application of an automated evaluation process. An evaluation query 123 may then be generated for the automated evaluation process, e.g., to render one or more determinations 122. Upon a determination 122.1A (e.g., receipt of the one or more determination values 108 that includes an existence value 109), a response action 419.1B1 may be initiated, as may be defined in the evaluation node 120.1 and/or referenced in the condition profile 412. Upon a determination 122.1A, the evaluation hierarchy may advance via the advancement reference 124 to the evaluation node 120.2. The node 120.1 may include data specifying any Boolean operators implementing a response action 419 (e.g., if a determination 122.B, then proceed to the response action 419.1B1) and the advancement reference 124.1 (if a determination 122.A, then proceed along the advancement reference 124.1 to the evaluation node 120.2).

In a specific example, a user 100A may be attempting to complete a high-value contest or promotional challenge sponsored by an enterprise. Where an evaluation query 123 to an automated evaluation results in a determination 122.1B (e.g., the ANN 352 determining the existence of at least one of the one or more conditions 102), a response action

419.1B1 may be to issue a reward to the user 100A. In contrast, where an evaluation query 123 to an automated evaluation results in a determination 122.1A (e.g., non-existence of at least one of the one or more conditions 102), the advancement reference 124 may be followed to the evaluation node 120.2 which may define an evaluation tier 112.2 that includes a panel evaluation process through a call to the peer selection engine 330.

The evaluation tier 120.2 may define a peer evaluation process through a call to the peer selection engine 330. Where a peer evaluation results in one or more determinations 122.2C (e.g., existence of at least one of the one or more conditions 102), the one or more response actions 419.2C1 may log data related to the incorrect result of the automated process, and another response action 419.2C2 may be to issue a reward to the user 100A. In contrast, where the peer evaluation results in one or more determinations 122.2A (e.g., non-existence of at least one of the one or more conditions 102), the advancement reference 124.2A may be followed to the evaluation node 112.3 which may define a panel evaluation process through a call to the panel coordination engine 340. Similarly, if the peer cannot determine whether one or more conditions 102 exists, the one or more determinations 122.2B may also proceed along advancement reference 124.2B to the evaluation node 120.3 (e.g., in response to an indeterminate value).

Continuing with the present example, the evaluation node 120.3 may define one or more determinations 122.3A which may be one or more indeterminate outcomes, which may each return along the reassessment reference 126 to the evaluation node 120.3. Reapplication of the evaluation node 120.3 may again generate a call to the panel coordination engine 340, either initiating a new panel and/or requiring any panel that reached at least one of the one or more determinations 122.3A to re-evaluate. Additional impaneling criteria may be specified in the evaluation node 120.3 (as the impaneling criteria data 343, not shown), including for example a total number of users 100 in the panel, a consensus threshold (e.g., two thirds of the panel, 51% of the panel, a plurality of the panel), and qualifying attributes and/or characteristics of each user 100 participating in the panel as may be determined from the user profile 512. The one or more determinations 122.3C (e.g., existence of at least one of the one or more conditions 102) may result in the one or more response actions 419.3C1, for example lowering a reputation score of a user 100B rendering the peer evaluation in the evaluation tier 112.2, as further described herein. The one or more determinations 122.3C may also result in one or more response actions 419.3C2, which may include issuing the reward to the user 100A. The one or more determinations 122.2B (e.g., non-existence of at least one of the one or more conditions 102) may advance along the advancement reference 124.1 to the evaluation node 120.4.

Further illustrating the example, the evaluation tier 112.4 may be defined by the evaluation node 120.4, which may be a non-peer evaluation process that may call the non-peer selection routine 360. For example, the non-peer evaluators may be representatives of the company that is sponsoring the contest and/or promotional activity such as employees or official judges. The one or more determinations 122.4A may result in a first response action 419.4A1 that may increase the reputation score of any user 100 that was a peer and/or a panel member that had previously generated one or more determination values 108 that included one or more non-existence values 111. A second response action 419.4A2 may similarly decrease the reputation score of the user 100A who may have asserted existence of at least one of the one or more conditions 102, e.g., in generating the evaluation request 103. The one or more determinations 122B may result in a first response action 419.4B1 that may increase the reputation score of the user 100A and any panel member having generated the one or more existence values 109. A second response action 419.4B2 may be to assign the reward to the user 100A.

Although four instances of the evaluation tier 112 are illustrated in FIG. 1.3, an arbitrary number of evaluation tiers 112 may be defined (including a single evaluation tier 112). Similarly, an arbitrary number of instances of the one or more determinations 122 may be defined, including for multiple instances of the one or more conditions 102, as further described in conjunction with the embodiment of FIG. 1.4. For example, a first condition 102.1 may include whether an object is characterized by a first attribute (e.g., whether a star exceeds a certain brightness) and a second condition 102.2 may include whether the object has a second attribute (e.g., the color of the star in Kelvin units). There may be one or more determinations 122 defined for each instance of the one or more conditions 102. Boolean operators may be used to define response actions 419 depending on various combinations (e.g., if the condition 102A exists and the condition 102B exists, then a first response action should be taken; if only one of the condition 102A exists or the condition 102B exists, then a second response action should be taken).

FIG. 1.4 illustrates another evaluation hierarchy data illustrating multiple queries, each comprising one or more determinations, and a combination of determinations comprising a solution state, with different solution states each leading to one or more alternative evaluation tiers, according to one or more embodiments. In the embodiment of FIG. 1.4, the evaluation hierarchy data 150 may include an evaluation node 120.1 modeling multiple instances of the one or more conditions 102. In one or more embodiments, a request made to an evaluation tier 112.1 for the condition 102A may be referred to as the evaluation query 123X and a request made to an evaluation tier 112.1 for the condition 102B may be referred to as the evaluation query 123Y. In the present example, the evaluation query 123X may have two possible outcomes, the determination 122.1A(X) and the determination 122.1B(X). Similarly, the evaluation query 123Y may have two possible outcomes, the determination 122.1A(Y) and the determination 122.1B(Y). Together, each of the possible outcomes may represent a solution state 125. In the present example, there may be four solutions states (The solution state 125A comprising the determination 122.1B(X) and 122.1A(Y); the solution state 125B comprising the determination 122.1A(X) and 122.1B(Y); the solution state 125C comprising the determination 122.1B(X) and 122.1B(Y); and the solution state 125D comprising the determination 122.1B(X) and 122.1A(Y). In the present example, and in one or more embodiments, each of the solutions states 125 may represent a Boolean operator of "AND" between each of the relevant determination values 122, and each solution state 125 may advance to an evaluation tier 112. The solution state 125A may advance to the evaluation node 120.2A (e.g., a first instance of the peer evaluation with a first specified instance of an evaluator criteria 333A), the solution state 125B and the solution state 125C may advance to the evaluation node 120.2C (e.g., a second instance of the peer evaluation with a second specified instance of an evaluator criteria 333B), and the solution state 125C may advance to the evaluation node 120.2B (e.g., which may be a different type of evaluation, such as a panel evaluation). Each of the evaluation tiers 112.2 may then advance to one or more additional evaluation tiers, not shown. An arbitrary number of queries 123, determinations 122, and solutions states 125 may be defined. The advancement and/or one or more response actions 124 may be defined through Boolean operators. For example, if where a first evaluation query 123 returns a first determination 122 (finding a first condition 103 to exist) AND a second evaluation query 123 returns a second determination 123 (finding a second condition 103 to be non-existent), OR a third evaluation query 123 returns a third determination (finding a third condition 103 to exist), then in either case there may be an advancement to a specific instance of the evaluation node 120 and/or the evaluation tier 112.

In one or more embodiments, the evaluation criteria data 414 associated with a condition profile 412 may include data defining a set of evaluation queries 123 (which may be referred to as the evaluation query 123A through the evaluation query 123N) to be answered by an evaluating user 100. In a specific example, the set of evaluation queries 123 may be structured as multiple choice, allow for selection of multiple answers that are correct (e.g., "select all that apply"), and may even allow for open-ended responses (e.g., "name the location in which this photo was taken"). A possible user 100 response to the set of evaluation queries 123 may define the solution state 125A through the solution state 125N. Each possible condition 102 (e.g., the condition 102A, the condition 102B, etc.) may encompass one or more possible solution states 125, where each solution state 125 may result in a determination 122 corresponding to each evaluation query 123 and therefore generate a corresponding determination value 108. For example, the condition profile 412 may include two multiple choice questions (e.g., to result in generation of an evaluation query 123A and an evaluation query 123B) where exactly one answer must be selected for each question (e.g., a determination value 108A and a determination value 108B), where the first question is "Who was the best President of the United States of America in 1915?" with the possible responses being "Bill Clinton", "Woodrow Wilson", and "Other", and the second question is "Who was the best Vice President of the United States of America?" with the possible responses being "Dick Cheney", "Henry A. Wallace", and "Other". In the present example, there are nine possible instances of the solution state 125 of the condition profile 412. It is also possible for metadata related to how an evaluation tier 112 was applied to further differentiate solutions states 123 (e.g., a "sub-solution state"). For example, the amount of time that a peer evaluator took to answer the questions, whether the peer evaluator closed or minimized the evaluation application 208 (e.g., may have looked for outside information through a web browser), etc. One or more response actions 419 may also depend on the sub-solution state. In some embodiments, there may be one or more response actions individually associated with each determination for each possible condition 102A, 102B, etc that comprises a solution state. For example, there may be a response action that results in a user earning $5.00 for every condition 102A, 102B, etc. that is determined to exist. In other embodiments, there may be one or more response actions associated with each possible solution state 125A, 125B, etc. For example, there may be a response action that results in a user earning $5.00 if and only if one particular solution state is determined to exist, and $0.00 if any other solution state is determined to exist.

FIG. 2 is a client device, according to one or more embodiments. The client device may include a processor 201 and a memory 203 that is a computer memory (e.g., random access memory, hard disk memory, solid state memory, etc.). The client device 200 may include a display (e.g., an LCD screen, an OLED screen), and a network interface controller 204 enabling communication through the network 101.

In one or more embodiments, the client device 200 may include a condition application 206 which may carry out one or more functions depending on the purpose and nature of the evaluation network 150 and/or the evaluation network 151. In one or more embodiments, the condition application 206 may be a desktop software application that may assist the user 100 in creating condition profiles 412, defining self-executing smart contracts (e.g., the self-executing contract 152), generating and/or submitting an evaluation request 103, participating in evaluations, generating determination values 108, and/or other functions. The condition application 206 may be, for example, may be a desktop application and/or a mobile application ("app").

Figure 6:
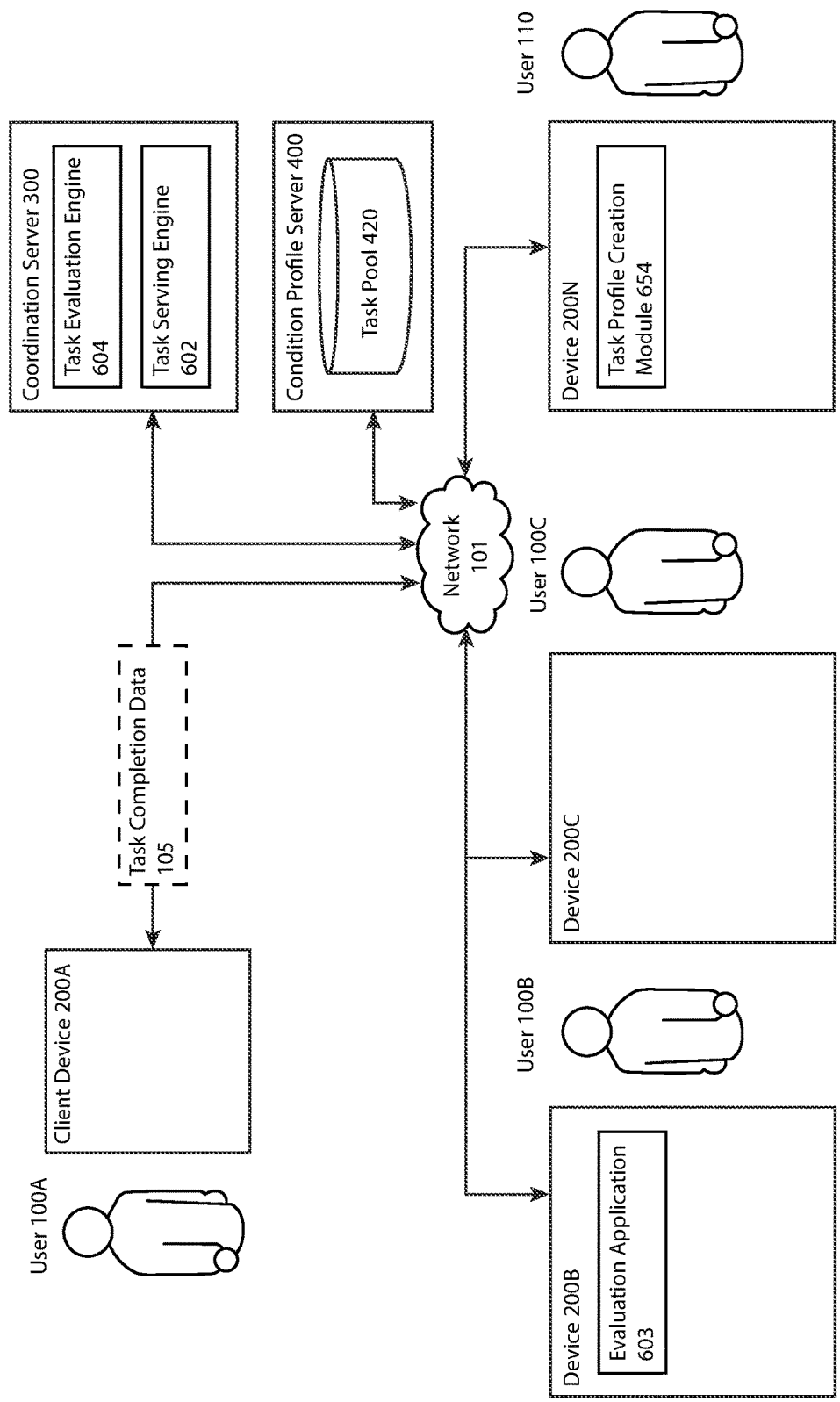
FIG. 6 illustrates a task evaluation network illustrating an example embodiment in which the one or more conditions to be evaluated may be one or more tasks to be performed by a user and as may be defined by an organization, where the evaluation of which may be allocated to one or more peers and/or non-peer evaluators for accurate and/or efficient determination of completion of the one or more tasks, or determination of the level or quality of completion of the one or more tasks, according to one or more embodiments.

In one or more embodiments, and as described in further detail in conjunction with the embodiment of FIG. 4 and FIG. 6, the user 100 may participate in and/or may be responsible for bringing about at least one of the one or more conditions 102 to trigger one or more response actions such as receiving a reward. In such case the one or more conditions 102 may be completion of one or more tasks for the user 100, including for example patronizing a retail store, participating in a promotional challenge, taking a photo with a product or in the process of receiving a service, etc. The condition application 206 may assist in signing up for, managing, and/or generating an evaluation request 103 to make an assertion that at least one of the one or more conditions 102 exists to qualify for at least one of the one or more rewards.

The evaluation application 208 includes software for assisting in the evaluation of conditions 102, for example evaluation requests 103 generated by other users 100 (e.g., the user 100B in FIG. 1.1). In one or more embodiments, the condition evaluation engine 304 and/or the peer selection engine 330, as described below, may communicate data sufficient for the user 100A to provide an evaluation. In one or more embodiments, the data communicated to the user 100A may be one or more condition IDs 413 associated with a condition profile 412, an evaluation criteria data 414 describing an evaluation criteria (e.g., the description data 415 which may be human-readable, a set of symbolic logic specifying the criteria, machine readable instructions specifying the question to be answered and any criteria by which it is to be answered), and the condition data 104 that may evidence at least one of the one or more conditions 102. The evaluation application 208 may also include software for generating one or more determination values 108, for example one or more existence values 109, one or more non-existence values 111, and/or another type of response, such as one or more indeterminate values or a combination of existence values, non-existence values, and/or indeterminate values.

As an illustration of a peer evaluation accomplished through use of the device 200, the evaluation application 208 may receive from the coordination server 300 a request for the user 100 to evaluate the one or more conditions 102. The user 100 may be presented with the condition data 104 (e.g., a video of a different user 100 having precipitated the existence of at least one of the one or more conditions 102), may be shown the evaluation criteria data 414 (e.g., a description and/or video of what is to be evaluated, and a different video illustrating what the one or more conditions 102 should look like when they exist), and possibly the description data 415 of the evaluation criteria data 414. The user 100 in the present example may be functioning as a peer evaluator or as part of a panel session, as further described in conjunction with the embodiment of FIG. 3. The user 100 may consider the evidence and criteria and then enter (or select from a menu or other UI element) the one or more determination values 108. The selection may result in generation of one or more existence values 109 and/or one or more non-existence values 111.

The DLT client application 170 may include software for defining self-executing contracts 152, generating DLT transactions 162, and/or otherwise communicating with the DLT network 157. Although shown separately in the embodiment of FIG. 2, the condition application 206, the evaluation application 208, and/or the DLT client application 170 may be an integrated software application sharing the purpose and functionality of each.

FIG. 3 illustrates the coordination server 300, according to one or more embodiments. The coordination server 300 includes a computer processor 301 and a memory 303 that is a computer memory. The coordination server 300 may include an evaluation request agent 302, according to one or more embodiments. The evaluation request agent 302 may include software that receives and processes an evaluation request 103. For example, the evaluation request 103 may be generated by a user 100 who wishes to have the one or more conditions 102 evaluated, by a group of users 100 who wish to have the one or more conditions 102 evaluated, and/or by the self-executing contract 152 which may have triggered an evaluation according to the terms coded in the self-executing contract 152. The evaluation request 103 may include all information necessary to both define the one or more conditions 102 and the criteria for their evaluation, and/or may reference a location where such information is stored (e.g., the condition profile 412). In one or more embodiments, the evaluation request agent 302 may include computer readable instructions that when executed receive one or more condition IDs 413 associated with a condition profile 412 and a condition data 104. The condition profile 412 referenced by the condition ID 413 may include an evaluation criteria data 414 describing an evaluation criteria for determining existence of the one or more conditions 102. In one or more embodiments, the evaluation request agent 302 may include computer readable instructions that when executed receive the condition data 104 indicating the existence of at least one of the one or more conditions 102 and extract the evaluation criteria data from the condition profile 412.

The coordination server 300 may include an authentication system 305, according to one or more embodiments. In one or more embodiments, verifying user identity through authentication may contribute to the accuracy of evaluating the one or more conditions 102, including for assigning rewards, generating auditable records, and through maintenance of a reputation system as described in greater detail throughout the present embodiments. The authentication system 305 may authenticate one or more users 100 and/or client devices 200 of the user 100 communicating with the coordination server 300. The authentication system 305 may utilize one or more authentication factors as may be known in the art (e.g., a password, a biometric, a possession of a physical device such as a phone or fob).

The coordination server 300 may include a condition evaluation engine 304. The condition evaluation engine 304 may process and assign an evaluation request 103, including initiating one or more evaluation tiers 112 to provide the evaluation. A tier allocation routine 306 allocates an evaluation request 103 to an evaluation tier 112. The tier allocation routine 306 may read the evaluation hierarchy data 115 to determine a specified evaluation tier 112 for use. In one or more embodiments, the tier allocation routine 306 includes computer readable instructions that when executed select a first evaluation tier 112.1 to evaluate the condition data 104, and, upon receipt of one or more determination values 108, select a second evaluation tier 112.2 for further evaluation of the condition data 104 and for validation of the first evaluation tier 112.1.

An evaluation receipt agent 308 receives and processes an evaluation from one or more systems and/or devices providing the evaluation of an assigned evaluation tier 112. For example, in one or more embodiments, the evaluation receipt agent 308 includes computer readable instructions that when executed receive one or more determination values 108 of a second user 100B (e.g., following a peer evaluation by the second user 100B), and call the condition evaluation engine 304 for determination of whether to select a second evaluation tier 112.2.

An evaluation recording subroutine 310 may include software for recording and/or documenting an evaluation outcome. The evaluation may be documented by storing a record (e.g., the evaluation record 432) in the evaluation record database 430, as shown and described in conjunction with the embodiment of FIG. 4. For example, the evaluation record 432 may include a record ID 433 that may be a unique identifier of the evaluation record 432, the one or more conditions ID 415 referencing the condition profile 412 for which the evaluation was made, a timestamp of the evaluation, the one or more determination values 108, a data defining a solution state (e.g., the solution state 125), the condition data 104, the UID 513 of each user 100 participating in the evaluation, etc. In one or more embodiments, the evaluation recordation subroutine includes computer readable instructions that when executed generate an evaluation record 432 that includes a user ID (e.g., a UID 513A) of the first user 100A (e.g., who may be asserting at least one of the one or more conditions 102), the user ID of the second user 100B (e.g., a UID 513B), the one or more determination values 108 of the second user 100B, the one or more condition IDs 415, and the evaluation criteria data 414.

In one or more embodiments, the condition evaluation engine 304 may include an outcome notification subroutine 312 that includes software providing a notification to one or more users 100 as to an outcome of one or more evaluation tiers 112. In one or more embodiments, an outcome notification subroutine 312 includes computer readable instructions that when executed generate a notification for the first user 100A (e.g., a user 100A generating the evaluation request 103) that the condition data 104 has been assigned one or more non-existence values 111. For example, the user 100A may have asserted that they completed a task, or may have been requesting a determination of whether at least one of the one or more conditions 102 exists for other reasons beneficial to them, and may be notified that the outcome of the evaluation tier 112 was that at least one of the one or more conditions 102 was found not to exist. In some cases, the user 100 may have some input as to whether additional evaluation tiers 112 are applied to the evaluation and/or used to validation the original evaluation. In one or more embodiments, the evaluation response agent 314 may receive one or more challenge values (not shown) from the device 200 of the first user 100A. The one or more challenge values may trigger one or more additional downstream evaluation tiers 112. For example, where the user 100A does not believe that a peer evaluator properly evaluated the condition data 104 the user 100A submitted, the user 100A may challenge the result by requesting a panel of users 100 to provide the re-evaluation as peer evaluators. Referring to the evaluation hierarchy data 115 of FIG. 1.3, the evaluation hierarchy data 115 may store data requiring input from the user 100A following certain determinations 122. For example, at least one of the one or more determinations 122.2A may, prior to the advancement 124.2A, request whether the user 100A wishes to re-evaluate the evaluation. In one or more embodiments, the request to re-evaluate may be a form of "appeal." Upon the user 100A generating the one or more challenge values (e.g., through a notification and selection of the condition application 206), traversal of the advancement reference 124.2A would continue to the evaluation node 120.3 in order to apply the evaluation tier 112. As described in detail below, at least one of the one or more challenge values may relate to which reputational penalties and/or the reputational rewards result from an evaluation. In other words, the technology may assist in improving efficiency through defining and/or allocating risk to a user 100A wishing to challenge an evaluation, potentially reducing resources for evaluation.

The evaluation hierarchy data 115 may include data specifying which of one or more evaluation tiers 112 are to be utilized for an evaluation of the existence of the one or more conditions 102, under what circumstances and/or conditions additional evaluation tiers 112 are utilized, and/or what actions may be taken (e.g., the one or more response actions 419 as may be defined in the response action data 418) as a result of various determination values or sets of determination values 108. The evaluation hierarchy data 115 may be stored in numerous locations, for example on the coordination server 300 (as shown in the embodiment of FIG. 3), within a condition profile 412, and/or within the self-executing contract 152. The evaluation hierarchy data 115 may be a template applicable to all evaluators applicable to a type of evaluation (e.g., all photo evaluations, all contests sponsored by a particular organization), or, according to one or more embodiments, the evaluation hierarchy data 115 may be defined on a case-by-base basis for an evaluation of one or more conditions 102.

According to one or more embodiments, an evaluation hierarchy engine 316 includes software code utilized to assemble the data structure of the evaluation hierarchy data 115 in memory and/or storage (e.g., the memory 303). In one or more embodiments, a hierarchy assembler 318 includes computer readable instructions that when executed generate an evaluation hierarchy comprising two or more evaluation nodes (e.g., the evaluation nodes 120 of FIG. 1.3) each associated with an evaluation tier 112. A first evaluation node 120.1 of the two or more evaluation tiers 112 may store an advancement reference 124 for advancement of the evaluation to a second evaluation node 112.2 of the two or more evaluation nodes 120.

The evaluation hierarchy engine 316 may further include software code utilized to simulate evaluation loads across the evaluation hierarchy. Such simulations may assist in determining the proper allocation of resources in the evaluation process. For example, the first evaluation tier 112.1 may be an automated process that may require a number of computing resources and/or servers to be operating (e.g., servers running the artificial neural network 352), including some flexibility to dynamically add server capacity. The evaluation tier 112.2 may be a panel-based evaluation that requires that a certain number of users 100 remain available and reasonably responsive to evaluation requests 103, as may be tracked through logins, account sessions, and/or activity of the device 200 and/or the user 100. The evaluation tier 112.3 may be a non-peer evaluation process with a set number of evaluators (e.g., six full-time employees with limited evaluation capacity but acting as the ultimate arbiter of the evaluation process.

In one or more embodiments, the load simulation routine 319 includes computer readable instructions that when executed determine an estimated evaluation load on each of the two or more evaluation nodes 120. For example, parameters to the simulation may include a rate of evaluation requests 103 received by the coordination server 300, an average completion time of an evaluation tier 112, an average time to select a peer-evaluator, an average time to impanel a group of peer evaluators, a probability of determinations 122 at each evaluation node 120, etc. A goal of the simulation may be to minimize cost while maximizing accuracy of the evaluation, according to one or more embodiments.

The load simulation routine 319 may further include computer readable instructions that when executed determine that the estimated evaluation load on an evaluation tier 112 associated with the non-peer evaluation pool 530 exceeds an evaluation capacity of the non-peer evaluation pool 530. For example, if each non-peer user (e.g., the user 110) is able to on average process twenty evaluations per hour, it may be determined that the evaluation tier 112 will become saturated and/or unable to process all evaluations. The load simulation routine 319 may further comprise computer readable instructions that when executed adjust at least one of the evaluator criteria 333, the impaneling criteria 343, and the evaluation hierarchy by adding one or more evaluation nodes 120.

In one or more embodiments, the condition evaluation engine 304 may call one or more systems to affect an evaluation of the one or more conditions 102, including the model selection routine 320, the peer selection engine 330, the panel coordination engine 340, the machine learning engine 350, and/or the non-peer selection routine 360. The model selection routine 320 may select one or more automated evaluation models to be applied to the evaluation request 103. For example, where the condition data 104 includes data easily readable by an automated process, the model selection routine 320 may select an evaluation routine with a straightforward test for least one of the one or more conditions 102. For instance, the one or more conditions 102 may include that the user 100 posts a quote from a famous author on a social media page, where the condition data 104 submitted as evidence is a uniform resource locator (URL) (e.g., a link) to the posting and/or screenshot. The text of the html page pointed to by the URL may be digested, and/or an optical character recognition process may be applied to the screenshot, where the name of the famous author is read from the quote and compared to a preexisting list stored in a database. A match may indicate at least one of the one or more conditions 102 exists and cause issuance of one or more existence values 109.1. Other automated processes may be more complex or utilize more sophisticated tools, for example a call to the artificial neural network 352. The one or more determination values 108.1 (e.g., the one or more existence values 109, the one or more non-existence values 111, and/or one or more indeterminate values) may be returned to the condition evaluation engine 304 for comparison to the determination 122, initiating one or more response actions 419, and/or possible progression through to another evaluation tier 112 of the evaluation hierarchy data 115.

In one or more embodiments, a peer selection engine 330 may include computing software for selecting peer evaluators (e.g., a user 100) and generating one or more determination values 108 (e.g., the one or more determination values 108.2). The peer selection engine 330 may include a peer selection routine 332 and a peer qualification subroutine 334. In one or more embodiments, the peer selection routine 332 includes computer readable instructions that when executed select a user ID 513 of a user 100 associated with a peer evaluation pool 520, and transmit the evaluation criteria data 414 and the condition data 104 to a device 200 of the user 100. The peer qualification subroutine 334 may be utilized to qualify the user 100 selected as the peer, for example by comparing an evaluator criteria 333 to data queried from the user profile 512. A meta-evaluation of the proposed peer evaluator's qualifications are also possible, for example where a second condition 102B is that a peer evaluator is well qualified for the evaluation of a first condition 102A to be assessed under an evaluation criteria data 414A, where the evaluator criteria 333 for qualification of the peer may be simultaneously an evaluation criteria data 414B. This structure may be advantageous, for example, where the first condition 102A is one of high economic value and/or importance.

In one or more embodiments, the peer qualification subroutine 334 includes computer readable instructions that when executed reference the evaluator criteria 333 specifying a criteria for a user 100 to act as an evaluator of the condition data 104 and/or to act as a validator of a different evaluation tier 112. In one or more embodiments, the peer qualification subroutine 334 includes computer readable instructions that when executed determine each user profile 512 associated with the peer evaluation pool 520 each meet an evaluator criteria. The evaluator criteria 333 may include at least one of the following: a reputation value of a user profile 512 of a user 100, a first number of validation events (e.g., review and validation and/or re-evaluation of a different evaluation tier 112), a second number of validation events with matching outcomes from the different evaluation tier 112, and an account type of a user profile 512 of the user 100 (e.g., a registered user, an unregistered user, a participation level of user, an account seniority etc.). The evaluator criteria 333 may be stored within the condition profile 412 and/or the evaluation hierarchy data 115, according to one or more embodiments.

A panel coordination engine 340 may include software code that creates and administers a panel of users 100 (either peer evaluators and/or non-peer evaluators) for collectively rendering an evaluation (e.g., each generating one or more determination values 108 that may collectively result in the one or more determination values 108.3). In one or more embodiments, the panel coordination engine 340 includes computer readable instructions that when executed assemble a panel session include the set of two or more user IDs 513. For example each user 100 of the panel session may be selected from the peer evaluation pool 520. The panel coordination engine 340 may then transmit the evaluation criteria data 414 and the condition data 104 to a device 200 associated with each of the two or more users 100 (and/or users 110) of the panel session. Next, the panel coordination engine 340 may include computer readable instructions that when executed receive one or more determination values 108 of each of the two or more users 100 of the panel session, and may also optionally determine a quorum that meets an impaneling criteria 343. The panel coordination engine 340 may then generate one or more determination values 108 (e.g., the one or more determination values 108.3) based on the one or more determination values 108 received from each of the two or more users 100 of the panel session. Similarly, the panel coordination engine 340 may generate a solution state (e.g., the solution state 125) based on a set of determination values 108 received from each of the two or more users 100 of the panel session. The session management module 344 may include a software application for running the panel session, including: (i) coordinating communication between and among each user 100 of the panel session over the network 101; (ii) ensuring receipt of all determination values 108 from each user 100 of the panel session; (iii) determining that a user 100 is not being requested to participate in too many concurrent panel sessions panels; (iv) generating a persistent recording and data backup; and (v) closing the session panel. The impaneling criteria 343 may include at least one of a number of users 100, and a combined reputation score of each of the users 100 within the panel session.

The panel qualification subroutine 342 may include computer readable instructions that when executed reference an impaneling criteria data 343 specifying a criteria for a group of users 100 to collectively act as at least one of an evaluator of the condition data 104 and/or a validator of a different evaluation tier 112. The panel qualification subroutine 342 may also include computer readable instructions that when executed determine that a set of two or more user IDs 513 of a set of two or more users 100 associated with the peer evaluation pool 520 each meet an evaluator criteria data 333, and collectively meet the criteria for the group. The impaneling criteria data 343 may include a number of users 100 needed to participate (e.g., five, one hundred, one thousand), and a combined reputation score (e.g., a reputation score from each user 100 as queried from the user profile 512 and as may be dynamically adjusting).

The machine learning engine 350 may include software for applying one or more automated evaluation processes that may be further adjusted using data and results fed back into a training dataset of the automated evaluation processes. In one or more embodiments, the machine learning engine 350 may include the artificial neural network 352 and the ANN execution routine 354. An artificial neural network 352 may include a plurality of input nodes of the artificial neural network 352 (not be confused with the evaluation nodes 120 of FIG. 1.3). Additional algorithms and analysis methods usable with machine learning techniques are also possible, including for example linear regression, logistic regression, decision trees, support vector machine (SVM), Naive Bayes, K-nearest neighbor, K-means, random forest analysis, dimensionality reduction algorithms, gradient boosting algorithms, etc.

In one or more embodiments, the machine learning engine 350 may include computer readable instructions that when executed train the artificial neural network 352 with a training data. The training data may include a set of evaluation records 432, a set of one or more evaluation criteria data 414, and/or a set of one or more determination values 108. The model selection routine 320 may, in one or more embodiments, including computer readable instructions that when executed select the artificial neural network 352 for use.

The ANN execution routine 354 includes computer readable instructions that when executed input the condition data 104 into the artificial neural network 352. The condition data 104 may be appropriately fractionated and/or parsed for each of the input nodes of the ANN 352. For example, groups of pixels of a photograph may be fed into input nodes of the ANN 352, with one or more layers of "hidden" layers of nodes further processing the inputs and resulting in an output from an output layer. The output may be, in one or more embodiments, one or more determination values 108 of the artificial neural network (e.g., the one or more determination values 108.4 of FIG. 3). The one or more determination values 108 may be a classification of the condition data 104 generated by the ANN 352.

In one or more embodiments, the machine learning engine 350 may include computer readable instructions that when executed feed back one or more determination values 108 from a different evaluation tier 112 as an additional instance of the training data into a prediction algorithm and/or the artificial neural network 352. The feed back may, according to a machine learning process as may be known in the art of ML programming, adjust one or more weight values associated with one or more nodes of the artificial neural network 352.

The non-peer selection routine 360 may select a non-peer evaluator from a non-peer evaluation pool 530 (e.g., the user 110, a user 100 not meeting the evaluator criteria 333 defining criteria for a peer). The user 110, for example, may be an expert that may render an opinion in evaluating the one or more conditions 102, whether casual or in their official capacity (e.g., a doctor, a lawyer, an engineer, a mediator, an arbitrator, a person with domain expertise, a person with a certification or other qualification, etc.). In one or more embodiments, the non-peer selection routine 360 including computer readable instructions that when executed determine a user ID 513 of a user 110 associated with the non-peer evaluation pool 530 and transmit the evaluation criteria data 414 and the condition data 104 to a device 200 associated with the user ID 513 of the user 110. The non-peer may generate one or more determination values 108, for example on the device 200 (shown in the embodiment of FIG. 3 as the one or more determination values 108.4). The non-peer selection routine 360 and/or the condition evaluation engine 304 may further include computer readable instructions that when executed receive one or more determination values 108 generated by a selection of the user 110 that the condition data 104 fails to meet the evaluation criteria for determining the existence of at least one of the one or more conditions 102.

In one or more embodiments, the coordination server 300 may include a condition response engine 370. The condition response engine 370 may include software for taking one or more actions in response to receiving one or more determination values 108 and/or making one or more determinations 122 (e.g., the one or more response actions 419). In one or more embodiments, the condition response engine 370 includes computer readable instructions that when executed initiate one or more response actions 419 associated with a condition profile 412. The response action data 418 associated with one or more conditions 102 may be stored in one or more locations, including the condition profile 412, within the evaluation hierarchy data 115, and/or in another computing memory location. The response action data 418 may be a template applicable to all or a type of evaluation (e.g., all photo evaluations, all contest evaluations), or, according to one or more embodiments, may be defined on a case-by-case basis for an evaluation of one or more conditions 102. In one or more embodiments, an action to be taken by a user 100 is defined in a description data 415 and the one or more response actions 419 may include transmitting the description data 415 to the user 100. In such case, the action to be taken may include its own standard for completion that may be defined in a different condition profile 412, and therefore itself may be the subject of an evaluation. For example, following an evaluation that a condition 102A exists (e.g., "substantial damage" to an object), the response action 419 may include instructing a user 100B that they have an obligation to provide "reasonable compensation" to the user 100A, which itself may be a condition 102B which may be evaluated. Other response actions 419 may occur automatically and/or self-execute. For example, the one or more response actions 419 defined in the response action data 418 may include rewarding a user 100 submitting the evaluation request 103, rewarding one or more peer evaluators for coming to a consistent determination, etc. One form of incentive and/or disincentive for providing an accurate evaluation may be the use of an account action with response to a user 100, including adjusting a participatory right of the user 100 to submit evaluation requests 103 and/or assist in providing peer and/or non-peer evaluations. The account action routine 372 includes software code that effects one or more account actions that reward and/or punish the user 100 depending on the actions and data that the user 100 submits with respect to the evaluation made by the user 100.

In one or more embodiments, an account action routine 372 includes computer readable instructions that when executed initiate one or more account actions. For example, a first account action effected by a reputational adjustment module 374 may include, for each of the one or more determination values 108 generated by a user 100 participating in a panel session, decreasing a reputation value of a user profile 512 of a user 100 based on a ratio of a set of non-existence values 111 and a set of existence values 109 generated by the panel. For example, there may be six users 100 participating in a seven-user panel session that may each generate an existence value 109 for a particular condition 102A, and a seventh user 100 generates the non-existence value 111 for the same condition 102A. Due to the outlier result, the seventh user 100 may have a reputation value associated with the user profile 512 decreased. A decreased reputation score may result in a lower evaluation weight assigned to the user 100, fewer evaluations assigned to the user 100, additional checks on the evaluations of the user 100 (e.g., more validations), less valuable or important rewards when the user 100 submits their own evaluation requests 103, and/or other disincentives. In one or more embodiments, the reputational adjustment module 374 includes computer readable instructions that when executed increase a reputation value of a user profile 512 of a user 100 who receives the same evaluation value 108 of the peer evaluators and/or is validated by subsequent evaluation tiers 112.

In one or more embodiments, account actions may also include more drastic results, such as suspension and/or termination of a user 100's account (e.g., blocking their user profile 512 from participating in evaluations). Such account actions may be reserved for cases of abuse or consistently incorrect evaluations that impact valuable assets or legal rights of users 100 having an interest in a proper evaluation of the one or more conditions 102. In one or more embodiments, a suspension module 376 includes computer readable instructions that when executed determine (i) a threshold non-existence ratio has been exceeded and/or (ii) a threshold incorrect evaluation ratio has been exceeded. Incorrect evaluations may be determined through a comparison of (i) the one or more determinations 108.1 of the user 100 providing a peer-evaluation, with (ii) one or more determinations 108.2 of a higher instance of the evaluation tier 112 (e.g., an evaluation tier 112.*n* reached through n−1 instances of the advancement reference 124, where n>1).

A condition completion subroutine 378 includes software code that records and/or documents existence of the one or more conditions 102, including, in one or more embodiments, that a particular user profile 512 participated in the existence and/or non-existence of at least one of the one or more conditions 102 (e.g., completed a task, was responsible for the one or more conditions 102, etc.). In one or more embodiments, the condition completion subroutine 378 includes computer readable instructions that when executed associate one or more determination values 108 (e.g., the one or more existence values 109), the user ID 513 of a user 100, and the one or more condition IDs 413 of the condition profile 412 in a database The condition profile 412 may be stored in the condition profile database 410, a separate database for tracking completion of tasks associated with the one or more conditions 102, and/or the task pool 420 within a task profile 422).

The condition response engine 370 may also include a reward subroutine 380 that may reward a user 100, for example a user 100 submitting the evaluation request 103, a user 100 that is otherwise related to at least one of the one or more conditions 102 (as may be identified by an evaluation tier 112), and/or a peer evaluator generating one or more determination values 108 that is validated by other evaluation tiers 112. The reward subroutine 380 may be utilized in conjunction with task completion to provide tangible reward to the user 100 completing one or more tasks, as shown and described in conjunction with the embodiment of FIG. 6. The reward 426 may, for example, include a cash reward, a coupon, a free product or service, a special offer, a cryptocurrency award, and/or an increased reward status.

The coordination server 300 may include a record verification engine 390, according to one or more embodiments. Depending on how the one or more evaluation tiers 112 are defined, certain evaluation tiers 112 and/or determinations 122 may receive more validation, re-evaluation, and/or review than others. For example, in the example embodiment of FIG. 1.3, a determination resulting in an existence value 109 (e.g., symbolized by a box with a "check mark") does not result in additional verification, whereas a determination 122 resulting in a non-existence value 111 results in additional evaluations until the evaluation tier 112.4 is reached. In particular, the example embodiment of FIG. 1.3 may favor an evaluation resulting in an existence value 109. This structuring may be advantageous for example when engaging in promotional activities where a bias toward response actions 419 benefiting users 100 submitting the evaluation request 103 may be in the best interest of a sponsor of the promotional activities. This structuring may also decrease the average time for an evaluation outcome.

In other cases, however, the evaluation hierarchy data 115 may be set up to cause re-evaluation and/or validation of an evaluation tier 112 for all instances of the one or more determinations 122. This alternate structuring may be advantageous for example when engaging in scientific data analysis and/or medical condition diagnosis. However, even in the event that a streamlined evaluation hierarchy produces some evaluations that receive less validation and/or re-evaluation, results may be periodically validated and/or "spot" checked.

In one or more embodiments, a record verification engine 390 may include software code that checks past evaluations, including through processes that may or may not be defined within the evaluation hierarchy data 115 utilized in the past evaluation. In one or more embodiments, the record verification engine 390 includes computer readable instructions that when executed select the evaluation record 432 from a database of evaluation records 432 (e.g., the evaluation record database 430). The evaluation record 452 includes one or more determination values 108 such as an existence value 109. The computer readable instructions of the record verification engine 390 when executed may extract the evaluation criteria data 414 and the condition data 104. The record verification engine 390 may also include computer readable instructions that when executed select a new evaluation tier 112.x for validation of the evaluation record 432 and/or call the condition evaluation engine 304 for the selection. The new evaluation tier 112.x for the evaluation may be different from an original evaluation tier 112.1 utilized to generate the evaluation record 432. For example, an automated evaluation (e.g., by the model selection routine 320) may be validated by the non-peer evaluation (e.g., especially to increase training data of a machine learning process). In another example, a peer evaluation may be verified by a panel evaluation. The evaluation criteria data 414 and the condition data 104 may be submitted to a validation process of the new evaluation tier 112.x for re-evaluation that the condition data 104 meets the evaluation criteria and/or validation of the original evaluation tier 112 utilized to generate the evaluation record 432.

FIG. 4 illustrates a condition profile server 400, according to one or more embodiments. The condition profile server 400 may include a processor 401 and a memory 403 that is a computer memory. A condition profile creation module 402 may receive requests to generate a condition profile 412, for example from a user 100 that may have a direct association with or responsibility for the one or more conditions 102 and/or a user 110 that is a representative of an organization specifying the one or more conditions 102. The condition profile creation module 402 may include computer readable instructions that call a database application programming interface (API) to generate the one or more condition IDs 413, generate a data object for storage of the condition profile 412, and store the evaluation criteria data 414, the description data 415, the evaluation hierarchy data 115, and/or the response action data 418. A query engine 404 may respond to one or more queries, for example generated from the coordination server 300 to retrieve data from a condition profile 412 (and/or the task profile 422, and/or the evaluation record 432). In one or more embodiments, the query may include a unique identifier (e.g., the one or more condition IDs 413, the one or more task IDs 423, and/or the record ID 433).

The condition profile server 400 may include a condition profile database 410 storing one or more condition profiles 412. The condition profile 412 may include one or more condition IDs 413 (e.g., a unique identifier, a globally unique identifier). The condition profile 412 may include the evaluation criteria data 414 that includes data sufficient to submit to at least one evaluation tier 112. The evaluation criteria data 414 may differ according to the type of evaluation tier 112 to be applied. For example, data may be stored in multiple formats, some of which may be more accessible or easily processed by automated evaluations and others of which may be more appropriate for peer and/or panel evaluation. In one or more embodiments, the evaluation criteria data 414 may include a description data 415 which may be text that specifies one or more questions to be answered (e.g., the evaluation to be performed) and the evaluation criteria to be applied. The condition profile 412 may further include the evaluation hierarchy data 115 and/or a reference to the evaluation hierarchy data 115. Each condition profile 412 may store its own copy of the evaluation hierarchy data 115. Alternatively or in addition, multiple instances of the condition profile 412 may reference the same evaluation hierarchy data 115. The condition profile 412 may further include a response action data 418 and/or a reference to the response action data 418.

The condition profile server 400 may further include a task pool 420 comprising one or more task profiles 422. The task profile 422 may be a specialized instance of the condition profile 412 and may relate to conditions 102 involving a task that can be completed by a user 100. The task profile 422 may include one or more task IDs 423 that may be a unique identifier through which the task profile 422 is addressable by a query. A completion criteria data 424 may include data specifying the criteria for completion of the one or more tasks (e.g., what and/or to what extent the task must be completed and/or accomplished). The completion criteria data 424 may include one or more task descriptions 425 that may be a human readable explanation of the criteria, for example a text file. The task profile 422 may store and/or reference an evaluation hierarchy data 115, and may further include one or more response action data 418. At least one of the response actions 419 may specify one or more rewards 426 that is assigned to a user 100 if the user 100 is evaluated to have completed at least one of the one or more tasks associated with the task profile 422.

The condition profile server 400 may further include an evaluation record database 430 storing one or more evaluation records 432, according to one or more embodiments. The evaluation record 432 may include a record ID 433 through which the evaluation record 432 is addressable by one or more queries. The evaluation record 432 may further include one or more condition IDs 415 of the condition profile 412 associated with the one or more conditions 102, and the condition data 104 evidencing the one or more conditions 102 and which was evaluated by one or more evaluation tiers 112. The evaluator data 434 includes data generated from one or more evaluation tiers 112, for example one or more instances of the user ID 513 of users 100 participating in the evaluation (e.g., peer evaluators, panel evaluators, non-peer evaluators), a process ID of an automated process (and/or software version or training data version) of the automated process, a timestamp of the evaluation, and/or one or more determination values 108 (or in the case of a panel session, one or more determination values 108 from each user from which one or more determination values 108 of the panel may be synthesized).

Figure 5:
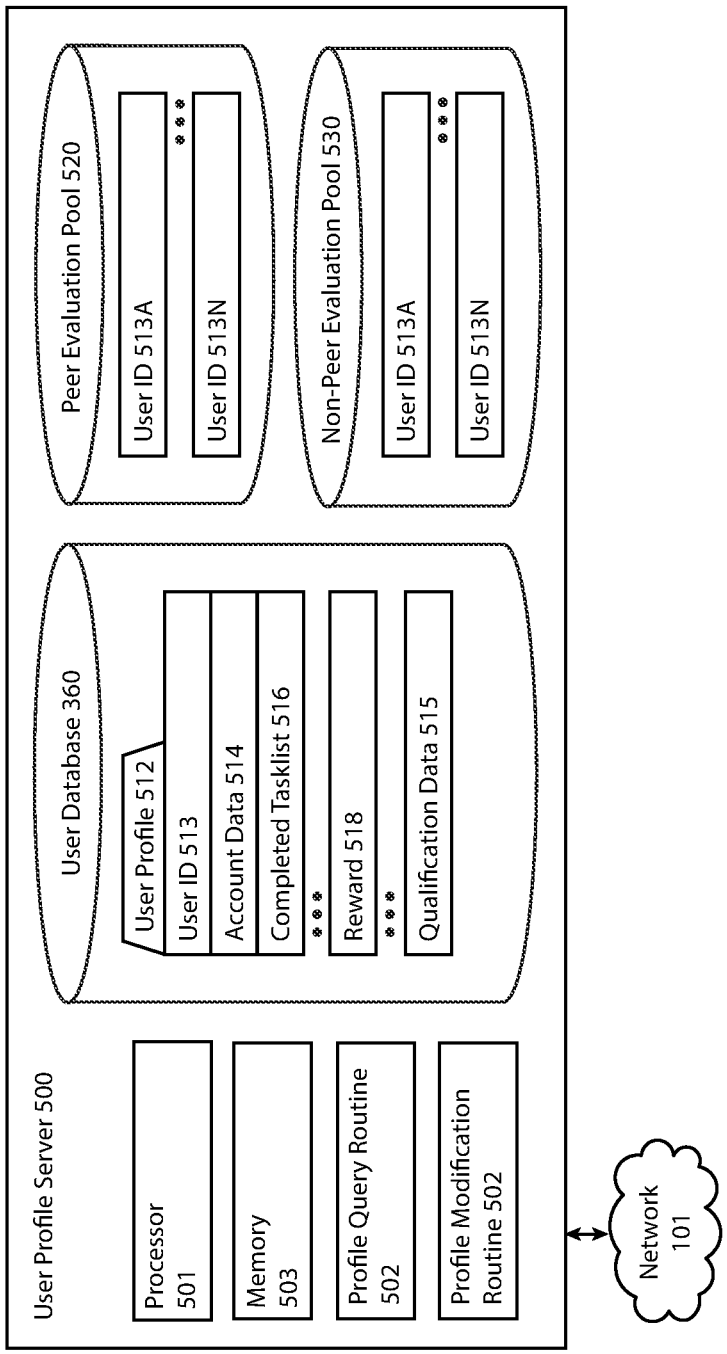
FIG. 5 illustrates a user profile server, including a user database, a peer evaluation pool usable for a peer evaluation process and/or a panel evaluation process, and a non-peer valuation pool that may comprise experts and/or organizational representatives usable in a non-peer evaluation process, according to one or more embodiments.

FIG. 5 illustrates a user profile server 500, according to one or more embodiments. The user profile server 500 comprises a process 501 and a memory 503 that is a computer memory. The profile query routine 502 includes software code to respond to one or more queries, such as queries generated from the coordination server 300 to retrieve data from the user database 510 and/or a user profile 512. The profile modification routine 504 may include software code for generating, modifying, and/or deleting a user profile 512.

The user database 510 may include one or more user profiles 512, each of which may be associated with a user 100 and/or a user 110. The user profile 512 may have a unique identifier 513 through which it may be addressed by a query. An account data 514 comprises data that may describe or otherwise is associated with the user 100 (e.g., a legal name, contact information, etc.). Although the user profile 512 may represent a person, the user profile 512 may also be created for and represent a machine user, according to one or more embodiments.

A qualification data 515 may include data which may be utilized to qualify the user 100 in addition to other data. For example, the qualification data 515 may include an affiliation with a company, a text-based resume or CV which may be analyzed through natural language search, a certification, etc. In one or more embodiments, the user profile 512 may include a completed tasklist 516 that includes one or more instances of the one or more condition IDs 413 and/or task IDs 423 that the user 100 has completed. Tracking completions may be useful, for example, where the user 100 may qualify to complete one or more tasks associated with a task profile 422 only one time. Similarly, a set of tasks available to the user 100 may depend on prior completions of other tasks (e.g., in order to define increasing challenging tasks, or to implement a sequential treasure hunt). Additional aspects of task selection, completion, and tracking are discussed in conjunction with the embodiment of FIG. 6. The user profile 512 may also store one or more rewards 518 that may be a reward balance and/or a reference to a reward 426 obtained by the user 100. For example, a balance of a digital currency and/or a cryptocurrency wallet may be stored in association with the user profile 512.

The user profile server 500 may further include one or more peer evaluation pools 520. The peer evaluation pool 520 specifies a group of one or more user profiles 512, for example through a stored sequence of UIDs 513. The peer evaluation pool 520 may be predetermined, for example applying to all user profiles 512 participating in and/or having signed up for a certain promotional activity. Such participation may be stored in the qualification data 515. The peer evaluation pool 520 may further be assembled through demographics (e.g., regional pools, where the one or more evaluation conditions 102 are likely to occur within the region). In one or more embodiments, the peer evaluation pool 520 may also be assembled dynamically, for example to respond to an evaluation request 103. For example, where a software developer submits code to pass a code review standard (e.g., the one or more conditions 102), the software developer may specify which language the code is written in, and a peer evaluation pool 520 may be assembled through query of the user database 510 for each user profile 512 where the qualification data 515 includes the language the code is written in. Dynamic assembly of the peer evaluation pool 520 may also be advantageous when each condition profile 412 includes a different instance of the evaluator criteria data 333. The peer evaluation pool 520 may also be utilized to assemble a session panel.

Similarly, the non-peer evaluation pool 530 may store a group of user profile 512 and/or references to user profiles 512 usable as non-peer evaluators (e.g., the user 110) for a given evaluation or type of evaluation of the one or more conditions 102. The non-peer evaluation pool 530 may be relatively static (e.g., five full-time employees at a company who arbitrate) and/or dynamic (e.g., assembled for each evaluation request 103 from a group of experts and/or a group of users overqualified to provide the evaluation).

FIG. 6 illustrates a task evaluation network 650, according to one or more embodiments. The task evaluation network 650 may be an instantiation of the evaluation network 150 adapted to assign a user 100 one or more tasks to be completed and then evaluate the one or more conditions 102 that is completion of the tasks according to a completion criteria data 424. In one or more embodiments, a user 100 may be assigned one or more tasks for completion, where the tasks are modeled by a task profile 422 and described in human readable form in the task description 425 of the completion criteria data 424. For example, the task description 425 may be "To complete this task, take a photo of at least one wild tortoise within 10 miles of Picacho Peak, Arizona. If there are multiple tortoises in the same photograph, you will receive a bonus for each additional one" and where the completion criteria data 424 may include additional data that may not be viewable to the user 100, such as hexadecimal geofence coordinates. The task description 425 may also include one or more photos to help the user 100 identify the tortoise, and optionally determine its gender. In this present example, the task may be a challenge related to a citizen-scientist project sponsored by a non-profit environmental organization and/or a government agency.

The task profile 422 may be selected by the user 100A on a client device 200 through a task application 601. In one or more other embodiments, the one or more tasks may be provided to the user 100A on the device 200 according to an algorithm and/or another method through a task serving engine 602. In one or more embodiments, the task serving engine 602 may select a task profile 422 from which the client device 200 of the user 100A will receive data, extract the one or more task IDs 423, extract the completion criteria data 424 (or a portion of the completion criteria data 424 such as the one or more task descriptions 425), and optionally a description of one or more rewards 426, if any.

Upon finding a tortoise in what the user 100A believes is within 10 miles of Picacho Peak while on a camping trip, the user 100A may take a photo using the device 200 (which may be accessible directly through the task application 601 making a function call to camera hardware of an operating system of the client device 200). The task application 601 may then generate the evaluation request 103, e.g., which may be initiated by the user selecting 'submit' in a graphical user interface. The evaluation request 103 may be communicated through the network 101 to the coordination server 300. The condition data 104 submitted may include the photograph, along with a set of GPS coordinates read from the operating system of the device 200.

The task evaluation engine 604 may select and apply one or more evaluation tiers 112. The task evaluation engine 604 may be a specialized instance of the condition evaluation engine 304 for evaluating conditions 102 related to tasks and/or defined in the task profile 422. For example, the task evaluation engine 604 may be configured to only effect one evaluation tier 112, such as a peer review by other users having the task application 601 (e.g., the user 100B on the device 600B, the user 100C on the device 600C). However, three instances of the evaluation tier 112 will be utilized in the present example to illustrate one possible configuration and use of the task evaluation network 650.

In the present example, the task evaluation engine 604 may apply a first evaluation tier 112.1 that includes an automated process that (i) determines that the GPS coordinates are within the geospatial boundary defined in the completion criteria data 424; and (ii) may apply an image recognition process (e.g., image recognition through an ANN 352 that may be trained with a training data set of tortoise photos) to recognize the photo submitted by the user 100A to determine if a tortoise exists within the photo and, if so, how many. If the first condition is determined to be true (e.g. that the user 100A is within the geospatial boundary defined in the completion criteria data 424) and the second condition is determined to be true (e.g. that at least one tortoise exists within the photograph), the user 100A may be deemed to have successfully completed the task and an associated existence value 109 generated. If more than one tortoise is found to exist within the photograph, there may be other existence values 109 generated. The user 100A may even be rewarded through association of the reward 426 with the user profile 512 of the user 100A (e.g., paid a sum of money, provided a free State Park entrance pass, etc., receive a coupon at a private vendor of a National Park, etc.). Where the GPS coordinates are outside the geospatial boundary, a non-existence value 111 may be generated and possibly returned as a notification to the client device 200A (e.g., "You are outside the study area"). According to one or more embodiments, the task application 601 may allow a user 100 to contest the one or more non-existence values 111 or existence values 109 (e.g. the user 100 may contest a determination that no more than one tortoise exists within the photo), or attempt to regenerate and submit the condition data 104.

In such case that only the photo is determined to not match following application of the image recognition (e.g., an indeterminate value where the image recognition may have a fairly high propensity for false negatives), or the one or more non-existence values 111 or existence values 109 is contested, then the task evaluation engine 604 may select a user profile 512 of a user 100B who may be a peer to provide an evaluation tier 112.2. The peer evaluator may then review the condition data 104 and the completion criteria data 424, and in turn to render one or more second determinations 108.2. Where the user 100B has a lower reputation score, which may generally equate to lower accuracy, the evaluation 112.3 may automatically occur in which case a non-peer may be selected (e.g., the user 110, who may have a user profile 512 indicating that they are a trained biologist, a naturalist, etc.). The evaluation tier 112.3 may also be triggered where the evaluation tier 112.2 indicates that an animal is within the frame, but that it is not a tortoise. This incident may also be of interest to the user 110 and may also need to be reviewed because the peer evaluator may not otherwise recognize an unusual circumstance (e.g., an albino tortoise). In the present example, the non-peer evaluation may act as the final evaluation tier 112, and depending on one or more determination values 108.3 various adjustments may be made to the evaluation process, including adjusting a reputation value of the user 100A and/or the user 100B.

The user 110 may also have been responsible for defining and/or storing the task profile 422 through a task profile creation module 654 which may be an application running on the device 200 (e.g., a desktop computer, a laptop, a mobile device) communicating with the coordination server 300 and/or the condition profile server 400. In the present example, the user 110 may be the scientist running a biological study and attempting to utilize visitors to a study area in order to collect data that would otherwise be difficult to gather. The coordination server 300 may operate a platform permitting many instances of the user 110 to operate concurrently with a national userbase as contributors. Other scientists could also act as data validators for the user 110 (e.g., in this case, a scientific "peer" of the non-peer expert that can provide scientific "peer review" of the study and its raw data).

Figure 7:
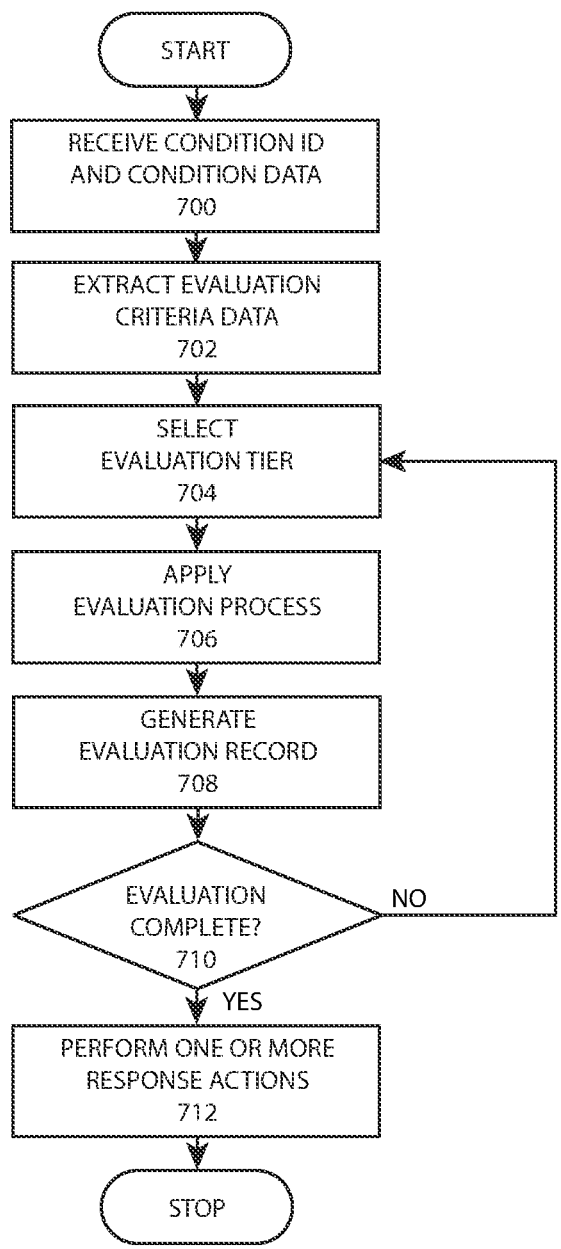
FIG. 7 illustrates a condition evaluation process flow, according to one or more embodiments.

FIG. 7 is a condition evaluation process flow 750, according to one or more embodiments. Operation 700 receives one or more condition IDs 413 of a condition profile 412 and a condition data 104. The condition profile 412 defines one or more conditions 102, the existences of which may be evaluated through the condition evaluation process flow 750. The condition data 104 evidencing a state of the one or more conditions 102 may be generated by: a device 200 of a user 100, the self-executing contract 152, and/or a machine user (e.g., a traffic camera overlooking a freeway, an IoT device, etc.). Operation 702 extracts an evaluation criteria data 414 from a database, for example from a condition profile 412. The condition profile 412 may be queried utilizing the one or more condition IDs 413.

Operation 704 selects an evaluation tier 112. The evaluation tier 112 may be selected through a variety of factors. For example, the evaluation tier 112 may be selected based on the type or characteristic of a condition profile 412 (e.g., a monetary value of a reward 426). In one or more embodiments, the evaluation tier 112 may be defined in a data structure stored within the condition profile 412, referenced by the condition profile 412, and/or otherwise designated for use in association with the condition profile 412. In one or more embodiments, the data structure may be an evaluation hierarchy data 115.

Operation 706 applies the evaluation process of the evaluation tier 112. For example, the evaluation process may be an automated evaluation process, a peer evaluation process in which a user 100B that shares certain characteristics with a user 100A who generate the condition data 104, a panel evaluation process in which one or more peer evaluators collectively provide the evaluation, and a non-peer evaluation process in which a user 110 having certain non-shared characteristics with the user 100A provides the evaluation. One or more determination values 108 may be generated by the evaluation process, for example one or more existence values 109 that one or more conditions 102 exists, one or more non-existence values 111 that one or more conditions 102 does not exist, an indeterminate value that existence or non-existence cannot be determined, a combination of existence values 109, non-existence values 111, and/or indeterminate values, or another response.

Operation 708 may generate an evaluation record 432 of the evaluation tier 112. The evaluation record 432 may include, for example, a record ID 433, one or more condition IDs 415, the condition data 104, and/or an evaluator data 434 (specifying which users 100 and/or automated processes applied the evaluation tier 112).

Operation 710 determines whether the evaluation is complete. For example, there may be another evaluation tier 112 specified to be completed to re-evaluate and/or validate a previous evaluation tier 112, as may also be defined in the evaluation hierarchy data 115. Where another evaluation tier 112 is to be applied, operation 710 returns to operation 704. If no additional evaluation tier 112 is to be applied, operation 710 proceeds to operation 712. Operation 712 may then perform one or more response actions 419. Such response actions 419 may include almost any automated or semi-automated response, including activating a physical device, generating an audit record (if different than the evaluation record 432), generating a reward 426 for a user 100, initiating various account actions such as adjusting a user 100's reputation value, prompting a person or an organization to take some kind of action, and/or other actions.

Figure 8:
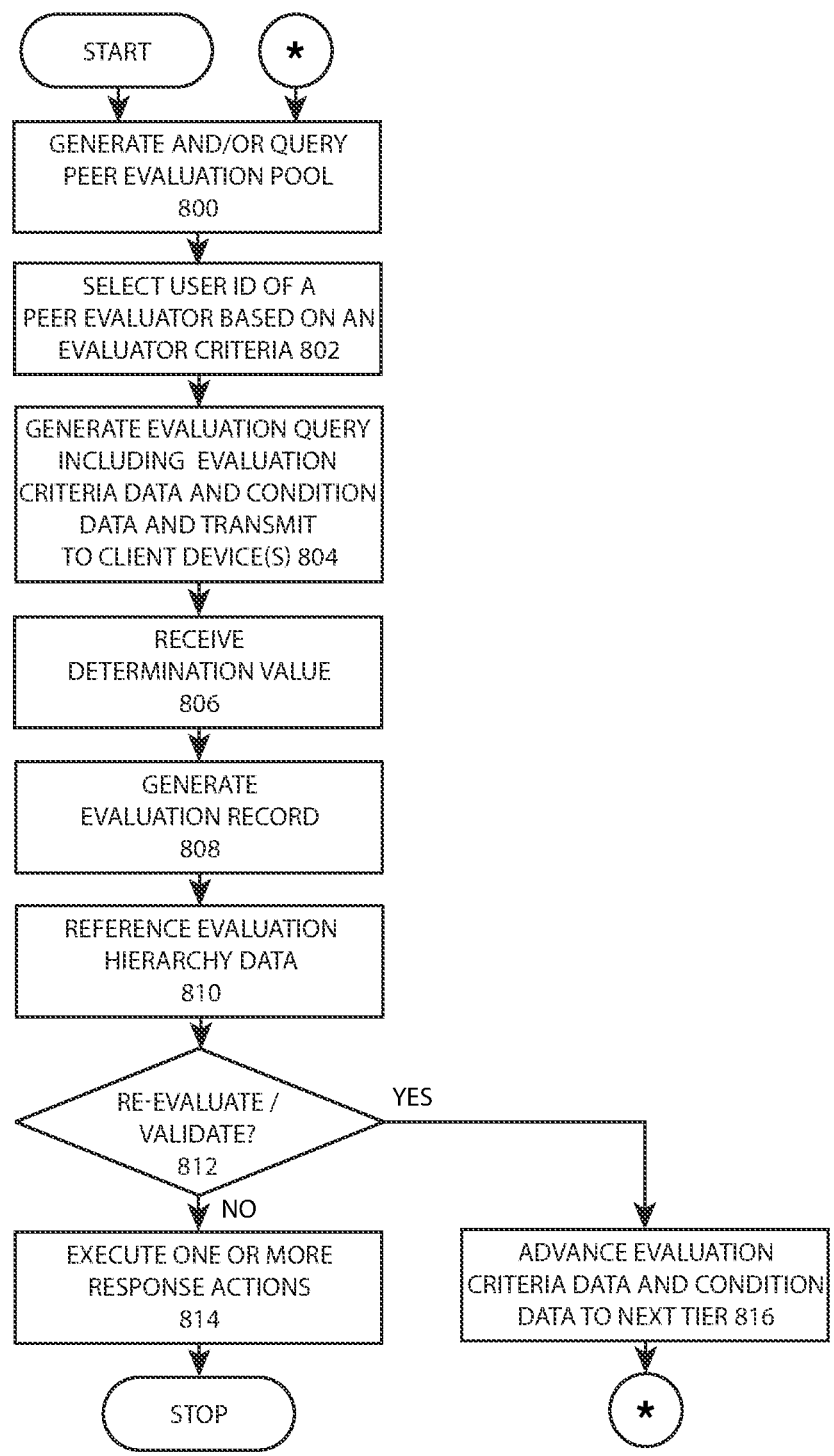
FIG. 8 illustrates a peer evaluation process flow, according to one or more embodiments.

FIG. 8 illustrates a peer evaluation process flow 850, according to one or more embodiments. The peer evaluation process flow 850 may be utilized to provide an evaluation tier 112 based on peer evaluation. The evaluation tier 112 utilizing the peer evaluation process flow 850 may be a first evaluation tier 112.1, or may be a "downstream" evaluation tier 112.n, as denoted thorough the Circle '*' entry point to operation 800.

Operation 800 generates and/or queries a peer evaluation pool 520. The peer evaluation pool 520 may include one or more user profiles 512 (and/or an array of user IDs 513 of a set of user profiles 512) sharing one or more common "peer" characteristics. For example, the peer characteristic may be a demographic (e.g., age, location), a qualification (or lack of qualification), and/or account type (e.g., an unpaid user of a service versus a paid user of a service), etc. Operation 802 selects a user ID 513 of a peer evaluator (e.g., the user 100) based on an evaluator criteria. For example, the evaluator criteria may be that the user profile 512 simply belong to the peer evaluator pool 512, or may further require a qualification (e.g., a reputation score of a certain level, a certain additional characteristic). In one or more embodiments, the evaluator criteria may act as a further filter on the peer evaluation pool 520.

Operation 804 may generate the evaluation query 123 and transmit an evaluation criteria data 414 and a condition data 104 to a client device 200 associated with the peer evaluator, for example over a network 101. Operation 806 receives one or more determination values 108 from the peer evaluator, for example one or more existence values 109, one or more non-existence values 111 and/or one or more intermediate values. Operation 808 generates an evaluation record 432 of the peer evaluation. The evaluation record 432 may store data necessary to reconstruct the peer evaluation and/or its important components, including which condition or set of conditions 102 was being evaluated (as may be identified by the one or more condition IDs 413), what data evidenced the one or more conditions 102 (e.g., the condition data 104), what criteria and/or standard was used to evaluate the one or more conditions 102 (e.g., the evaluation criteria data 414), and/or the outcome of the evaluation (the one or more determination values 108). Operation 810 references an evaluation hierarchy data 115 to read data defining additional evaluation process and/or validation processes to be applied, according to one or more embodiments.

Operation 812 determines whether a re-evaluation and/or a validation of the evaluation tier 112 should be completed. If re-evaluation and/or validation is to occur, operation 812 proceeds to operation 816. Otherwise, if no re-evaluation and/or validation is to occur, operation 812 proceeds to operation 814. Operation 814 may execute one or more response actions 418, as shown and described through the present embodiments. Operation 816 may advance the evaluation criteria data 414 and the condition data 104 to a next evaluation tier 112 along path Circle leading out of operation 816.

Figure 9:
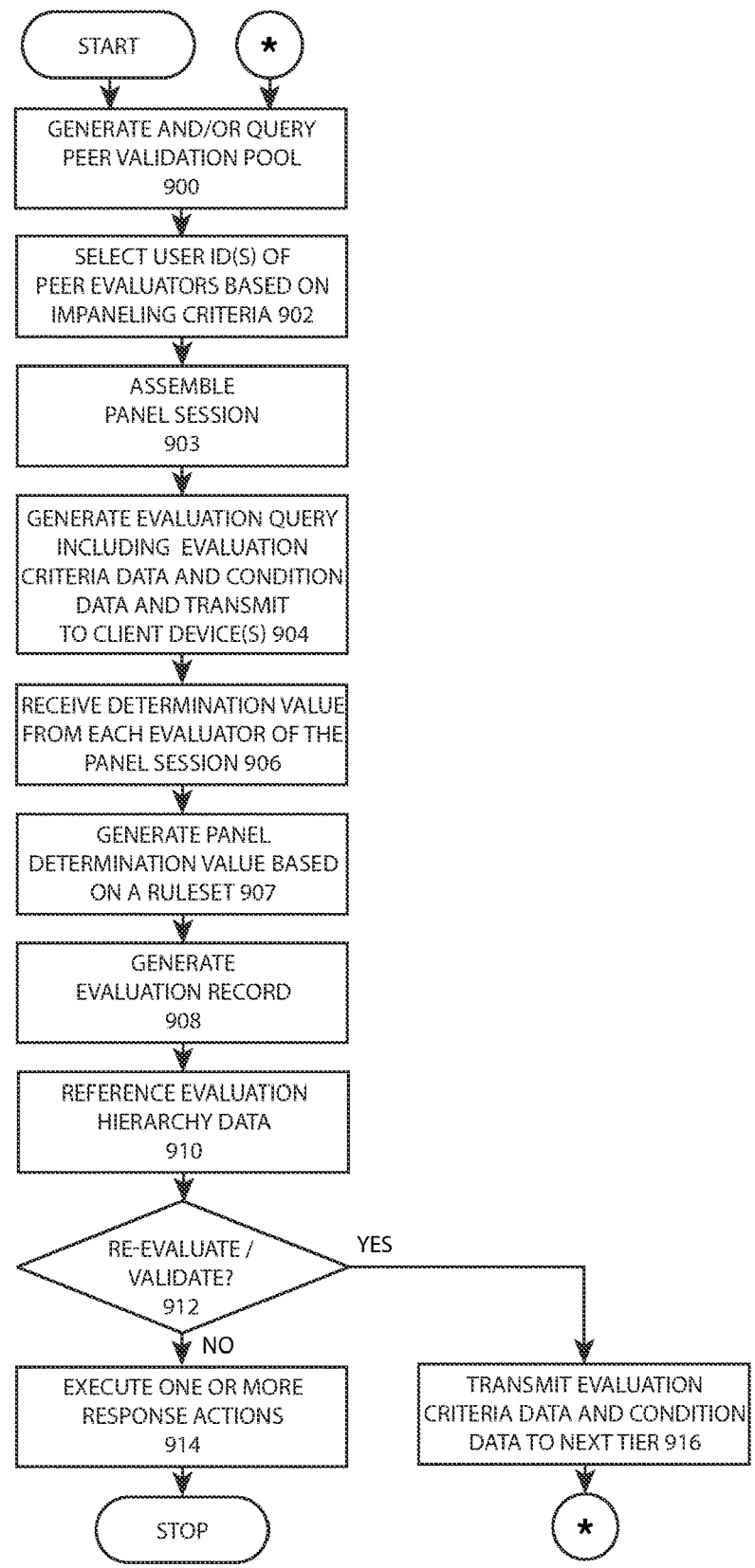
FIG. 9 illustrates a panel evaluation process flow, according to one or more embodiments.

FIG. 9 illustrates a panel evaluation process flow 950, according to one or more embodiments. An evaluation tier 112 that utilizes the panel evaluation process flow 950 may be a first evaluation tier 112.1, or may be a "downstream" evaluation tier 112.n, as denoted thorough the Circle '*' entry point to operation 900.

Operation 900 generates and/or queries a peer validation pool, and may operate similarly to operation 800. Operation 902 selects two or more user IDs 513 of user profiles 512 of peer evaluators based on an impaneling criteria. The impaneling criteria may be stored as an impaneling criteria data 343, which may be stored within and/or referenced by the condition profile 412 and/or the evaluation hierarchy data 115. The impaneling criteria, for example, may be demographic diversity, varied characteristics (while still qualifying as a peer within a common characteristic), a combined reputation score based on a reputation score of each user of the panel, and/or other factors. Operation 903 generates a panel session. The panel session may be tracked through a server (e.g., the coordination server 300) and include a temporary database and/or data object for tracking a status each user 100 acting as an evaluator within the panel session. For example, data that may be traded includes which devices 200 have received the condition data 104 to be evaluated, which users 100 have submitted one or more determination values 108, etc. The panel session may be administered through various rules, for example that a quorum of responses are required for the panel session to render an evaluation. As another example, there may be a rule barring a user 100 from a response (and possible lowering a reputation value) if the user 100 does not respond within 24 hours of receipt of the condition data 104. The panel session may also include asynchronous and/or real-time communications channels that may assist in discussion and/or debate regarding the evaluation (however, in some cases, non-communication between panel members may be preferred). Operation 904 may generate the evaluation query 123 and transmit an evaluation criteria data 414 and a condition data 104 to a client device 200 associated with each user 100 within the panel. Operation 906 receives one or more determination values 108 from each evaluator of the panel session. The one or more determination values 108 of each may vary, with one or more determination values 108 being generated storing each of one or more determination values 108. Operation 908 may then generate one or more panel determination values (e.g., the one or more determination values 108 of the panel session) based on a ruleset. The ruleset, for example, may require that, for each of the one or more determination values 108 generated by a user 100), a certain threshold of consistent determination values 108 of each user 100 must be achieved (e.g., a majority, a two-thirds majority, a unanimous determination). Another example of the ruleset may be weighing the one or more determination values 108 of each user 100 based on a reputation value of the user profile 512.

Operation 908 may generate an evaluation record, and may operate similarly to operation 808 except that the one or more determination values 108 of each user 100 may be stored in association with the panel session. Operation 910 may reference an evaluation hierarchy data 115, and may operate similarly to operation 810.

Operation 912 may determine whether a re-evaluation and/or a validation of the evaluation tier 112 should occur. If re-evaluation and/or validation is to occur, operation 912 proceeds to operation 916. Otherwise, if no re-evaluation and/or validation is to occur, operation 912 proceeds to operation 914. Operation 914 may execute one or more response actions 419, for example as read from the response action data 418, as shown and described through the present embodiments. Operation 916 may advance the evaluation criteria data 414 and the condition data 104 to a next evaluation tier 112 along path Circle '*' leading out of operation 916.

Figure 10:
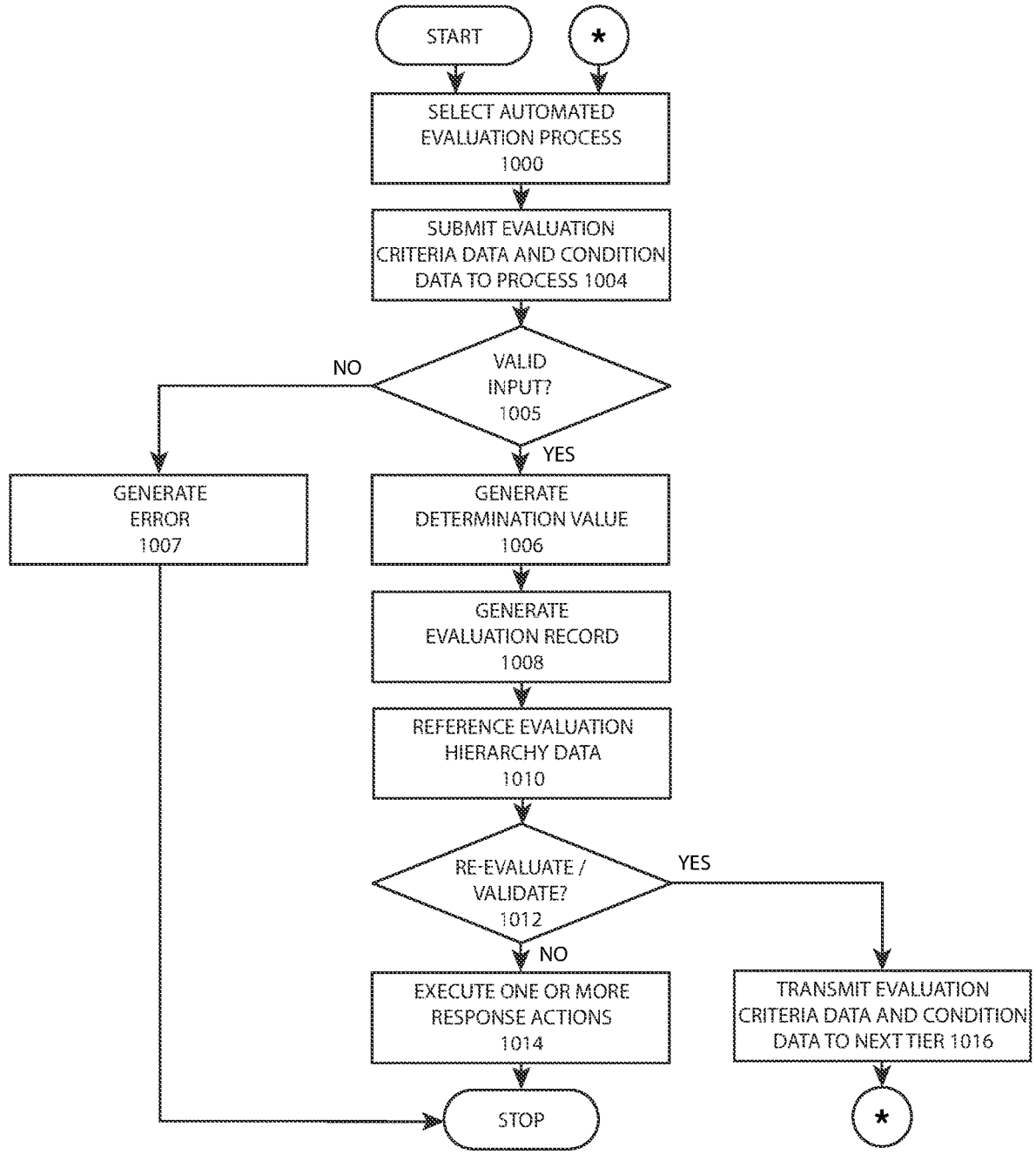
FIG. 10 illustrates an automated evaluation process flow, according to one or more embodiments.

FIG. 10 illustrates an automated evaluation process flow 1050, according to one or more embodiments. The evaluation tier 112 utilizing the automated evaluation process flow 1050 may be a first evaluation tier 112.1, or may be a "downstream" evaluation tier 112.n, as denoted thorough the Circle '*' entry point to operation 1000. Operation 1000 may select an automated evaluation process. The automated evaluation process may receive the condition data 104 and the evaluation criteria data 414 as inputs and generate one or more determination values 108 as an output. In one or more embodiments, the automated evaluation process may be relatively straightforward, for example checking the condition data 104 for a value or other data to be present. In one or more embodiments, pre-processing may be required, for example through optical character recognition and/or image analysis and pattern matching. Operation 1004 submits the evaluation criteria data 414 and the condition data 104 to the evaluation process. For example, the evaluation criteria data 414 may be extracted from a condition profile 412 and the condition data 104 may be extracted from an evaluation request 103, where the evaluation criteria data 414 is used to select an artificial neural network 352 for recognition of an image and the condition data 104 is used as an input to an input layer of the ANN 352. An additional process flow illustrating use of the artificial neural network 352 is shown and described in conjunction with the embodiment of FIG. 12. Operation 1005 may determine whether the condition data 104 is a valid input to the selected automated process. If the condition data 104 is not a valid input, operation 1007 may generate an error. Where a user 100 generated the evaluation request 103, the user 100 may be requested to resubmit and/or recreate the condition data 104. Alternatively, or in addition, a different automated process for which the condition data 104 is a valid input may be selected. If the condition data 104 is a valid input, operation 1005 may proceed to operation 1006 which may generate one or more determination values 108 based on application of the automated process. Operation 1008 may generate an evaluation record 432, and may operate similarly to operation 908.

Operation 1012 may determine whether a re-evaluation and/or a validation of the evaluation tier 112 should be completed. If re-evaluation and/or validation is to occur, operation 1012 may proceed to operation 1016. Otherwise, if no re-evaluation and/or validation is to occur, operation 1012 may proceed to operation 1014. Operation 1014 may execute one or more response actions 1018, as shown and described through the present embodiments. Operation 1016 may advance the evaluation criteria data 414 and the condition data 104 to a next evaluation tier 112 along path Circle '*' leading out of operation 1016.

Figure 11:
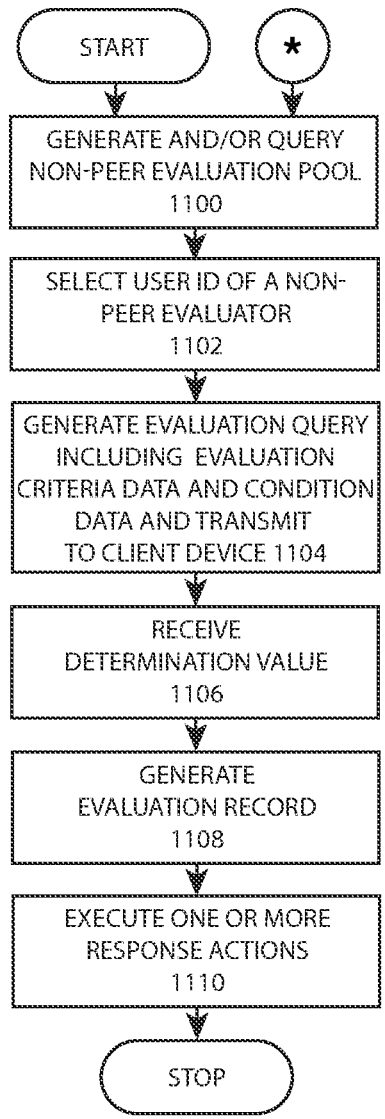
FIG. 11 illustrates a non-peer evaluation process flow, according to one or more embodiments.

FIG. 11 is a non-peer evaluation process flow 1150, according to one or more embodiments. An evaluation tier 112 utilizing the non-peer evaluation process flow 1150 may be a first evaluation tier 112.1, or may be a "downstream" evaluation tier 112.n, as denoted thorough the Circle '*' entry point leading into operation 1100. Operation 1100 may generate and/or query a non-peer evaluation pool 530. Each of the non-peer evaluators, shown as the user 110, may be distinguishable from peers through one or more characteristics of a user profile 512, including qualification, status, experience, skill, account type, subscription type, or other information. Operation 1102 may select a user ID 513 of a non-peer evaluator. Operation 1104 may generate the evaluation query 123 and transmit the evaluation criteria data 414 and the condition data 104 to the client device 200 of the user 110. Operation 1106 then receives one or more determination values 108 from the device 200 of the user 110. Operation 1108 may generate an evaluation record 432. In one or more embodiments, the user 110 may also stamp, sign, add a digital certificate to, or otherwise certify the evaluation record 432. Operation 1110 may then perform one or more response actions 419 depending on the one or more determination values 108 generated in a non-peer evaluation.

Although not shown in the embodiment of FIG. 11, the non-peer evaluation does not have to be a terminal evaluation of the evaluation hierarchy data 115. For example, an Operation 1112 (not shown) may determine whether a re-evaluation and/or a validation of the evaluation tier 112 should be completed, similar to operation 1110. If re-evaluation and/or validation is to occur, operation 1112 could proceed to an operation 1116, similar to operation 1016. Otherwise, if no re-evaluation and/or validation is to occur, operation 1112 could proceed to execute the one or more response actions. Operation 1116 could then advance the evaluation criteria data 414 and the condition data 104 to a next evaluation tier 112.

Although in one or more embodiments a "peer" and "non-peer" may be treated as two distinct groups, it will be appreciated that an arbitrary number of peer and non-peer groups may be defined. For example, where the evaluation is within an academic requirement and relies on increasing knowledge and experience to increase evaluation accuracy, a peer evaluator may be an undergraduate student, a first type of non-peer evaluator may be a graduate student, and a second type of non-peer may be a professor. Such groups may also overlap depending on the selected characteristics.

Figure 12:
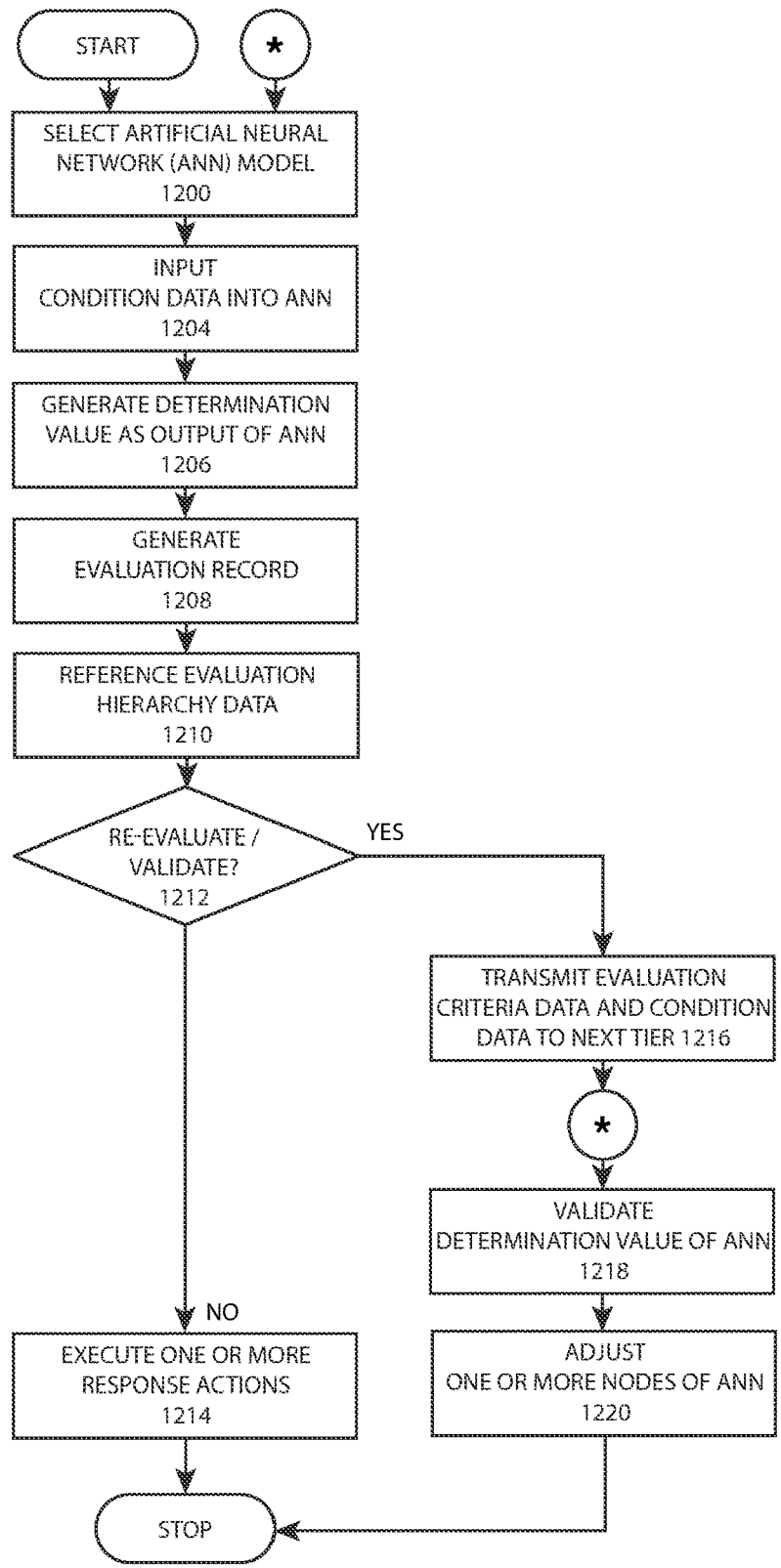
FIG. 12 illustrates an artificial neural network evaluation process, according to one or more embodiments.

FIG. 12 illustrates an artificial neural network evaluation process flow 1250, according to one or more embodiments. An evaluation tier 112 utilizing the artificial neural network evaluation process flow 1250 may be a first evaluation tier 112.1, or may be a "downstream" evaluation tier 112.$n$, as denoted thorough the Circle '*' entry point to operation 1200.

Operation 1200 selects an artificial neural network 352 (which may also be referred to as an ANN 352) model, for example to classify the condition data 104 as evidencing each of the one or more conditions 102 existing and/or non-existing, and/or to classify one or more elements of the condition data 104 into two or more classifications (e.g., "great, good, fair, poor."). There may be various ANN 352 models stored and accessible including with varying levels of specialization or generality. For example, if a general purpose ANN 352 is specified, an error rate may be expected to be higher (and therefore downstream evaluation tiers 112 may be recommended) but little or no training data may be required prior to production use. On the other hand, an ANN 352 may be available for the particular evaluation of the one or more conditions 102, as may be further trained through expanding the training data, for example validation as discussed in operation 1218 and operation 1220, below. The ANN 352 to be used may be defined within the condition profile 412, within the evaluation hierarchy data 115, and/or may be determined through meta-analysis of a set of available instances of the ANN 352. The user 110 and/or the user 100 setting up the condition profile 412 may select the ANN 352 to be utilized through an interface, including testing the ANN 352 on sample data before selection, according to one or more embodiments.

Operation 1204 may input the condition data 104 into the ANN 352. For example, the condition data 104 may be fractionated into discrete bundles of data (e.g., pixels, groups of pixels, blocks of text, functional units, etc.) and input into an input layer of neural network nodes (referred to in the context of the ANN 352 as a node). The ANN 352 may include a deep learning model comprising an input layer of nodes, one or more hidden layers of nodes, and an output layer of nodes, according to one or more embodiments. Operation 1206 may generate one or more determination values 108 as the output of the ANN 352. The output may be collected from the output nodes. Operation 1208 may generate an evaluation record and may operate similarly to the operation 1108.

Operation 1212 determines whether a re-evaluation and/or a validation of the evaluation tier 112 should be completed. If re-evaluation and/or validation is to occur, operation 1212 proceeds to operation 1216. Otherwise, if no re-evaluation and/or validation is to occur, operation 1212 proceeds to operation 1014. Operation 1214 may execute one or more response actions 419, for example read from the response action data 418, as shown and described through the present embodiments. Operation 1216 may advance the evaluation criteria data 414 and the condition data 104 to a next evaluation tier 112 along path Circle '*' leading out of operation 1216.

Operation 1218 and operation 1220 may be used to update, improve, and/or train the ANN 352. Operation 1218 and operation 1220 may run concurrently with additional evaluation tiers 112, e.g., even while the artificial neural network evaluation process flow 1250 has proceeded along path Circle '*' leading out of operation 1216. Operation 1218 may validate the one or more determination values 108.1 generated by the ANN 352. The validation may occur through comparing the one or more determination values 108.2 of a different evaluation tier 112.2. For example, where operation 1216 proceeds to operation 1100, with one or more determination values 108.2 generated in operation 1106, the one or more determination values 108.2 may be compared to the one or more determination values 108.1 to determine if the ANN 352 correctly identified the one or more conditions 102. The one or more determination values 108.1 and the condition data 104 may then be utilized as additional training data for the ANN 352. Operation 1220 adjusts one or more nodes of the ANN 352, e.g., as a result of applying the one or more determination values 108.1 and the condition data 104 as additional training data (e.g., node weights and/or node coefficients). Operation 1220 may then end.

Figure 13:
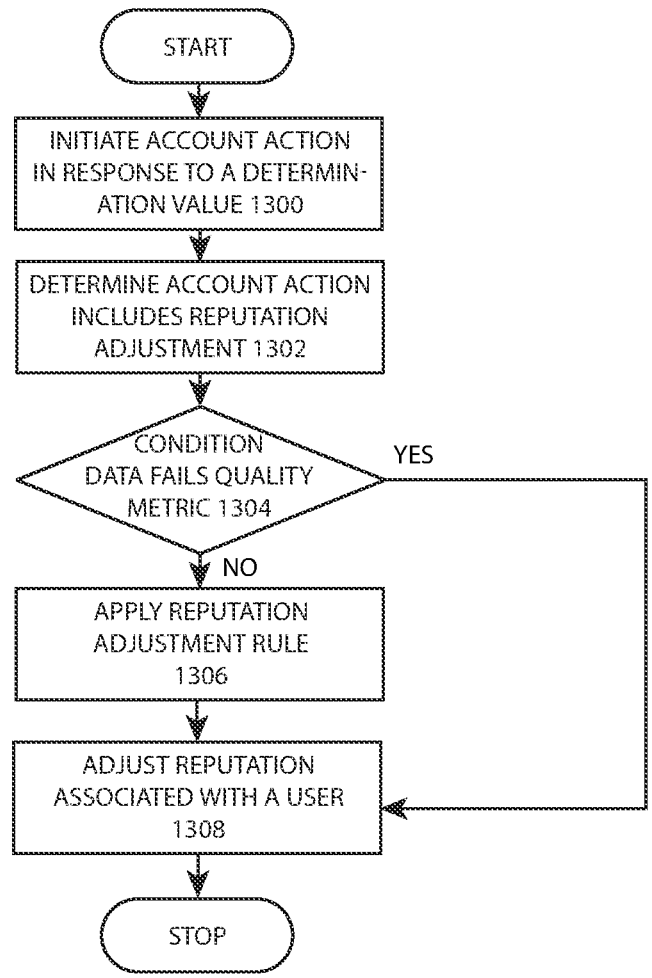
FIG. 13 illustrates an account action response process flow for automatically administering incentives and/or disincentives to users engaging in the peer and/or panel evaluation process to promote increased accuracy and/or accountability, according to one or more embodiments.

FIG. 13 illustrates an account action process flow 1350, according to one or more embodiments. Before describing the account action process flow 1350, a reputation system will be described. A reputation system may be utilized to incentive thoughtful and accurate evaluations by the users 100 and/or the users 110. A reputation value linked to actions taken by a user profile 512 may be associated with benefits or detriments within the evaluation network 150. For example, a high reputation value may result in more evaluations assigned to a user profile 512 within the peer evaluation pool 520, which may provide additional reward or benefit to the user 100 associated with the user profile 512 (e.g., increased messaging board editing privileges, a per-evaluation monetary payment). The reputation value may also relate to a reward status of the user profile 512, for example qualifying the user profile 512 for higher rewards for completing a task associated with a task profile 422.

A high reputation value may also increase an accuracy of an evaluation. For example, within the evaluation hierarchy data 115 it may be defined that if an evaluation is provided by a user profile 512 having a threshold reputation value, then no advancement reference 124 is traversed and the one or more determination values 108 may be a final outcome. According to one or more embodiments, such use of a reputation value may further increase efficiency.

In yet another example, the reputation system may be associated with a reward system for a cryptocurrency, and/or a validation system and/or consensus mechanism. For example, a validator that is validating cryptocurrency transactions (e.g., a "node" of the network) may, in one or more embodiments, receive a validation and/or mining reward that is at least partially dependent on a reputation score.

The account action process flow 1350 will now be described. Operation 1300 may initiate an account action in response to one or more determination values 108. The account action may be defined in the one or more response actions 419, according to one or more embodiments. The account action may include a positive action and/or a negative action with respect to an account associated with a user profile 552. The account action may also increase reputation, decrease reputation, or suspend an account depending on overall ratios and/or rates of "incorrect" evaluations as determined through validation by other evaluation tiers 112.

Operation 1302 may determine that the account action includes a reputation adjustment. In one or more embodiments, the account action may include decreasing a reputation value where one or more determination values 108.1 generated by the user 100 as a peer in an evaluation tier 112.1 is different than one or more other determination values 108.2 generated by a different evaluation tier 112.2. For example, referring to FIG. 1.3, one or more response actions 419.3C (e.g., following determination of the one or more existence values 109) may include decreasing a reputation value of a user profile 512 generating the one or more determinations 122.2 (e.g., one or more non-existence values 111). In one or more embodiments, the account action may include, for each of the one or more existence and/or non-existence values generated by a user 100 participating in a panel session, decreasing a reputation value of a user profile 512 of a user 100 based on a ratio of a set of non-existence values 111 and a set of existence values 109 generated by a panel session in which the user 100 participated.

In one or more embodiment, the account action may also include, for each of the one or more determination values generated by a user 100 acting as a peer in an evaluation tier 112.1, increasing a reputation value of the user profile 512 of the user 100 when the determination value 108.1 is similar or identical to a corresponding determination value 108.2 generated by a different evaluation tier 112.2. The account action may also increase reputation, decrease reputation, or suspend an account depending on overall ratios and/or rates of "incorrect" evaluations as determined through validation by other evaluation tiers 112.

Operation 1304 may determine whether the condition data 104 fails any quality metrics, for example a data validation. In one or more embodiments, it may have a negative impact on accuracy of validations through reputational adjustment if a quality of the condition data 104 evidencing the one or more conditions 102 is insufficient and/or difficult to compare to the evaluation criteria data 414. Operation 1314 may apply one or more automated processes to determine whether the condition data 104 meets a quality metric. For example, a photo that is too dark, or in which a primary subject of the photo is too small, may not result in negative reputational adjustment. In one or more embodiments, a quality score may be defined in one or more of the evaluation tiers 112. For example, each of the users 100 participating in a panel session may simultaneous generate both one or more determination values 108 and one or more quality values. If the quality value is low, the condition data 104 may fail the quality metric and not result in reputational adjustment for any of the users 100 participating in the panel. Similarly, no reputational adjustment would result for an "upstream" peer evaluator who would otherwise possibly have a reputation value adjusted as part of a validation by the panel session. If the condition data 104 fails the quality metric, operation 1304 may end. Otherwise, where the condition data 104 does not fail the quality metric, operation 1304 may proceed to operation 1306.

Operation 1306 may apply a reputation adjustment rule. The reputational adjustment rule determinates a type and/or magnitude of reputational adjustment. The reputational adjustment rule may depend on one or more inputs and/or factor. For example, a greater reputational increase may apply to a user profile 512 of a peer evaluator where, for each of the one or more determination values 108 generated by a user 100 acting as a peer evaluator, each evaluation tier 112 generated an identical determination value 108. Conversely, for each of the one or more determination values 108 generated by a user 100 acting as a peer evaluator, a reputational decrease may apply to said peer evaluator proportionate to the number of determination values 108 (e.g., the determination value 108.2 through the determination value 108.n) differing from the determination value 108.1 generated by another peer evaluator. In another example, reputation gain or reputation loss may be dependent on an existing reputation value of the user profile 512. Operation 1308 may then adjust the reputation value associated with a user 100, for example as may be stored in the user profile 512 of the user and/or tracked in a separate database.

FIG. 14 illustrates an evaluation verification process flow 1450, according to one or more embodiments. Operation 1400 may select the evaluation record 432 from a database of evaluation records 432, where the evaluation record 432 includes one or more existence values 109. For example and referring to the embodiment of FIG. 1.3, for each of the one or more existence values 109 generated in an evaluation, the existence value 109 once generated in one of the one or more evaluation tiers 112 may end further downstream evaluation. As a result, for each of the one or more existence values 109 generated in an evaluation, there may be fewer evaluations and/or little or no validation of an evaluation tier 112 generating the existence value 109. Operation 1402 may extract the evaluation criteria data 414 and the condition data 104 that may be stored within and/or referenced by the evaluation record 432. In one or more embodiments, the evaluation record 432 may include a reference to the condition profile 412, which may then be queried for the extraction.

Operation 1404 may select a new evaluation tier 112 for validation of the evaluation record 432. The new evaluation tier 112 may be different from an original evaluation tier 112 utilized to generate the evaluation record 432. Referring to the embodiment of FIG. 1.3 as an example, the evaluation tier 112.3 may be re-evaluated and/or validated by the evaluation tier 112.4. However, in one or more embodiments, a re-evaluation may occur by applying the same evaluation tier 112 again. For example, the evaluation tier 112.2 of FIG. 1.3 may be validated through re-applying the evaluation tier 112.2 with a different peer evaluator drawn at random from the peer evaluation pool 520.

Operation 1406 may submit the evaluation criteria data 414 and the condition data 104 to validate (i) the original evaluation tier 112.1 utilized to generate the evaluation record 432, and/or (ii) that the condition data 104 meets the evaluation criteria that may be defined in the evaluation criteria data 414. Operation 1408 may then optionally adjust a reputation value of one or more users 100 contributing to the evaluation record 432 (e.g., a peer evaluator, a user 100 participating in a panel session, a non-peer evaluator) based on an evaluation outcome. For each of the one or more determination values 108 generated by a user 100 participating in an evaluation, the evaluation outcome may be, for example, whether the determination value 108 generated was validated (what may be described as a positive outcome) or determined to be incorrect and/or changed (what may be described as a negative outcome).

FIG. 15 is an evaluation hierarchy data structure assembly process flow 1550, according to one or more embodiments. Prior to beginning the process flow 1550, a unique identifier (e.g., a GUID) may be generated for an evaluation hierarchy data 115. Operation 1500 defines an evaluation node 120.

Operation 1500 may store the evaluation node 120 in computer memory and reserve additional memory addresses for enlargement of the evaluation hierarchy data 115. Operation 1502 may select an evaluation process type. For example, a selection may be made for an automated process, a peer evaluation, a panel evaluation, a non-peer evaluation, and/or a different evaluation process. Operation 1504 may define one or more parameters of the evaluation tier 112. For example, where the evaluation process is an automated evaluation process, an ANN 352 or other machine learning algorithm may be selected for use, or where the evaluation process is a panel evaluation the impaneling criteria and/or rules for generating a single determination value or single set of determination values 108 from a set of determination values or a set of sets of determination values 108 (as in the case of multiple conditions 102 being evaluated and therefore multiple determination values 108 being generated by each user 100 participating in the panel session) from the panel session may be defined.

Operation 1506 may define one or more response actions and store the response actions as data associated with the evaluation node 120 (e.g., the one or more response actions 419). Operation 1508 may determine whether the evaluation node 120 (e.g., an evaluation node 120.$n$) should be adjusted and/or an additional evaluation node 120 (e.g., an evaluation node 120.$n$+1) added. If an addition is to occur, operation 1508 proceeds to operation 1509, which may define an advancement reference 124 to advance to the next evaluation node (e.g., 120.$n$+1). Similar to the advancement reference 124, a reassessment reference 126 may also include defining, as shown and described in conjunction with the embodiment of FIG. 1.3. If no additional evaluation node 120 is to be added or adjusted, in one or more embodiments operation 1508 may proceed directly to operation 1518 (not shown) and/or may proceed to operation 1510.

Operation 1510 may select a simulation data. The simulation data may include a set of parameters estimating an evaluation load across each of the one or more evaluation tiers 112 defined in the evaluation hierarchy data 115. The simulation data may also include estimates of expected evaluation time, computing resources (e.g., storage, processing cores, bandwidth), monetary cost, and/or other resources required to render an evaluation at each evaluation tier 112. For example, and referring to the embodiment of FIG. 1.3 as an example: (i) the evaluation tier 112.1 may receive one thousand evaluation requests per minute, incur an average evaluation time of four seconds, utilize computing resources costing an average of $0.0451 per evaluation, and have a 30% chance of traversing the advancement reference 124.1; (ii) the evaluation tier 112.2 may receive about three hundred evaluations per minute, incur an average time of one hour for the evaluation (e.g., based on peer evaluation), utilize computing resources costing an average of $0.0122 per evaluation, have a 17% chance of traversing the advancement reference 124.2A, and have a 24% chance of traversing the advancement reference 124.2B, etc. The parameters may also define a capacity of an evaluation load based on resource constraints, for example a limited number of non-peer evaluators, or an uncertainty in the response time of a panel session.

Operation 1512 runs an evaluation simulation. The simulation may include a dynamic evaluation load, for example modeling variability based on time of day, random spikes, etc. Real-world evaluation request data may also be utilized to run the simulation. Performance data may be gathered for each simulated instance of the evaluation tier 112. Operation 1514 may then determine an estimated evaluation load across each evaluation node 120, e.g., an average number of evaluation per unit time, and/or for dynamic loads a statistical function showing evaluation load as a function of time. Operation 1516 determines if an evaluation load exceeds (or is likely to exceed) an evaluation capacity of an evaluation node 120. For example, a server running machine learning models may only be able to process one evaluation per second, leading to evaluation requests 103 being buffered and/or eventually being discarded when the data buffer is saturated. In another example, there may be a limited number of non-peer evaluators, and they may only work certain hours (e.g., company employees trained to evaluate the condition data 104). While such non-peer evaluators may be seen in some cases as the more accurate and highest value evaluators, they may also be the most costly to an organization and therefore should have the associated resources conserved where possible.

If an evaluation load exceeds evaluation capacity, operation 1516 may return to operation 1502, where a user 100 and/or a user 110 controlling the simulation may redefine the properties of the evaluation node 120, including the type of evaluation tier 112 and/or its parameters. If the evaluation load does not exceed the evaluation capacity, operation 1516 may advance to operation 1518 which may store the evaluation hierarchy data 115 for production use.

FIG. 16 illustrates a task completion evaluation process flow 1650, according to one or more embodiments.

Operation 1600 may transmit a completion criteria data 424 of a task profile 422 to the device 200 of a user 100, including the evaluation criteria for determining the existence of one or more task completions and/or grades of task completion of a task by the user 100. The completion criteria data 424 may include a description of a completion criteria of one or more conditions 102 associated with the task profile 422 (e.g., the task description 425). Operation 1602 receives a condition data 104 alleging that a user 100 has completed at least one of the one or more tasks associated with the task profile 422. Operation 1602 applies one or more evaluation tiers 112 (e.g., which may include an automated evaluation process, a peer evaluation process, a panel evaluation process, and/or a non-peer evaluation process). Operation 1606 receives one or more determination values 108 specifying that the user 100 has completed at least one of the one or more tasks associated with the task profile 422. Operation 1608 associates a reward with the user profile 512, as may be defined in data as the reward 426. Operation 1610 may then optionally increase a reputation value of the user profile 512 and/or a reward status of the user profile 512. The reward status, for example, may provide for increased rewards associated with activity of the user profile 512, e.g., for completing tasks and/or participating in evaluations.

FIG. 17 illustrates a self-executing contract generation process flow 1750, according to one or more embodiments. Operation 1700 may generate a self-executing contract 152 including the evaluation criteria data 414 and the response action 419, where the response action 419 triggers upon (i) an evaluation outcome and/or a validation outcome associated with existence of the condition 102 (e.g., the existence value 109), (ii) an advancement condition (e.g., a condition for following the advancement reference 124), and/or (iii) an indeterminate criteria triggering upon a different evaluation outcome. Operation 1702 may submit the self-executing contract data 152 to a node of a distributed ledger network 157, for example as a DLT transaction 162. The distributed ledger network 157 may store a distributed ledger database 156 that includes a set of transaction blocks (e.g., the transaction blocks 154) including chained hash values. The peer evaluation pool 520 may include one or more users 100 controlling a medium of exchange of the distributed ledger network 157 (e.g., a cryptocurrency, a digital token) and/or authorized for use of the distributed ledger network 157. Operation 1704 receives the determination value 108 that was output from one or more evaluation tiers 112 upon execution of the self-executing contract data 152 by the DLT node 158 of the distributed ledger network 157. Operation 1706 may then generate a distributed ledger transaction 162 that includes a transfer of cryptocurrency to a public key (e.g., generated through a public-private key pair encryption) associated with a user profile 512, where the response action includes the transfer of cryptocurrency.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive. In addition, and without further affect on the interpretation of any other term user herein, reference to "a condition" (e.g., the condition 102) are to be read as "at least one condition," although nothing described herein requires a systems, methods, and/or devices to accommodate more than one such condition 102.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment (s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the evaluation network 150, the evaluation network 151, and/or the task evaluation network 650 according to the present invention will be apparent to those skilled in the art. Various aspects of the invention have been described above by way of illustration, and the specific embodiments disclosed are not intended to limit the invention to the particular forms disclosed. It is to be further understood that not all of the disclosed embodiments in the foregoing specification will necessarily satisfy or achieve each of the objects, advantages, or improvements described in the foregoing specification.

Elements of the claims and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for scalable evaluation of existence of one or more conditions, the system comprising:
   an artificial neural network comprising a plurality of input nodes of the artificial neural network;
   a machine learning engine comprising computer readable instructions that when executed:
      train the artificial neural network with a training data comprising a set of one or more condition data, one or more evaluation criteria data for determining existence of the one or more conditions, and a set of one or more determination values applying the one or more evaluation criteria to the one or more condition data,
         wherein the artificial neural network comprises one or more hidden layers of nodes of the artificial neural network;
   a condition profile server comprising a memory storing a condition profile,
      wherein the condition profile comprising an evaluation criteria data describing an evaluation criteria for determining existence of the one or more conditions,
      wherein the condition profile comprises a task profile, and
      wherein the one or more conditions comprising one or more task completions of one or more tasks by a first user;
   a coordination server comprising:
      an evaluation request agent comprising computer readable instructions that when executed:
         receive one or more condition IDs associated with the condition profile,
         receive a condition data indicating the existence of the one or more conditions, and
         extract the evaluation criteria data from the condition profile;
      a condition evaluation engine coordinating evaluation of the existence of the one or more conditions comprising
      a tier allocation routine comprising computer readable instructions that when executed:
         select a first evaluation tier to evaluate the condition data that comprises the artificial neural network; and
      an ANN execution routine comprising computer readable instructions that when executed:
         input the condition data into the artificial neural network, and
         generate a determination value of the artificial neural network;
      upon receipt of a determination value of the first evaluation tier select a second evaluation tier for further evaluation of the condition data and for validation of the first evaluation tier;
      a peer selection routine comprising computer readable instructions that when executed:
         select a user ID of a second user associated with a peer evaluation pool,
         generate an evaluation query comprising the evaluation criteria data and the condition data, and
         transmit the evaluation query to a device of the second user;
      an evaluation receipt agent comprising computer readable instructions that when executed:
         receive a determination value of the second user in response to the evaluation query;
      an evaluation recordation subroutine comprising computer readable instructions that when executed:
         generate an evaluation record comprising at least one of a user ID of the first user, the user ID of the second user, the determination value of the second user, the one or more condition IDs, and the evaluation criteria; and
   wherein the machine learning engine further comprising computer readable instructions that when executed:
      feed back one or more determination values of the second user into the training data, and
      retrain the artificial neural network with the training data comprising the one or more determination values of the second user to improve evaluation capability and increase evaluation request load on the first evaluation tier and reduce need for human input associated with, and evaluation request load on, the second evaluation tier; and
   a network communicatively coupling the artificial neural network, the machine learning engine, the condition profile server, and the coordination server.

2. The system of claim 1, wherein:
   the condition evaluation engine further comprising computer readable instructions that when executed:
      receive one or more existence values generated by a selection of the second user that the condition data meets the evaluation criteria for determining the existence of at least one of the one or more conditions;
   the coordination server further comprising a condition response engine comprising computer readable instructions that when executed:
      initiate one or more response actions associated with the condition profile; and
   the coordination server further comprising a condition completion subroutine comprising computer readable instructions that when executed:
      associate the one or more existence values, the user ID of the first user, and the one or more condition IDs of the conditions in a database.

3. The system of claim 1, wherein the coordination server further comprising computer readable instructions that when executed:
    determine an evaluation load on the second evaluation tier exceeds an evaluation capacity of the second evaluation tier; and
    adjust the evaluation load from the second evaluation tier to a third evaluation tier comprising a different artificial neural network configured to render a different determination value.

4. The system of claim 1, wherein the coordination server further comprising:
    a panel qualification subroutine comprising computer readable instructions that when executed:
        reference an impaneling criteria data specifying a criteria for a group of users to collectively act as at least one of an evaluator of the condition data and a validator of the first evaluation tier, and
        determine a set of two or more user IDs of a set of two or more users associated with the peer evaluation pool each meet an evaluator criteria and collectively meet the impaneling criteria,
            wherein the evaluator criteria comprising at least one of a reputation value of a user profile of a user, a first number of validation events, and an account type of a user profile of the user, and
    wherein the impaneling criteria data comprising at least one of a number of users, and a combined reputation score;
    a panel coordination engine comprising computer readable instructions that when executed:
        assemble a panel session comprising the set of two or more user IDs;
        transmit the evaluation criteria data and the condition data to a device associated with each of the two or more users of the panel session;
        receive one or more determination values of each of the two or more users of the panel session;
        determine a quorum meeting the criteria for the group; and
        generate a second set of one or more non-existence values based on one or more second determination values received from the two or more users of the panel session.

5. The system of claim 4, wherein the coordination server further comprising (i) computer readable instructions that when executed select a second evaluation tier and (ii) a non-peer selection routine comprising computer readable instructions that when executed:
    determine a user ID of a third user associated with a non-peer evaluation pool;
    transmit the evaluation criteria data and the condition data to a device associated with the user ID of the third user; and
    receive one or more third non-existence values generated by a selection of the third user that the condition data fails to meet the evaluation criteria for determining the existence of at least one of the one or more conditions.

6. The system of claim 5,
    wherein the condition evaluation engine further comprising a model selection routine comprising computer readable instructions that when executed:
        select the artificial neural network, and
    wherein the machine learning engine further comprising computer readable instructions that when executed:
        feed back one or more determination values from a different evaluation tier as an additional instance of the training data.

7. The system of claim 6, wherein the coordination server further comprising:
    a record verification engine comprising computer readable instructions that when executed:
        select the evaluation record from a database of evaluation records, wherein the evaluation record comprising one or more existence values;
        extract the evaluation criteria data and the condition data;
        select a new evaluation tier for validation of the evaluation record, wherein the new evaluation tier for the evaluation is different from an original evaluation tier utilized to generate the evaluation record;
        submit the evaluation criteria data and the condition data to validate at least one of (i) the original evaluation tier utilized to generate the evaluation record, and (ii) that the condition data meets the evaluation criteria; and
    an outcome notification subroutine comprising computer readable instructions that when executed:
        generate a notification for the first user that the condition data has been assigned the first set of one or more non-existence values; and
    an account action routine comprising computer readable instructions that when executed:
        initiate one or more account actions,
            wherein, for each existence and/or non-existence value generated by the first user, a first account action is decreasing a reputation value of a user profile of the first user based on a ratio of a set of non-existence values and a set of existence values generated by the panel session, and
            wherein a second account action is increasing a reputation value of a user profile of the second user;
    a hierarchy assembler comprising computer readable instructions that when executed:
        generate an evaluation hierarchy comprising two or more evaluation nodes each associated with an evaluation tier, wherein a first evaluation node of the two or more evaluation nodes storing an advancement reference for advancement of the evaluation to a second evaluation node of the two or more evaluation nodes;
    a load simulation routine comprising computer readable instructions that when executed:
        determine an estimated evaluation load on each of the two or more evaluation nodes;
        determine the estimated evaluation load on the second evaluation tier associated with the non-peer evaluation pool exceeds an evaluation capacity of the non-peer evaluation pool; and
        adjust at least one of the evaluator criteria data, the impaneling criteria data, and the evaluation hierarchy by adding one or more additional evaluation nodes;
    a contract generation engine comprising computer readable instructions that when executed:
        generate a self-executing contract comprising the evaluation criteria data, a response action data triggering one or more response actions upon at least one of an evaluation outcome and a validation outcome associated with the existence of at least one of the one or more conditions, and the advancement reference;
a distributed ledger transaction system comprising computer readable instructions that when executed:
submit the self-executing contract to a node of a distributed ledger network comprising a set of transaction blocks comprising chained hash values;
generate, in response to a call from a reward routine, a distributed ledger transaction comprising a transfer of a cryptocurrency to a public key associated with a user profile of a fourth user,
a task evaluation engine comprising computer readable instructions that when executed:
transmit the evaluation criteria data to the device of the first user comprising the evaluation criteria for determining the existence of the one or more conditions;
receive the one or more condition IDs associated with the condition profile from the device of the first user, wherein the evaluation criteria data is a completion criteria data;
transmit the completion criteria data to the device of the first user comprising a description of a completion criteria of the one or more conditions associated with the one or more condition IDs; and
receive a completion data alleging that the first user has completed at least one of the one or more tasks associated with the one or more condition IDs,
wherein the response action is associating one or more rewards with the user profile of the first user.

8. A method for scalable evaluation of an existence of one or more conditions, the method comprising:
training an artificial neural network comprising one or more hidden layers of nodes with a training data comprising one or more condition data, one or more evaluation criteria data, and one or more determination values;
receiving one or more condition IDs associated with a condition profile comprising an evaluation criteria data describing an evaluation criteria for determining existence of the one or more conditions;
receiving a condition data indicating the existence of at least one of the one or more conditions,
wherein the condition data received from a device of a first user alleging existence of at least one of the one or more conditions;
extracting the evaluation criteria data from the condition profile;
selecting a first evaluation tier to evaluate the condition data comprising the artificial neural network;
generating one or more determination values of the artificial neural network;
selecting a second evaluation tier for further evaluation of the condition data and for validation of the first evaluation tier;
selecting a user ID of a second user associated with a peer evaluation pool;
generating one or more evaluation queries comprising the evaluation criteria data and the condition data;
transmitting the one or more evaluation queries to a device of the second user;
receiving one or more determination values of the second user in response to the one or more evaluation queries;
generating an evaluation record comprising at least one of a user ID of the first user, the user ID of the second user, the one or more determination values of the second user, the one or more condition IDs, and the evaluation criteria;
feed back one or more determination values of the second user into the training data; and
retraining the artificial neural network with the training data comprising the one or more determination values of the second user to improve evaluation capability and increase evaluation request load on the first evaluation tier and reduce need for human input associated with, and evaluation request load on, the second evaluation tier.

9. The method of claim 8, further comprising:
receiving one or more existence values generated by a selection of the second user that the condition data meets the evaluation criteria for determining the existence of at least one of the one or more conditions;
initiating one or more response actions associated with the condition profile; and
associating the one or more existence values, the user ID of the first user, and the one or more condition IDs of the one or more conditions in a database.

10. The method of claim 8, further comprising:
determining an evaluation load on the second evaluation tier exceeds an evaluation capacity of the second evaluation tier; and
adjusting the evaluation load from the second evaluation tier to a third evaluation tier comprising a different artificial neural network configured to render a different determination value.

11. The method of claim 8, further comprising:
referencing an impaneling criteria data specifying a panel criteria for a group of users to collectively act as at least one of an evaluator of the condition data and a validator of the first evaluation tier;
determining a set of two or more user IDs of a set of two or more users associated with the peer evaluation pool each meet an evaluator criteria and collectively meet the panel criteria;
assemble a panel session comprising the set of two or more user IDs;
transmitting the evaluation criteria data and the condition data to a device associated with each of the two or more users of the panel session;
receiving one or more determination values of each of the two or more users of the panel session;
determining a quorum meeting the criteria for the group; and
generating a second set of one or more second non-existence values based on a second set of one or more determination values received from the two or more users of the panel session.

12. The method of claim 11, further comprising:
selecting a third evaluation tier;
determining a user ID of a third user associated with a non-peer evaluation pool;
transmitting the evaluation criteria data and the condition data to a device associated with the user ID of the third user; and
receiving one or more third non-existence values generated by a selection of the third user that the condition data fails to meet the evaluation criteria for determining the existence of at least one of the conditions.

13. The method of claim 12, further comprising:
selecting a fourth evaluation tier;

feeding back one or more determination values from a different evaluation tier as an additional instance of the training data; and
adjusting one or more weight values associated with one or more nodes of the artificial neural network.

14. The method of claim 13, further comprising:
selecting the evaluation record from a database of evaluation records, wherein the evaluation record comprising one or more existence values;
extracting the evaluation criteria data and the condition data;
selecting a new evaluation tier for validation of the evaluation record, wherein the new evaluation tier for the evaluation is different from an original evaluation tier utilized to generate the evaluation record;
submitting the evaluation criteria data and the condition data to validate at least one of (i) the original evaluation tier utilized to generate the evaluation record, and (ii) that, for at least one of the one or more conditions, the condition data meets the evaluation criteria; and
generating a notification for the first user that the condition data has been assigned a first set of one or more non-existence values; and
initiating one or more account actions,
wherein a first account action is decreasing a reputation value of a user profile of the first user based on, for each of the one or more determination values generated by each participant of the panel, a ratio of a set of non-existence values and a set of existence values generated by the panel session,
wherein a second account action is increasing a reputation value of a user profile of the second user,
wherein the evaluator criteria comprising at least one of a reputation value of a user profile of a user, a first number of validation events, a second number of validation events with matching outcomes from the different evaluation tier, and an account type of a user profile of the user, and
wherein the impaneling criteria data comprising at least one of a number of users, and a combined reputation score.

15. The method of claim 14, further comprising:
generating an evaluation hierarchy data comprising two or more evaluation nodes each associated with an evaluation tier, wherein a first evaluation node of the two or more evaluation nodes storing an advancement reference for advancement of the evaluation to a second evaluation node of the two or more evaluation nodes;
determining an estimated evaluation load on each of the two or more evaluation nodes;
determining the estimated evaluation load on the third evaluation tier associated with the non-peer evaluation pool exceeds an evaluation capacity of the non-peer evaluation pool; and
adjusting at least one of the evaluator criteria, the impaneling criteria data, and the evaluation hierarchy by adding one or more evaluation nodes.

16. The method of claim 15, further comprising:
generating a self-executing contract comprising the evaluation criteria data, a response action data specifying one or more response actions triggering upon at least one of an evaluation outcome and a validation outcome associated with the existence of at least one of the one or more conditions, and the advancement reference;
submitting the self-executing contract to a node of a distributed ledger network comprising a set of transaction blocks comprising chained hash values;
wherein the peer evaluation pool comprising one or more users at least one of controlling a medium of exchange of a distributed ledger network and authorized for use of the distributed ledger network;
determining that one or more determination values of a fourth user of the two or more users of the panel session meets a confidence criteria based on one or more corresponding determination values of each of the two or more users of the panel session other than the fourth user; and
generating a distributed ledger transaction comprising a transfer of a cryptocurrency to a public key associated with a user profile of the fourth user,
wherein a third account action is increasing a reputation value of a user profile of at least one user of the panel session based on the one or more determination values of each of the two or more users of the panel session other than the fourth user.

17. The method of claim 16, further comprising:
transmitting the evaluation criteria data to the device of the first user comprising the evaluation criteria for determining the existence of the one or more conditions wherein the condition profile is a task profile, and
wherein the one or more conditions includes a task completion of a task by the first user;
receiving the one or more condition IDs associated with the condition profile from the device of the first user, wherein the evaluation criteria data is a completion criteria data;
transmitting the completion criteria data to the device of the first user comprising a description of a completion criteria of the one or more conditions associated with the one or more condition IDs; and
receiving a completion data alleging that the first user has completed at least one of the one or more tasks associated with the one or more condition IDs,
wherein the one or more response actions includes associating a reward with the user profile of the first user,
wherein the condition profile further comprising additional evaluation criteria data describing additional evaluation criteria for determining existence of an arbitrary number of additional conditions,
wherein the evaluation hierarchy data further comprising one or more evaluation queries each resulting in one or more solutions states advancing to addition evaluation tiers, and
wherein the evaluation query comprising a second evaluation criteria data.

18. A computing device for scalable evaluation of existence of one or more conditions comprising:
an evaluation request agent comprising computer readable instructions that when executed:
receive one or more condition IDs associated with a condition profile comprising an evaluation criteria data describing an evaluation criteria for determining existence of one or more conditions,
receive a condition data indicating the existence of at least one of the one or more conditions, and
extract the evaluation criteria data from the condition profile;
a condition evaluation engine coordinating evaluation of the existence of the one or more conditions comprising a tier allocation routine comprising computer readable instructions that when executed:
select a first evaluation tier to evaluate a condition data comprising an artificial neural network, wherein the artificial neural network trained with a training data comprising a set of one or more condition data, a set of one or more evaluation criteria data for determining existence of the one or more conditions, and a set of one or more determination values applying the one or more evaluation criteria to the one or more condition data, wherein training the artificial neural network comprises adjusting one or more weight values associated with one or more nodes of the artificial neural network, and wherein the one or more nodes of the artificial neural network are within one or more hidden layers of nodes of the artificial neural network;

an ANN execution routine comprising computer readable instructions that when executed:
input the condition data into the artificial neural network, and
generate a determination value of the artificial neural network;

an evaluation recordation subroutine comprising computer readable instructions that when executed:
generate a first evaluation record comprising the one or more determination values of the artificial neural network, a first solution state, and the one or more condition IDs;

a peer selection routine comprising computer readable instructions that when executed:
select a user ID of a first user associated with a peer evaluation pool,
generate one or more evaluation queries for each of the one or more conditions comprising the evaluation criteria, and
transmit the evaluation query to a device of the first user;

an evaluation receipt agent comprising computer readable instructions that when executed:
receive from the first user a first solution state comprising a set of determination values for each of the one or more conditions in response to the evaluation query; and an evaluation recordation subroutine comprising computer readable instructions that when executed:
generate a second evaluation record comprising at least one of the user ID of the first user, the one or more determination values of the first user, a second solution state, and the one or more condition IDs;

a machine learning engine further comprising computer readable instructions that when executed:
feed back one or more determination values of the first user into the training data, and
retrain the artificial neural network with the training data comprising the one or more determination values of the first user to improve evaluation capability and increase evaluation request load on the first evaluation tier and reduce need for human input associated with, and evaluation request load on, the peer evaluation pool; and wherein the computing device communicatively coupled to a network.

19. The computing device of claim 18, wherein the computing device further comprising a condition response engine comprising computer readable instructions that when executed:
initiate one or more response actions associated with the condition profile.

20. The computing device of claim 19, further comprising:
a panel qualification subroutine comprising computer readable instructions that when executed:
reference an impaneling criteria data specifying a criteria for a group of users to collectively act as at least one of an evaluator of the one or more conditions and a validator of the first evaluation tier, and
determine a set of two or more user IDs of a set of two or more users associated with the peer evaluation pool each meet an evaluator criteria and collectively meet the criteria for the group,
wherein the evaluator criteria comprising at least one of a reputation value of a user profile of a user, a first number of validation events, a second number of validation events with matching outcomes from a different evaluation tier, and an account type of a user profile of the user, and
wherein the impaneling criteria data comprising at least one of a number of users, and a combined reputation score, a panel coordination engine comprising computer readable instructions that when executed:
assemble a panel session comprising the set of two or more user IDs;
re-generate the evaluation query for each of the one or more conditions comprising the evaluation criteria;
transmit the one or more evaluation queries to a device associated with each of the two or more users of the panel session;
receive one or more determination values of each of the one or more conditions from each of the two or more users of the panel session;
determine a quorum meeting the criteria for the group; and
generate a third solution state of the panel session based on the one or more determination values of each of the one or more conditions from each of the two or more users of the panel session.

* * * * *